US011794272B2

(12) United States Patent
Hori et al.

(10) Patent No.: US 11,794,272 B2
(45) Date of Patent: Oct. 24, 2023

(54) AUTOMATIC JOINING SYSTEM

(71) Applicant: NIPPON LIGHT METAL COMPANY, LTD., Tokyo (JP)

(72) Inventors: Hisashi Hori, Shizuoka (JP); Kosuke Yamanaka, Shizuoka (JP); Takeshi Handa, Shizuoka (JP); Kiyomi Tsuchiya, Shizuoka (JP); Satoshi Takahashi, Tokyo (JP); Nobuki Takahashi, Tokyo (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 17/633,506

(22) PCT Filed: Aug. 7, 2020

(86) PCT No.: PCT/JP2020/030453
§ 371 (c)(1),
(2) Date: Feb. 7, 2022

(87) PCT Pub. No.: WO2021/025155
PCT Pub. Date: Feb. 11, 2021

(65) Prior Publication Data
US 2022/0347788 A1 Nov. 3, 2022

(30) Foreign Application Priority Data

Aug. 8, 2019 (JP) .................................. 2019-146253
Aug. 8, 2019 (JP) .................................. 2019-146254
(Continued)

(51) Int. Cl.
*B23K 20/00* (2006.01)
*B23K 20/12* (2006.01)

(52) U.S. Cl.
CPC ........ *B23K 20/123* (2013.01); *B23K 20/1245* (2013.01)

(58) Field of Classification Search
CPC .............. B23K 20/1255; B23K 20/126; B23K 2101/14; B23K 20/122; B23K 20/1265;
(Continued)

(56) References Cited

U.S. PATENT DOCUMENTS 6,191,383 B1 * 2/2001 Jense .................... F28D 1/0308
219/79
6,325,273 B1 * 12/2001 Boon ....................... B41J 2/325
228/2.1
(Continued)

FOREIGN PATENT DOCUMENTS

DE 102016105927 A1 10/2017
JP 2000-263254 A 9/2000
(Continued)

OTHER PUBLICATIONS

International Search Report for PCT/JP2020/030453, (dated Nov. 2, 2020).
(Continued)

*Primary Examiner* — Erin B Saad
(74) *Attorney, Agent, or Firm* — Merchant & Gould P.C.

(57) ABSTRACT

The automatic joining system includes: a fixing device; a friction stir device; a measuring unit; and a controlling device, in which a rotating tool includes a base end side pin and a tip end side pin formed continuously to the base end side pin, the controlling device sets a target moving route along which the rotating tool moves when friction stir joining of a butting portion is performed, based on a ridge line position before the friction stir joining is performed, and also sets a modified moving route at a position displaced toward a first metallic member side in substantially parallel (Continued)

with respect to the target moving route, and the friction stir device controls the rotating tool to move along the modified moving route and thereby performing the friction stir joining along the target moving route.

20 Claims, 39 Drawing Sheets

(30) Foreign Application Priority Data

| Aug. 8, 2019 | (JP) | 2019-146255 |
|---|---|---|
| Aug. 8, 2019 | (JP) | 2019-146256 |
| Aug. 8, 2019 | (JP) | 2019-146257 |
| Aug. 7, 2020 | (JP) | 2020-134885 |
| Aug. 7, 2020 | (JP) | 2020-134886 |
| Aug. 7, 2020 | (JP) | 2020-134887 |
| Aug. 7, 2020 | (JP) | 2020-134888 |

(58) Field of Classification Search
CPC ............ B23K 20/129; B23K 2101/045; B23K 2103/10; B23K 20/1225; B23K 20/1235; B23K 20/123; B23K 20/124; B23K 2101/36; B23K 20/12; B23K 20/2336; B23K 2101/04; B23K 2101/18; B23K 2103/18; B23K 20/1245; B23K 20/127; B23K 20/227; B23K 20/24; B23K 2101/06; B23K 2103/05; B23K 31/125; B23K 33/006; B23K 37/0235; B23K 37/0531
See application file for complete search history.

(56) References Cited

U.S. PATENT DOCUMENTS

| 6,676,004 | B1* | 1/2004 | Trapp | B23K 20/1255 228/2.1 |
|---|---|---|---|---|
| 2007/0119276 | A1* | 5/2007 | Liu | C22C 29/16 75/232 |
| 2008/0311421 | A1* | 12/2008 | Watson | B23K 20/122 428/654 |
| 2009/0108173 | A1* | 4/2009 | Kakui | B23K 26/03 250/202 |
| 2015/0007912 | A1* | 1/2015 | Fujii | B23K 20/122 148/508 |
| 2016/0228981 | A1* | 8/2016 | Matsushita | B23K 20/1235 |

FOREIGN PATENT DOCUMENTS

| JP | 2001-269779 A | 10/2001 |
|---|---|---|
| JP | 2002-153983 A | 5/2002 |
| JP | 2002-301579 A | 10/2002 |
| JP | 2004-136305 A | 5/2004 |
| JP | 2005-21967 A | 1/2005 |
| JP | 2016-215264 A | 12/2016 |
| JP | 2018-020345 A | 2/2018 |
| JP | 2019-010674 A | 1/2019 |
| JP | 2020-097045 A | 6/2020 |

OTHER PUBLICATIONS

First Examination Report for Chinese Patent Application No. 202080056089.7 (dated Dec. 15, 2022).

Office Action for Chinese Patent Application No. 202080056089.7 (dated Jun. 29, 2023).

* cited by examiner

JOINING DISTANCE 100mm FIG. 30A
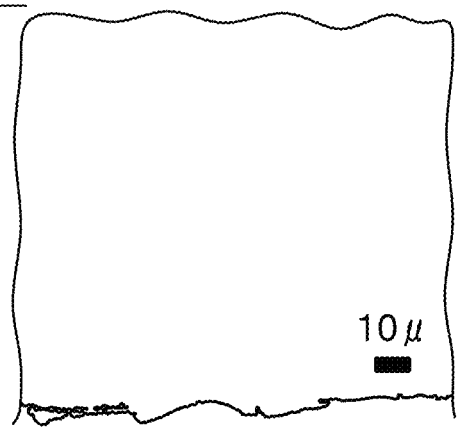
JOINING DISTANCE 600mm FIG. 30B
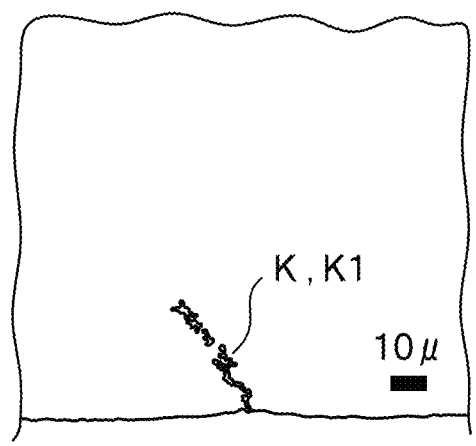
JOINING DISTANCE 800mm FIG. 30C
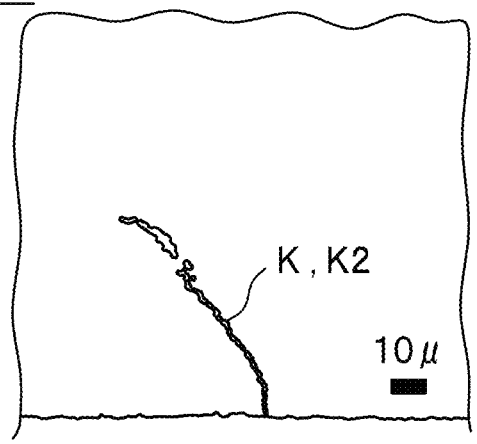

JOINING DISTANCE 1000mm FIG. 31A
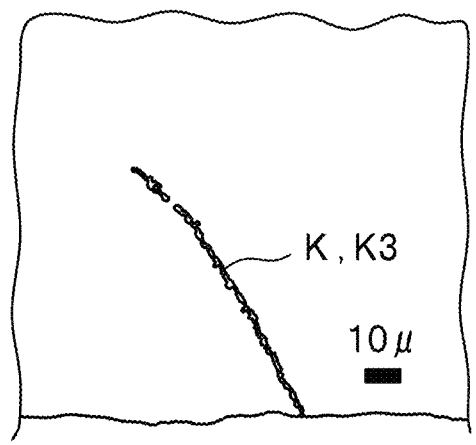
JOINING DISTANCE 1200mm FIG. 31B
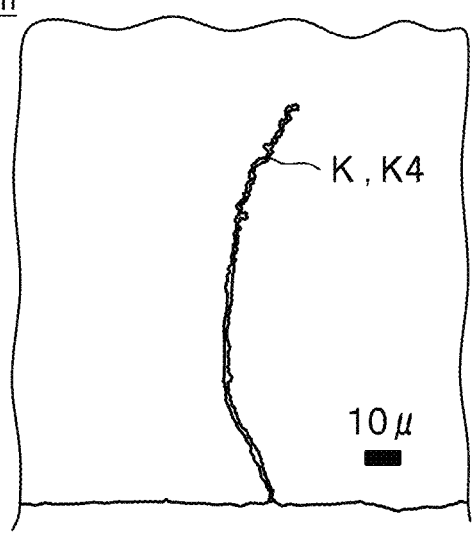

JOINING DISTANCE 1800mm

| SAMPLING POSITION X (mm) | Yn VALUE | MACRO STRUCTURE | MACRO STRUCTURE |
|---|---|---|---|
| 115 | −1.30 | | ROOT FLAW: 0.16mm |
| 675 | −0.84 | | ROOT FLAW: 0.01mm |
| 1205 | −0.51 | | ROOT FLAW: 0mm |

FIG. 41

| SAMPLING POSITION X (mm) | Yn VALUE | FzN | MICRO STRUCTURE | |
|---|---|---|---|---|
| 115 | −1.30 | 3599 | STEP: 0.04mm | ROOT FLAW: 0.00mm |
| 450 | −0.90 | 4034 | STEP: 0.05mm | ROOT FLAW: 0.00mm |
| 675 | −0.84 | 3490 | STEP: 0.06mm | ROOT FLAW: 0.00mm |
| 1205 | −0.51 | 3352 | STEP: 0.03mm | ROOT FLAW: 0.00mm |

AUTOMATIC JOINING SYSTEM

This application is a National Stage Application of PCT/JP2020/030453, filed Aug. 7, 2020, which claims benefit of priority to Japanese Patent Application No. 2019-146253, filed Aug. 8, 2019, Japanese Patent Application No. 2019-146254, filed Aug. 8, 2019, Japanese Patent Application No. 2019-146255, filed Aug. 8, 2019, Japanese Patent Application No. 2019-146256, filed Aug. 8, 2019, Japanese Patent Application No. 2019-146257, filed Aug. 8, 2019, Japanese Patent Application No. 2020-134885, filed Aug. 7, 2020, Japanese Patent Application No. 2020-134886, filed Aug. 7, 2020, Japanese Patent Application No. 2020-134887, filed Aug. 7, 2020 and Japanese Patent Application No. 2020-134888, filed Aug. 7, 2020, which applications are incorporated herein by reference. To the extent appropriate, a claim of priority is made to each of the above disclosed applications.

TECHNICAL FIELD

The present invention relates to an automatic joining system.

BACKGROUND ART

For example, Patent Literature 1 discloses a technique in which end portions of metallic members are butted to each other to form a butting portion and a rotating tool is moved along the butting portion to perform friction stir joining.

CITATION LIST

Patent Literature

Patent Literature 1: JP2018-20345A

SUMMARY OF INVENTION

Technical Problem

When arrangement positions of the metallic members are out of alignment, or when ridge lines of the metallic members are crooked, there is a risk that the rotating tool deviates from a moving route set in advance. Particularly, when height positions of front surfaces of the metallic members are different from each other, with merely a slight deviation of the position of the rotating tool, there is a risk of occurrence of failures such as occurrence of many burrs, rough joining front surfaces, and occurrence of an undercut in the joining portion. Additionally, when the temperature of the metallic member is low, there is a risk of occurrence of a cavity defect in a plasticizing region.

Additionally, for example, in a case of the friction stir joining of butting portions of metallic members having front surfaces at different height positions, when the rotating tool is advanced along the butting portions, there is a risk that right and left positions of the rotating tool with respect to the advancing direction may be shifted from the higher height position to the lower height position of the front surfaces of the metallic members, and a root flaw may occur.

In terms of the above point of view, an objective of the present invention is to provide an automatic joining system that can perform friction stir joining of metallic members having front surfaces at different height positions in a favorable manner.

Additionally, an objective of the present invention is to provide an automatic joining system that can prevent occurrence of a root flaw when friction stir joining of metallic members having front surfaces at different height positions is performed.

Solution to Problem

To solve the above-described problem, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a ridge line position of the first metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a modified moving route at a position displaced toward the first metallic member side in substantially parallel with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

According to the automatic joining system, with the modified moving route set based on the target moving route, and with the rotating tool controlled to move along the modified moving route, it is possible to set accurately the route along which the rotating tool actually moves. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces.

Additionally, it is favorable that, the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which the target moving route is displaced toward the first metallic member side in substantially parallel by the difference.

According to the automatic joining system, with the modified moving route set based on the difference calculated in advance, it is possible to set more accurately the route along which the rotating tool actually moves.

Moreover, it is favorable that, the controlling device calculates the modified moving route at a position that is displaced obliquely toward the first metallic member side with respect to the target moving route and also displaced toward the first metallic member side in substantially parallel with respect to the target moving route.

According to the automatic joining system, since the shifting of the rotating tool to the second metallic member side on which the height position of the front surface is low can be inhibited, it is possible to set more accurately the route along which the rotating tool actually moves.

Furthermore, it is favorable that, the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which an advancing direction of the target moving route is displaced obliquely toward the first metallic member side by the difference as advancing in an advancing direction of the rotating tool, and at which also the target moving route is displaced toward the first metallic member side in substantially parallel by the difference.

According to the automatic joining system, with the modified moving route set based on the difference calculated in advance, it is possible to set more accurately the route along which the rotating tool actually moves.

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a ridge line position of the first metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a modified moving route at a position displaced obliquely with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

According to the automatic joining system, with the modified moving route set based on the target moving route, and with the rotating tool controlled to move along the modified moving route, it is possible to set accurately the route along which the rotating tool actually moves. Additionally, since the shifting of the rotating tool to the second metallic member side on which the height position of the front surface is low can be inhibited by setting the modified moving route at a position displaced obliquely from the target moving route toward the first metallic member side, it is possible to set more accurately the route along which the rotating tool actually moves. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces.

Additionally, it is favorable that, the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which an advancing direction of the target moving route is displaced obliquely toward the first metallic member side by the difference as advancing in an advancing direction of the rotating tool.

According to the automatic joining system, with the modified moving route set based on the difference calculated in advance, it is possible to set more accurately the route along which the rotating tool actually moves.

To solve the above-described problem, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a step dimension from the front surface of the first metallic member to the front surface of the second metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines whether the step dimension before the friction stir joining is performed is within a predetermined numerical range.

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures each of a first thickness dimension of the first metallic member and a second thickness dimension of the second metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines whether the first thickness dimension and the second thickness dimension before the friction stir joining is performed or during the friction stir joining is within a predetermined numerical range.

According to the automatic joining system, since the friction stir joining is performed while the plastic fluidized material is pressed by the stepped bottom surface of the pin step portion of the base end side pin, it is possible to prevent occurrence of a burr and occurrence of an undercut and also possible to clean up the joining front surfaces. Additionally, with the determining unit provided that determines whether the step dimension is within the predetermined numerical range, it is possible to prevent a failure due to the step dimension. Moreover, with the determining unit provided that determines whether the plate-thickness of the first metallic member and the plate-thickness of the second metallic member are within a predetermined numerical range, it is possible to prevent a failure due to the plate-thicknesses.

Additionally, it is favorable that, the controlling device controls at least one of an aiming angle, an angle of advance, and an insertion amount of the rotating tool, and a position of the rotating tool in accordance with a combination of the first thickness dimension and the second thickness dimension.

According to the automatic joining system, it is possible to further enhance the joining accuracy.

To solve the above-described problem, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a ridge line position of the first metallic member and also measures at least either of a position of the rotating tool and a load applied to the rotating tool; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a moving route along which the rotating tool moves when the friction stir joining of the butting portion is performed, based on the ridge line position before the friction stir joining is performed, the friction stir device performs the friction stir joining along the moving route while maintaining a predetermined aiming angle of the rotating tool and while pressing a plastic fluidized material by a stepped bottom surface of the pin step portion, and the controlling device includes a determining unit that determines whether at least either of the position of the rotating tool during the friction stir joining and the load during the friction stir joining is within a predetermined numerical range.

According to the automatic joining system, since the moving route of the rotating tool is set based on the ridge line position of the first metallic member that is measured before the friction stir joining is performed, it is possible to set easily an accurate moving route. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces. Moreover, with the determining unit provided that determines whether at least either of the position of the rotating tool and the load applied to the rotating tool during the friction stir joining is within a predetermined numerical range, it is possible to prevent a failure due to at least either of the position of the rotating tool and the load applied to the rotating tool during the friction stir joining.

Additionally, it is favorable that, when at least either of the position of the rotating tool during the friction stir joining and the load during the friction stir joining is determined to be out of the predetermined numerical range, the controlling device calculates a modified moving route in which a position of the rotating tool is reset in accordance with the position of the rotating tool during the friction stir joining.

According to the automatic joining system, it is possible to further enhance the joining accuracy.

Moreover, it is favorable that, the measuring unit measures the ridge line position and also measures the position of the rotating tool and the load, and the determining unit determines whether at least one of the position of the rotating tool during the friction stir joining and the load during the friction stir joining is within a predetermined numerical range.

Furthermore, it is favorable that, the position of the rotating tool is right and left positions with respect to an advancing direction of the rotating tool.

According to the automatic joining system, it is possible to prevent a failure due to the right and left positions of the rotating tool during the friction stir joining.

To solve the above-described problem, an automatic joining system according to the present invention is an automatic joining system that buts end surfaces of a first metallic member and a second metallic member arranged on a platform to each other such that a front surface of the second metallic member is lower than a front surface of the first metallic member and performs friction stir joining of a butting portion including a step, including: a friction stir device that includes a rotating tool performing friction stir and performs friction stir joining of the butting portion; a measuring unit that measures a ridge line position of the first metallic member; and a controlling device that controls the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a set moving route as an instructing position to move the rotating tool, based on a difference between a traveling trajectory along which the rotating tool is moved by being controlled to move along the set moving route, while the rotating tool is inserted, and while the friction stir joining is performed, and the target moving route, the controlling device calculates a modified moving route in which an instructing position of the rotating tool is set at a position at which an advancing direction of the set moving route is displaced obliquely with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

According to the automatic joining system, with the modified moving route set based on the target moving route, and with the rotating tool controlled to move along the modified moving route, it is possible to set accurately the route along which the rotating tool actually moves. Particularly, with the advancing direction displaced obliquely to set the modified moving route, it is possible to prevent the shifting of the right and left positions of the rotating tool with respect to the advancing direction. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces.

Additionally, it is favorable that, the controlling device sets the set moving route at a position displaced in parallel from the target moving route, and calculates the modified moving route, based on a difference between a traveling trajectory along which the rotating tool is controlled to move along the set moving route and the target moving route, at a position at which an advancing direction of the set moving route is displaced obliquely toward the first metallic member side by the difference as advancing in an advancing direction of the rotating tool.

Moreover, it is favorable that, based on a difference between a traveling trajectory along which the rotating tool is controlled to move along the set moving route and the target moving route, the controlling device calculates the modified moving route in which an instructing position of the rotating tool is set at a position at which an advancing direction of the set moving route is displaced obliquely and also displaced in substantially parallel with respect to the target moving route.

According to the automatic joining system, with the modified moving route set based on the difference calculated in advance, it is possible to set more accurately the route along which the rotating tool actually moves.

Furthermore, it is favorable that, the controlling device sets the set moving route at a position displaced from the target moving route in parallel, obtains a traveling trajectory along which the rotating tool is controlled to move along the set moving route, and sets the modified moving route at a position at which, by an angle of oblique displacement of the traveling trajectory with respect to the target moving route, an advancing direction of the set moving route is displaced obliquely in an opposite direction of the direction in which the traveling trajectory is displaced, and at which, by a length of substantially parallel displacement of the traveling trajectory with respect to the target moving route, also the set moving route is displaced in substantially parallel in an opposite direction of the direction in which the traveling trajectory is displaced.

According to the automatic joining system, it is possible to set more accurately the route along which the rotating tool actually moves.

To solve the above-described problem, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a clearance amount between the first metallic member and the second metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines the clearance amount before the friction stir joining is performed is within a predetermined numerical range.

According to the automatic joining system, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces. Additionally, with the determining unit provided that determines whether the clearance amount is within a predetermined numerical range, it is possible to prevent a failure due to the clearance amount.

Additionally, it is favorable that, the determining unit determines whether the clearance amount at a start position of the friction stir joining is within a predetermined numerical range.

To solve the above-described problem, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a temperature adjusting unit that is provided in the fixing device and performs measurement of a temperature of the platform and adjustment of the temperature; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the joining portion while maintaining a predetermined aiming angle of the rotating tool and while pressing a plastic fluidized material by a stepped bottom surface of the pin step portion, and the controlling device includes a determining unit that determines the temperature before the friction stir joining is performed is within a predetermined numerical range.

According to the automatic joining system, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces. Additionally, with the determining unit provided that determines whether the temperature of the temperature adjusting unit is within a predetermined numerical range, it is possible to prevent a failure due to the temperature.

Advantageous Effects of Invention

According to the automatic joining system of the present invention, it is possible to perform friction stir joining of metallic members having front surfaces at different height positions in a favorable manner.

Additionally, according to the automatic joining system of the present invention, it is possible to prevent occurrence of a root flaw when friction stir joining of metallic members having front surfaces at different height positions is performed.

BRIEF DESCRIPTION OF DRAWINGS

FIG. 30A is a macro cross-sectional view of a butting portion at a position at which the joining distance is 100 mm in Test 3 in the example.

FIG. 30B is a macro cross-sectional view of a butting portion at a position at which the joining distance is 600 mm in Test 3 in the example.

FIG. 30C is a macro cross-sectional view of a butting portion at a position at which the joining distance is 800 mm in Test 3 in the example.

FIG. 31A is a macro cross-sectional view of a butting portion at a position at which the joining distance is 1000 mm in Test 3 in the example.

FIG. 31B is a macro cross-sectional view of a butting portion at a position at which the joining distance is 1200 mm in Test 3 in the example.

FIG. 41 is a macro structure diagram of each position in Test 6.

DESCRIPTION OF EMBODIMENTS

Embodiments of the present invention are described with reference to the drawings as needed. The present invention is not limited to only the following embodiments. Additionally, a part of or all the constituents in the embodiments can be combined as needed. First, a rotating tool that is used in an automatic joining system according to the embodiments is described.

[A. Rotating Tool]

Figure 1:
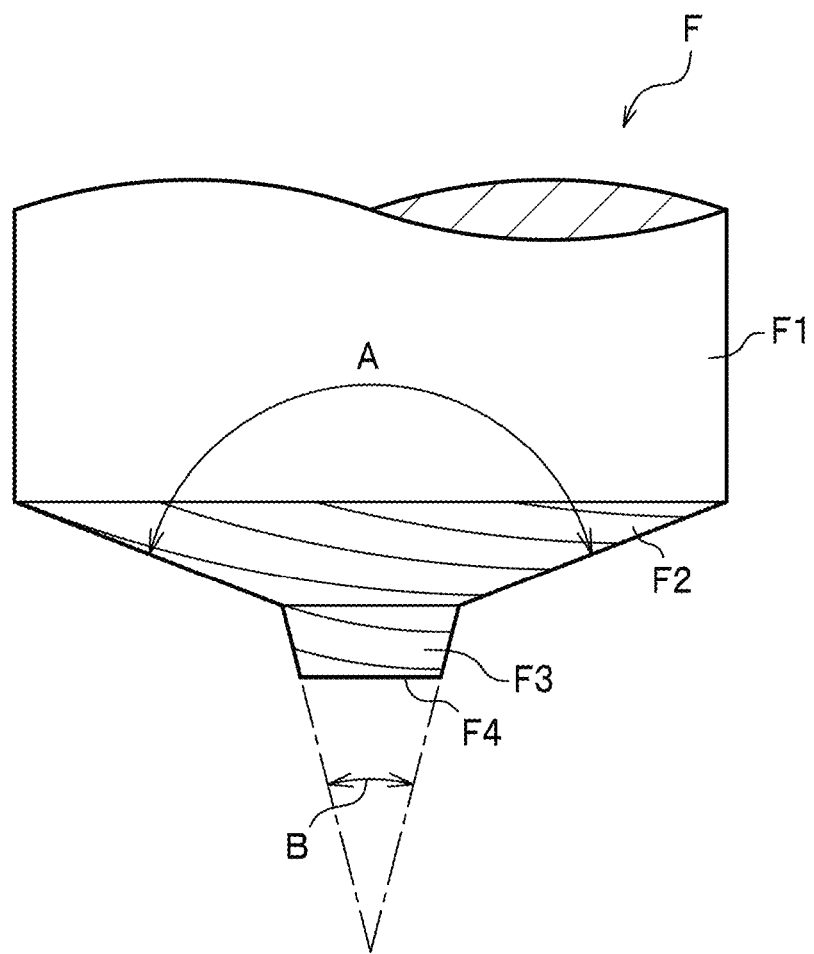
FIG. 1 is a side view showing a rotating tool according to an embodiment of the present invention.

The rotating tool is a tool used for the friction stir joining. As shown in FIG. 1, a rotating tool F is formed of tool steel, for example, and mainly includes a base shaft portion F1, a base end side pin F2, and a tip end side pin F3. The base shaft portion F1 is in a column shape and is a part connected to a main shaft of a friction stir device.

Figure 2:
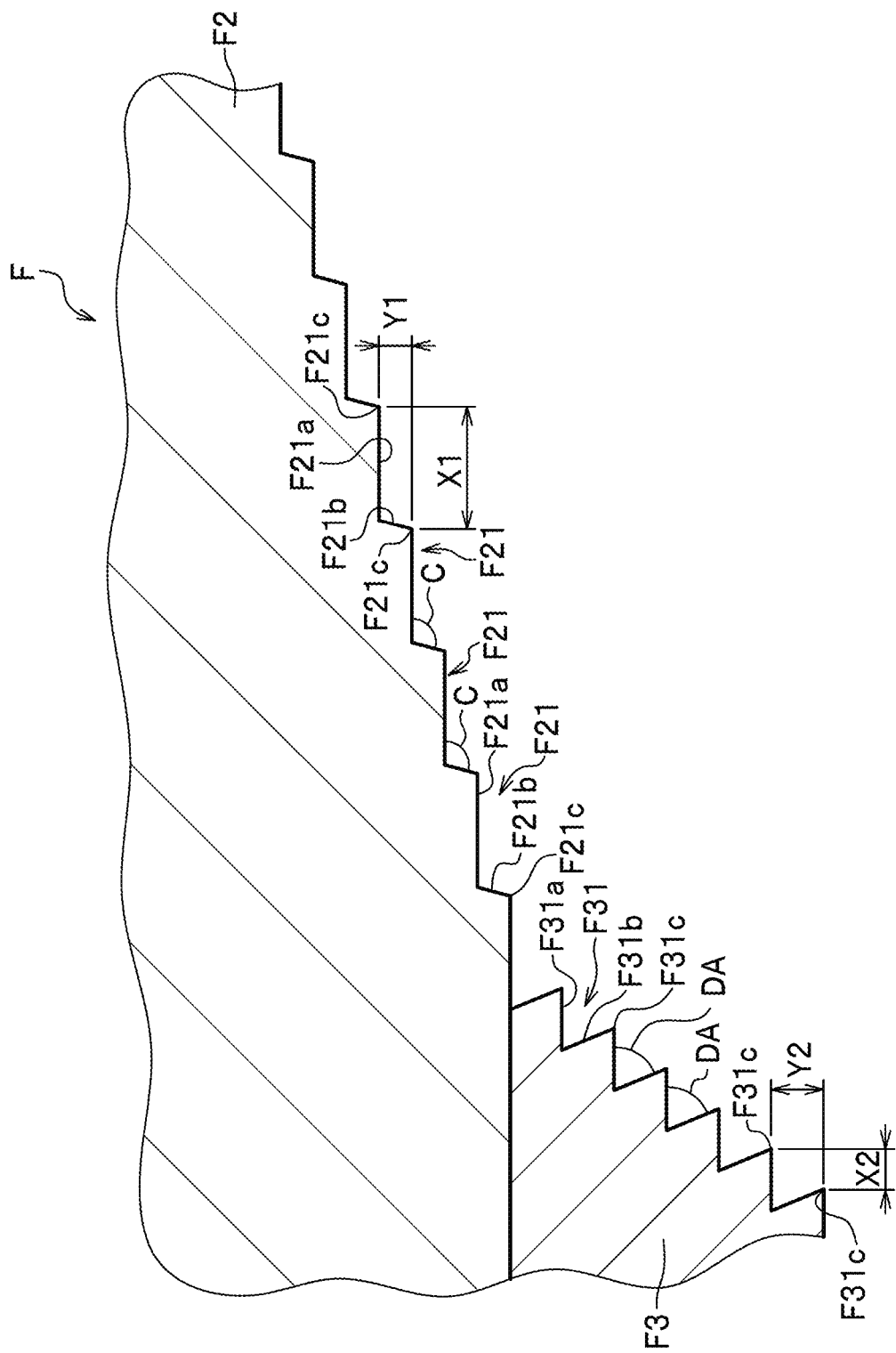
FIG. 2 is an enlarged cross-sectional view of the rotating tool.

The base end side pin F2 is continued to the base shaft portion F1 and is tapered toward the tip end. The base end side pin F2 is in a circular truncated cone shape. A taper angle A of the base end side pin F2 may be set arbitrarily and is 135 to 160°, for example. When the taper angle A is less than 135° or more than 160°, the joining front surface roughness after the friction stir is great. The taper angle A is greater than a taper angle B of the tip end side pin F3, which is described later. As shown in FIG. 2, stepwise pin step portions F21 are formed on an outer periphery of the base end side pin F2 over the entirety in a height direction. The pin step portions F21 are formed in a spiral clockwise or counterclockwise. That is, the pin step portions F21 are in the form of a spiral in planar view and is in the form of steps in side view. In this embodiment, the rotating tool F is rotated clockwise; for this reason, the pin step portions F21 are set counterclockwise from the base end side to the tip end side.

Note that, in a case where the rotating tool F is rotated counterclockwise, it is favorable that the pin step portions F21 are set clockwise from the base end side to the tip end side. With this, a plastic fluidized material is guided to the tip end side by the pin step portions F21, and thus it is possible to reduce metal overflowing outside a joined metallic member. The pin step portions F21 each include a stepped bottom surface F21a and a stepped side surface F21b. A distance X1 (a horizontal direction distance) between apexes F21c, F21c of adjacent pin step portions F21 is set arbitrarily in accordance with a step angle C and a height Y1 of the stepped side surface F21b, which are described later.

The height Y1 of the stepped side surface F21b may be set arbitrarily and is set to 0.1 to 0.4 mm, for example. When the height Y1 is less than 0.1 mm, the joining front surface roughness is great. On the other hand, when the height Y1 is more than 0.4 mm, the joining front surface roughness is likely to be great, and also the number of effective step portions (the number of the pin step portions F21 being in contact with the joined metallic member) is reduced.

The step angle C formed by the stepped bottom surface F21a and the stepped side surface F21b may be set arbitrarily and is set to 85 to 120°, for example. The stepped bottom surface F21a is parallel to a horizontal plane in this embodiment. The stepped bottom surface F21a may be tilted from a rotating axis of the tool in an outer periphery direction within a range of −5° to 15° with respect to the horizontal plane (negative is downward from the horizontal plane while positive is upward from the horizontal plane). The distance X1, the height Y1 of the stepped side surface F21b, the step angle C, and the angle of the stepped bottom surface F21a with respect to the horizontal plane are set arbitrarily such that, when the friction stir is performed, the plastic fluidized material can escape to the outside without remaining and being attached inside the pin step portion F21, and the joining front surface roughness can be reduced by pressing the plastic fluidized material by the stepped bottom surface F21a.

As shown in FIG. 1, the tip end side pin F3 is formed continuously to the base end side pin F2. The tip end side pin F3 is in a circular truncated cone shape. A tip end of the tip end side pin F3 is a flat surface F4 perpendicular to the rotating axis. The taper angle B of the tip end side pin F3 is smaller than the taper angle A of the base end side pin F2. As shown in FIG. 2, spiral grooves F31 are carved on an outer periphery of the tip end side pin F3. The spiral grooves F31 may be either clockwise or counterclockwise, and in this embodiment, the spiral grooves F31 are carved counterclockwise from the base end side to the tip end side because the rotating tool F is rotated clockwise.

Note that, in a case where the rotating tool F is rotated counterclockwise, it is favorable that the spiral grooves F31 are set clockwise from the base end side to the tip end side. With this, the plastic fluidized material is guided to the tip end side by the spiral grooves F31, and thus it is possible to reduce metal overflowing outside the joined metallic member. The spiral grooves F31 each include a spiral bottom surface F31a and a spiral side surface F31b. A distance (a horizontal direction distance) between apexes F31c, F31c of adjacent spiral grooves F31 is a length X2. The height of the spiral side surface F31b is a height Y2. A spiral angle DA formed by the spiral bottom surface F31a and the spiral side surface F31b is formed at 45 to 90°, for example. The spiral grooves F31 have a role in increasing a frictional heat by being put in contact with the joined metallic member and guiding the plastic fluidized material to the tip end side.

Figure 3:
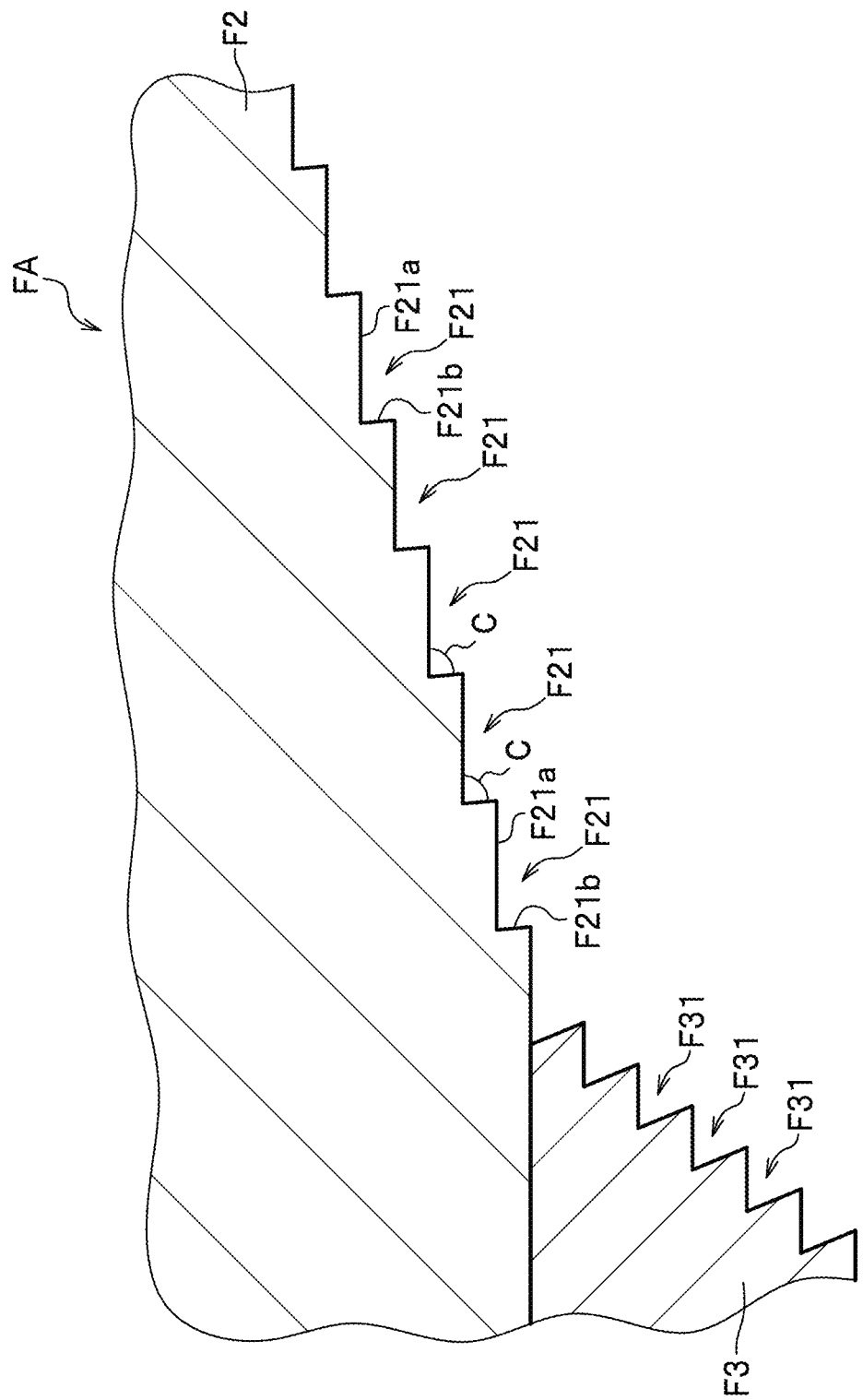
FIG. 3 is a cross-sectional view showing a first modification of the rotating tool.

The design of the rotating tool F is able to be changed as needed. FIG. 3 is a side view showing a first modification of the rotating tool in the present invention. As shown in FIG. 3, in a rotating tool FA according to the first modification, the step angle C formed by the stepped bottom surface F21a and the stepped side surface F21b of the pin step portion F21 is 85°. The stepped bottom surface F21a is parallel to the horizontal plane. Thus, while the stepped bottom surface F21a is parallel to the horizontal plane, the step angle C may be an acute angle as long as the plastic fluidized material can escape to the outside without remaining and being attached inside the pin step portion F21 during the friction stir.

Figure 4:
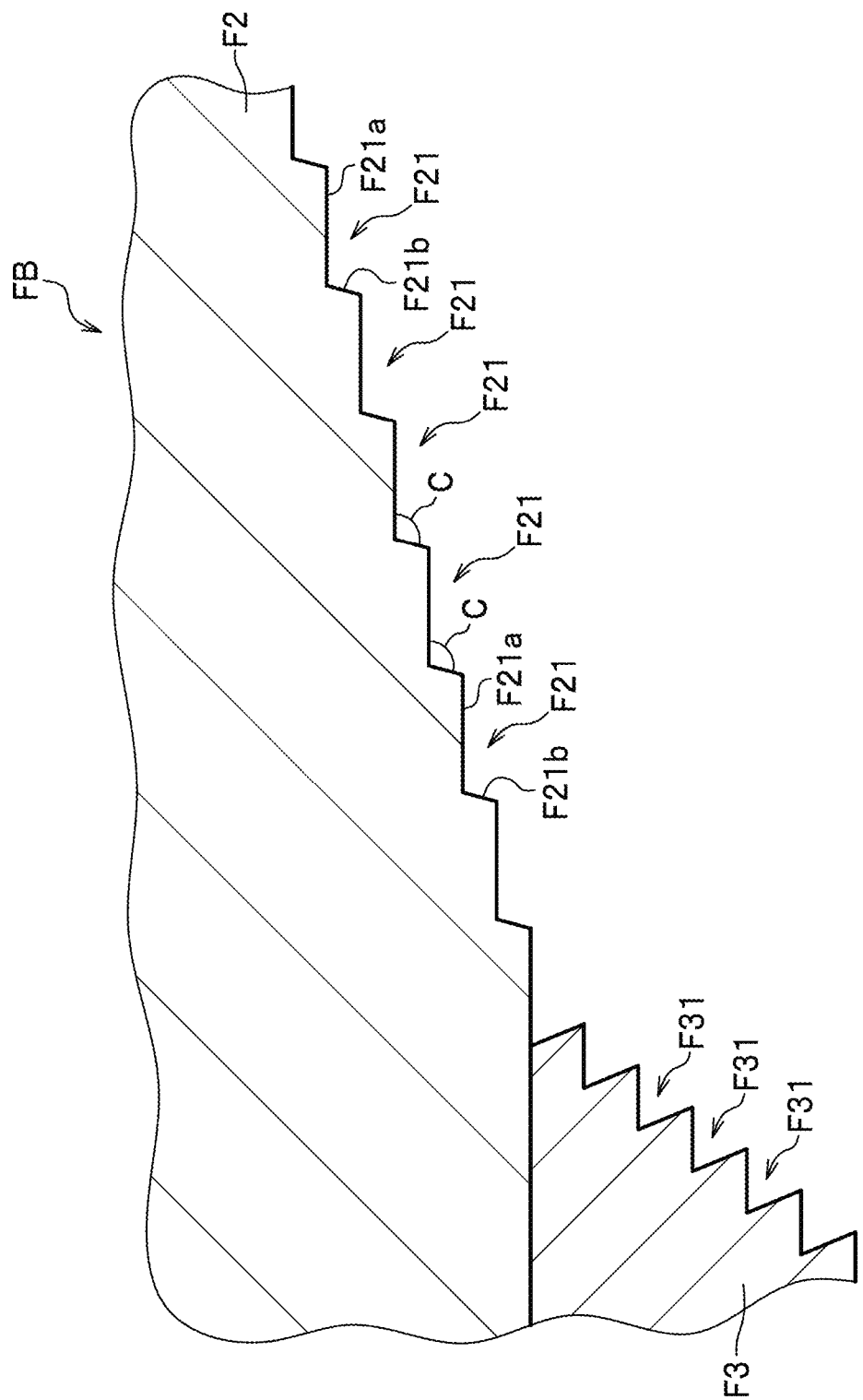
FIG. 4 is a cross-sectional view showing a second modification of the rotating tool.

FIG. 4 is a side view showing a second modification of the rotating tool in the present invention. As shown in FIG. 4, in a rotating tool FB according to the second modification, the step angle C of the pin step portion F21 is 115°. The stepped bottom surface F21a is parallel to the horizontal plane. Thus, while the stepped bottom surface F21a is parallel to the horizontal plane, the step angle C may be an obtuse angle as long as the pin step portion F21 can function as the pin step portion F21.

Figure 5:
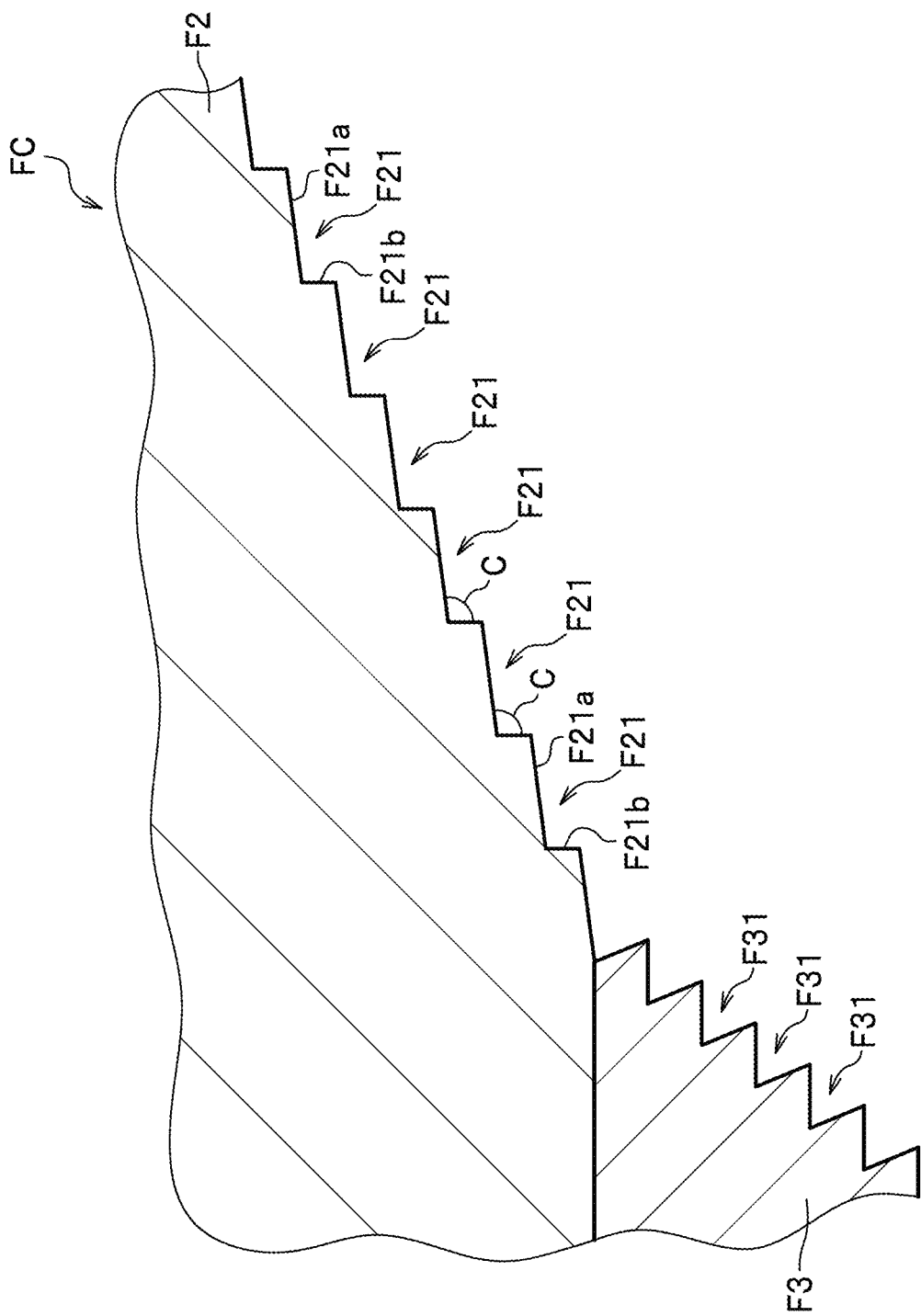
FIG. 5 is a cross-sectional view showing a third modification of the rotating tool.

FIG. 5 is a side view showing a third modification of the rotating tool in the present invention. As shown in FIG. 5, in a rotating tool FC according to the third modification, the stepped bottom surface F21a is tilted upward at 10° with respect to the horizontal plane from the rotating axis of the tool in the outer periphery direction. The stepped side surface F21b is parallel to a vertical plane. Thus, the stepped bottom surface F21a may be formed to be tilted upward with respect to the horizontal plane from the rotating axis of the tool in the outer periphery direction, as long as the plastic fluidized material can be pressed during the friction stir.

B. First Embodiment

[B-1. Automatic Joining System]

Figure 6:
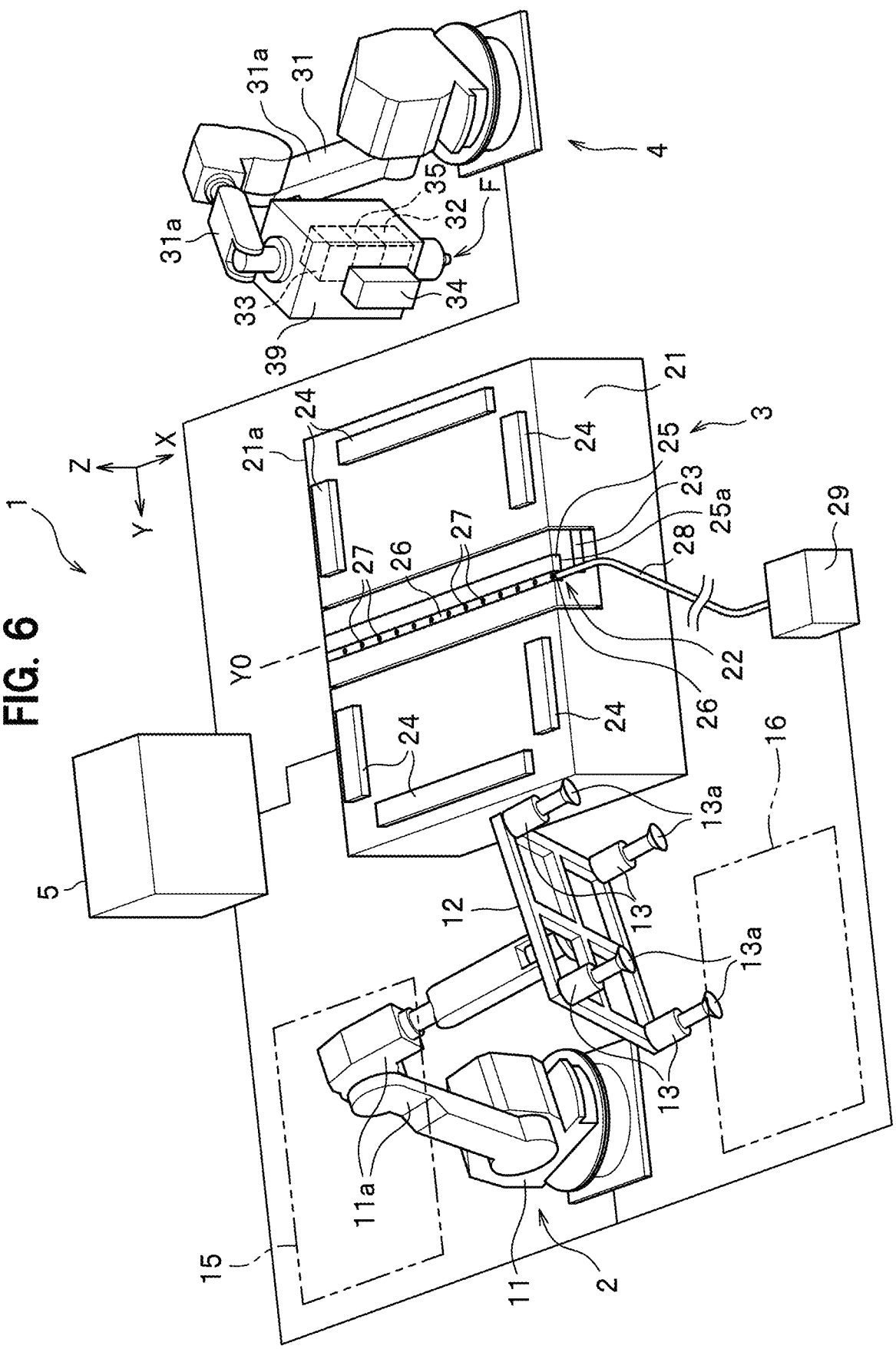
FIG. 6 is an overall perspective view of an automatic joining system according to a first embodiment of the present invention.

Next, as shown in FIG. 6, an automatic joining system 1 according to a first embodiment of the present invention is described. Note that, in the following descriptions, a surface on the opposite side of a "back surface" is a "front surface".

Figure 7:
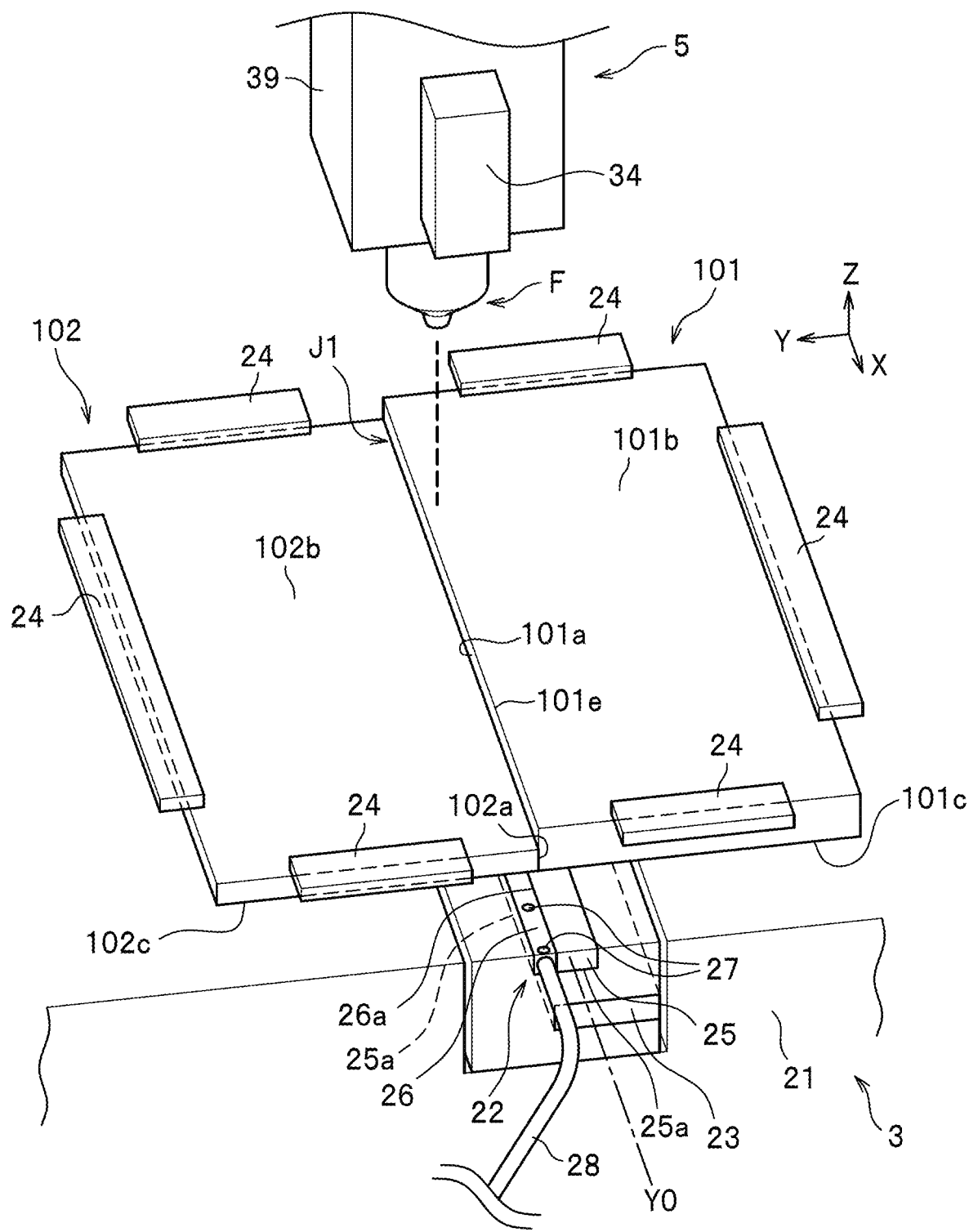
FIG. 7 is a major portion perspective view of the automatic joining system according to the first embodiment.

As shown in FIGS. 6 and 7, the automatic joining system 1 includes a conveying device 2, a fixing device 3, a friction stir device 4, and a controlling device 5. The automatic joining system 1 is a system that automatically performs the friction stir joining of end portions of a first metallic member 101 and a second metallic member 102.

As shown in FIG. 7, the first metallic member 101 and the second metallic member 102 are plate-shaped members formed of metal that is able to be friction-stirred such as aluminum, an aluminum alloy, titanium, a titanium alloy, magnesium, a magnesium alloy, copper, and a copper alloy. The plate-thickness dimension of the second metallic member 102 is smaller than the plate-thickness dimension of the first metallic member 101. In this embodiment, the first metallic member 101 and the second metallic member 102 are formed of an aluminum alloy, for example.

As shown in FIG. 7, an end surface 101a of the first metallic member 101 and an end surface 102a of the second metallic member 102 are butted to each other to form a butting portion J1. A back surface 101c of the first metallic member 101 and a back surface 102c of the second metallic member 102 are flush to each other, and thus a step is formed between front surfaces 101b and 102b. To be specific, the end surfaces 101a and 102a are butted to each other such that the height position of the front surface 102b of the second metallic member 102 is lower than the front surface 101b of the first metallic member 101.

Note that, the first metallic member 101 and the second metallic member 102 are sequentially conveyed in every step of the friction stir joining and taken out to the outside the fixing device 3 after joining, and in order to identify each first metallic member 101 and second metallic member 102, serial numbers (hereinafter, referred to as "work numbers") are assigned in the order of the joining. Additionally, although the plate-thickness dimensions of the first metallic member 101 and the second metallic member 102 are different in this embodiment, the butting may be performed with the plate-thickness dimensions of the first metallic member 101 and the second metallic member 102 being the same but the height positions of the front surfaces 101b and 102b made different.

[B-1-1. Conveying Device]

Figure 8:
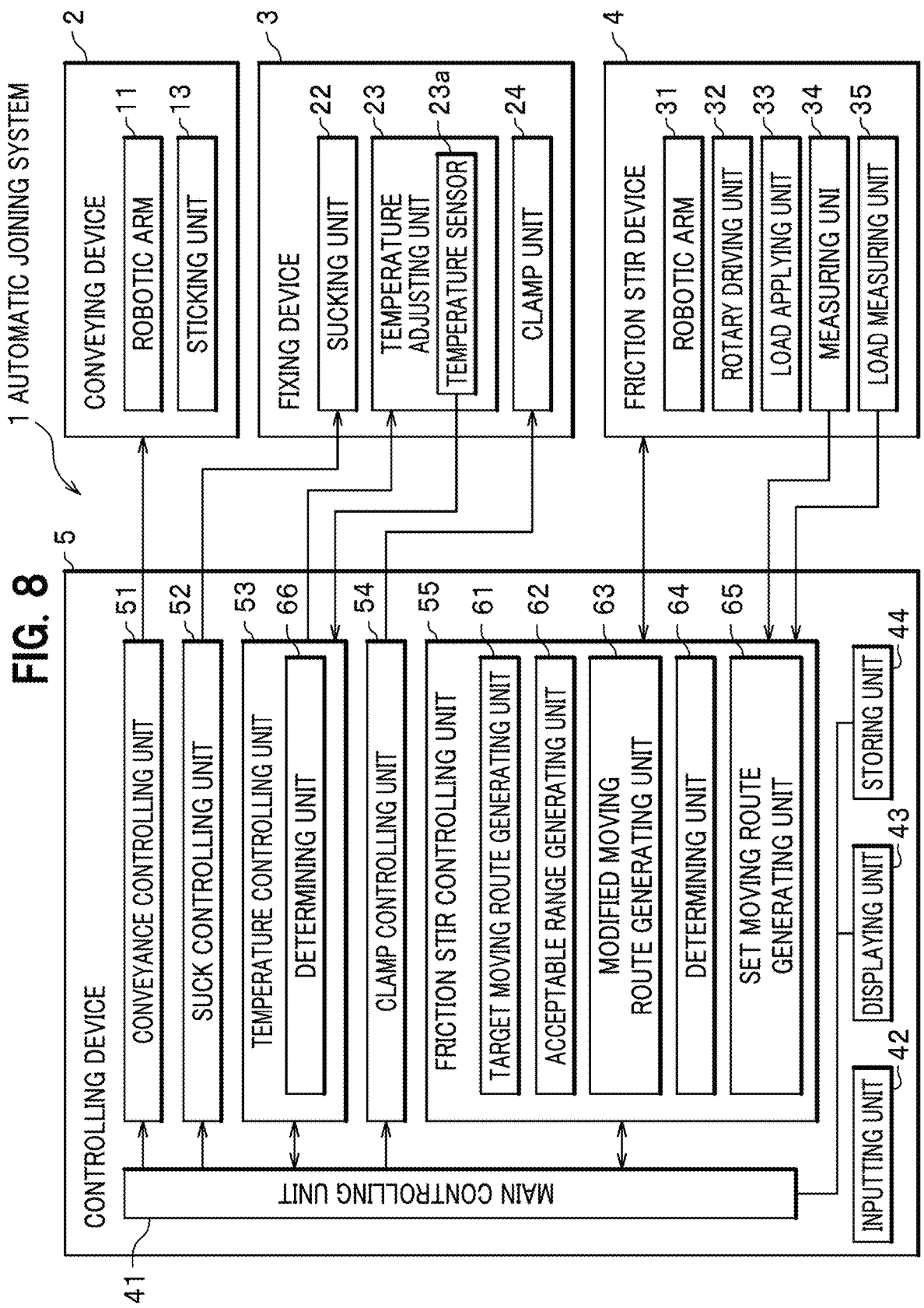
FIG. 8 is a block diagram of the automatic joining system according to the first embodiment.

As shown in FIGS. 6 and 8, the conveying device 2 includes a robotic arm 11, a base portion frame 12, and four sticking units 13. The robotic arm 11 is electrically connected with the controlling device 5. A conveyance controlling unit 51 (see FIG. 8) of the controlling device 5 is a device that controls a conveying operation of the robotic arm 11. The robotic arm 11 includes a multi-jointed arm 11a and an arm driving unit (omitted in drawing) and is capable to operate sterically based on a control signal transmitted from the conveyance controlling unit 51.

The base portion frame 12 is a frame-shaped member attached to a tip end of the arm of the robotic arm 11. The base portion frame 12 is attached perpendicularly to an axial direction of the arm 11a. The sticking units 13 are provided to four corners of the base portion frame 12 perpendicularly to a plane of the base portion frame 12, respectively. Based on the control signal of the conveyance controlling unit 51, the sticking units 13 can apply a negative pressure or a positive pressure to sticking pads 13a provided at the tip ends, respectively. That is, it is possible to stick to the four corners of the first metallic member 101 or the second metallic member 102 by applying a negative pressure to the sticking pads 13a, and it is possible to detach the first metallic member 101 or the second metallic member 102 by applying a positive pressure. With this, the robotic arm 11 can convey each of the first metallic member 101 and the second metallic member 102 to a position that is set in advance on the fixing device 3. For example, each of the first metallic member 101 and the second metallic member 102 before joining can be stacked and arranged in a material arrangement area (omitted in drawing) at a position within a range in which the conveying device 2 is able to stick to the first metallic member 101 and the second metallic member 102. The conveying device 2 can convey each of the first metallic member 101 and the second metallic member 102 arranged in the material arrangement area one by one to a predetermined position on a platform 21.

Additionally, after the friction stir joining, the robotic arm 11 can take out the joined first metallic member 101 and second metallic member 102 (hereinafter, also referred to as a "joined metallic member 103") from the fixing device 3 and convey to a predetermined position. For example, when the joined metallic member 103 is determined as an acceptable product by the controlling device 5, the robotic arm 11 can convey the joined metallic member 103 to an arrangement area 15 (see FIG. 6), and when the joined metallic member 103 is determined as an out-of-numerical-range product, the robotic arm 11 can convey the joined metallic member 103 to an out-of-numerical-range product arrangement area 16. Note that, the out-of-numerical-range product means the joined metallic member 103 that is determined to be not within a predetermined numerical range (out of a numerical range) by the controlling device 5.

[B-1-2. Fixing Device]

The fixing device 3 is a device that fixes the first metallic member 101 and the second metallic member 102 and that is also a seat for the friction stir joining. As shown in FIGS. 6 and 8, the fixing device 3 includes the platform 21, a sucking unit 22, a temperature adjusting unit 23, and clamp units 24.

<Platform>

The platform 21 is a platform including a front surface on the top portion on which the first metallic member 101 and the second metallic member 102 are arranged, and the outer shape is in a cuboid. A reference position Y0 perpendicular to a ridge line 21a of the platform 21 in a longitudinal direction is set at a center position on the top front surface of the platform 21. The reference position Y0 is a position as a reference for positioning the first metallic member 101 and the second metallic member 102. The first metallic member 101 and the second metallic member 102 are arranged to form the butting portion J1 at the position of the reference position Y0. Here, an X direction, a Y direction, and a Z direction in the following descriptions are based on arrows in FIGS. 6 and 7. As shown in FIGS. 6 and 7, the X direction, the Y direction, and the Z direction are orthogonal to each other. The X direction is parallel to the reference position Y0 on a top plane of the platform 21. The Y direction is perpendicular to the reference position Y0 on the top plane of the platform 21. The Z direction is perpendicular to the top plane of the platform 21.

A concave groove 25a is formed in a center portion on a front surface side of the platform 21 along the reference position Y0. In the concave groove 25a, a placing portion 25 is provided at a position corresponding to the butting portion J1 along the reference position Y0. In this embodiment, the placing portion 25 has a length substantially the same as the length of the platform 21 in the X direction, and is formed to have a width similar to or greater than the width of a plastic flowing region formed by the friction stir joining of the first metallic member 101 and the second metallic member 102. Additionally, the placing portion 25 is formed of aluminum or an aluminum alloy plate. An anodized coating is formed on a front surface side of the placing portion 25. The placing portion 25 is arranged on the front surface of the platform 21 to support the first metallic member 101 and the second metallic member 102 placed thereon and to function as a backing plate to perform temperature adjustment of the first metallic member 101 and the second metallic member 102.

<Sucking Unit>

The sucking unit 22 is a device that sucks an end portion of the second metallic member 102 from a back surface 102c side. The sucking unit 22 includes a sucking tube 26, a hose 28, and a sucking machine 29. The sucking tube 26 is a hollow tube with a rectangular cross section. As shown in FIG. 7, the sucking tube 26 is disposed in the concave groove 25a provided in parallel to the X direction on the front surface side of the platform 21. In the concave groove 25a, the placing portion 25 arranged on the first metallic member 101 side and the sucking tube 26 arranged on the second metallic member 102 side are disposed adjacent to each other in the longitudinal direction. A front surface of the sucking tube 26 and a front surface of the placing portion 25 are flush to each other. In this embodiment, for example, a ridge line 26a of the sucking tube 26 on the first metallic member 101 side in a front surface longitudinal direction is set to be positioned on the second metallic member 102 side with respect to the reference position Y0.

Multiple hole portions 27 are opened at predetermined intervals in the front surface of the sucking tube 26. The sucking tube 26 is coupled to the sucking machine 29 via the hose 28. The sucking machine 29 is a machine that generates a negative pressure by sucking and is electrically connected with a suck controlling unit 52 (see FIG. 8) of the controlling device 5. The suck controlling unit 52 of the controlling device 5 controls the sucking operation of the sucking machine 29. That is, the sucking machine 29 can be set to suck ON or suck OFF based on a control signal transmitted from the suck controlling unit 52. The sucking unit 22 generates a negative pressure around the hole portions 27 to suck the end portion of the second metallic member 102, and thus uplift of the end portion can be prevented.

Note that, although the second metallic member 102 is sucked in this embodiment, both the first metallic member 101 and second metallic member 102 may be sucked. Multiple sucking tubes 26 may be provided.

<Temperature Adjusting Unit>

As shown in FIGS. 6 and 8, the temperature adjusting unit 23 is a device that is provided inside the platform 21 of the fixing device 3 to measure the temperature of the platform 21 and perform the temperature adjustment of the front surface of the platform 21. The temperature adjusting unit 23 includes a heater (omitted in drawing) and a temperature sensor 23a (see FIG. 8). The placing portion 25, the temperature sensor 23a, and the heater are provided from the front surface side of the platform 21 in this order. The heater is arranged to correspond to substantially the same position as the placing portion 25 along the reference position Y0. The temperature sensor 23a measures the temperature of the placing portion 25, and the heater adjusts the temperature of the placing portion 25. The temperature adjusting unit 23 is electrically connected with a temperature controlling unit 53 of the controlling device 5. The temperature adjusting unit 23 is configured to be able to control the operation of the heater based on a control signal transmitted from the temperature controlling unit 53. For example, the temperature adjusting unit 23 is configured to heat up the placing portion 25 by activating the heater or to cool down the placing portion 25 to a temperature close to the room temperature by stopping the heater. Thus, the temperature adjusting unit 23 can measure the placing portion 25 on the front surface of the platform 21 by the temperature sensor 23a and can adjust the temperature of the placing portion 25 on the front surface of the platform 21 by the heater. Additionally, the temperatures of the first metallic member 101 and the second metallic member 102 can be increased or decreased by adjusting the temperature of the placing portion 25. Note that, the temperature adjusting unit 23 may further include a cooling device to cool down the placing portion 25 by activating this cooling device.

Before each friction stir joining is performed, a result measured by the temperature sensor 23a of the temperature adjusting unit 23 is transmitted to the temperature controlling unit 53 of the controlling device 5 while being associated with a work number and is also stored in a storing unit 44. The result measured by the temperature sensor 23a may be displayed on a displaying unit 43 of the controlling device 5 with the work number.

<Clamping Unit>

As shown in FIGS. 7 and 8, the clamp units 24 are devices that are movably arranged around the platform 21 to fix or release the first metallic member 101 and the second metallic member 102 to and from the platform 21. The clamp units 24 perform the fixing or releasing of the first metallic member 101 and the second metallic member 102 based on a control signal transmitted from a clamp controlling unit 54 (see FIG. 8) of the controlling device 5. That is, after the first metallic member 101 and the second metallic member 102 are arranged on the platform 21, the clamp units 24 approach the first metallic member 101 and the second metallic member 102 and restrain the first metallic member 101 and the second metallic member 102 to be immovable on the platform 21. On the other hand, the clamp units 24 release the restraint when the friction stir joining ends and retreat to a position at which the clamp units 24 do not interfere when the joined metallic member 103 is taken out.

[B-1-3. Friction Stir Device]

As shown in FIGS. 6 and 8, the friction stir device 4 includes a robotic arm 31, a rotary driving unit 32, a load applying unit 33, a measuring unit 34, and a load measuring unit 35. The friction stir device 4 is a device that moves the rotating tool F while rotating the rotating tool F to perform the friction stir joining of the first metallic member 101 and the second metallic member 102.

The robotic arm 31 is electrically connected with the controlling device 5. A friction stir controlling unit 55 (see FIG. 8) of the controlling device 5 is a device that controls the friction stir joining operation of the robotic arm 31. The robotic arm 31 includes a multi-jointed arm 31a and an arm driving unit (omitted in drawing) and is capable of operating sterically based on a control signal transmitted from the friction stir controlling unit 55.

The rotary driving unit 32 includes a rotary driving device such as a motor that rotates the rotating tool F. The rotary driving unit 32, the load applying unit 33, and the load measuring unit 35 are stored in a housing 39 (see FIG. 6). A chuck unit capable of attaching and detaching the rotating tool F is provided at a tip end of the rotary driving unit 32. The friction stir controlling unit 55 (see FIG. 8) controls the rotary driving unit 32 such that the rotating tool F rotates a predetermined number of times.

The load applying unit 33 (see FIG. 8) is a unit that includes a cylinder mechanism or the like that is movable in the axial direction of the rotating tool F and that adjusts pressing force of the rotating tool F to the first metallic member 101 and the second metallic member 102 during the friction stir joining.

The load measuring unit 35 is a device that is provided between the rotating tool F and the rotary driving device such as a motor and that measures a reaction load in the axial direction that the rotating tool F receives during the friction stir joining. A result measured by the load measuring unit 35 is transmitted to the friction stir controlling unit 55 of the controlling device 5 while being associated with a work number and is also stored in the storing unit 44.

The result measured by the load measuring unit 35 may be displayed on the displaying unit 43 of the controlling device 5 with the work number. The friction stir controlling unit 55 feedback-controls the load applying unit 33 such that the reaction load of the rotating tool F is close to a set load that is set in advance.

In this embodiment, the pressing force (the set load) of the rotating tool F is set to 2000 to 8000 N, for example. The pressing force of the rotating tool F is usually 2000 N or greater, preferably 2500 N or greater, and more preferably 3000 N. Additionally, the pressing force of the rotating tool F is usually 8000 N or smaller, preferably 6000 N or smaller, more preferably 4000 N or smaller, and particularly preferably 3500 N or smaller.

<Measuring Unit>

The measuring unit 34 is a measuring device that is attached to the outside of the rotary driving unit 32. In this embodiment, a line sensor is used as the measuring unit 34. The measuring unit 34 is capable of obtaining irregularities, a clearance, a shape, and the like around the butting portion J1 (the joining portion) by reflected light of an emitted line laser. A result measured by the measuring unit 34 is transmitted to the friction stir controlling unit 55 of the controlling device 5 while being associated with a work number and is also stored in the storing unit 44. The result measured by the measuring unit 34 may be displayed on the displaying unit 43 of the controlling device 5 with the work number.

More specifically, the measuring unit 34 can measure a step dimension h of the butting portion J1, a clearance amount D, and a ridge line position Yp of the first metallic member 101 by being moved by the robotic arm 31 along the butting portion J1 before the friction stir joining is performed. The step dimension h is a height dimension from the front surface 101b of the first metallic member 101 to the front surface 102b of the second metallic member 102. The clearance amount D is a distance from the end surface 101a of the first metallic member 101 to the end surface 102a of the second metallic member 102. As shown in FIG. 7, the ridge line position Yp has the form (a position on the XY plane) of a ridge line 101e on a top surface side facing the butting portion J1 of the first metallic member 101.

Additionally, the measuring unit 34 can measure a position Yn (a position on the XY plane: see FIG. 11) of the rotating tool F during the friction stir joining. Moreover, the measuring unit 34 can measure a position Yb (an initial position Yb0: see FIG. 9) of the rotating tool F before the friction stir joining. This initial position Yb0 is a position of the rotating tool F right before the rotating tool F is inserted into the first metallic member 101 and the second metallic member 102 when the friction stir joining is performed.

Moreover, the measuring unit 34 can measure a burr height S (an undercut) and a surface roughness Ra of the joining portion by moving along the butting portion J1 (the joining portion) after the friction stir joining. That is, the measuring unit 34 can also function as an inspecting unit for checking the state of the joining portion or the joining quality after the friction stir joining. The undercut means a state where the respective front surfaces 101b and 102b of the first metallic member 101 and the second metallic member 102 are concave (carved) more than before the joining. Note that, in this embodiment, the measuring unit 34 may measure at least either of the burr height S (the undercut) and the surface roughness Ra of the joining portion. Additionally, although the measuring unit (inspecting unit) 34 is attached to the outside of the housing 39 storing the rotary driving unit 32, the measuring unit (inspecting unit) 34 may be attached to another robotic arm, for example. Moreover, the measuring unit and the inspecting unit may be different devices.

[B-1-4. Controlling Device]

As shown in FIG. 8, the controlling device 5 is a controlling device that controls the overall operations of the conveying device 2, the fixing device 3, and the friction stir device 4. The controlling device 5 includes a computing unit (CPU (central processing unit): omitted in drawing), an inputting unit 42 such as a keyboard and a touch panel, a displaying unit 43 such as a monitor and a display, and a storing unit 44 such as a RAM (random access memory) and a ROM (read only memory).

Additionally, the controlling device 5 includes a main controlling unit 41, the conveyance controlling unit 51, the suck controlling unit 52, the temperature controlling unit 53, the clamp controlling unit 54, and the friction stir controlling unit 55. The main controlling unit 41 is a unit that controls overall the conveyance controlling unit 51, the suck controlling unit 52, the temperature controlling unit 53, the clamp controlling unit 54, and the friction stir controlling unit 55. Additionally, the main controlling unit 41 includes a determining unit (omitted in drawing) that reads a determination result of the work number from the storing unit 44 after one friction stir joining is completed and determines whether the first metallic member 101 and the second metallic member 102 (the joined metallic member 103) are determined as an out-of-numerical-range product.

The main controlling unit 41, the conveyance controlling unit 51, the suck controlling unit 52, the temperature controlling unit 53, the clamp controlling unit 54, and the friction stir controlling unit 55 are stored in the ROM as an automatic joining program. With the computing unit reading the automatic joining program from the ROM to deploy and execute in the RAM, the automatic joining program is functioned as each of the main controlling unit 41, the conveyance controlling unit 51, the suck controlling unit 52, the temperature controlling unit 53, the clamp controlling unit 54, and the friction stir controlling unit 55. The automatic joining program may be distributed by being recorded in a recording medium such as an optical disk including a CD-ROM (compact disc read only memory), a DVD-ROM (digital versatile disc read only memory), and the like; or a flash memory including a USB (universal serial bus) memory, an SD memory, and the like, or may be distributed through a communication network such as the Internet and an intranet. The controlling device 5 can obtain and execute the automatic joining program by reading the automatic joining program from the recording medium or by receiving the automatic joining program through the communication network.

Note that, in this embodiment, although the controlling units are all provided in the controlling device 5, the controlling unit may be provided for each device, or the controlling unit may be shared by the controlling device 5 and each device.

<Conveyance Controlling Unit>

The conveyance controlling unit 51 performs control to transmit the control signal to the conveying device 2 and to convey the first metallic member 101 and the second metallic member 102 to a predetermined position on the platform 21. On the other hand, when one friction stir joining ends, and the clamp units 24 is retreated, the conveyance controlling unit 51 performs control to take out the joined metallic member 103 from the platform 21.

Additionally, when the main controlling unit 41 determines that the joined metallic member 103 is once determined as an out-of-numerical-range product, the conveyance controlling unit 51 performs control to take out the joined metallic member 103 from the platform 21 and convey to the out-of-numerical-range product arrangement area 16. On the other hand, when the main controlling unit 41 determines that the joined metallic member 103 is never determined as an out-of-numerical-range product, the conveyance controlling unit 51 performs control to take out the joined metallic member 103 from the platform 21 and convey to the acceptable product arrangement area 15. Note that, the conveyance controlling unit 51 may perform control to convey the joined metallic member 103 to the same position after the friction stir joining regardless of the determination on whether it is an out-of-numerical-range product.

<Suck Controlling Unit>

After the clamp units 24 fix the first metallic member 101 and the second metallic member 102 to the platform 21, the suck controlling unit 52 performs control to transmit the control signal to the sucking unit 22 to set the sucking machine 29 to suck ON, and to suck the end portion of the second metallic member 102 fixed to the platform 21. When the friction stir joining ends, the suck controlling unit 52 performs control to set suck OFF.

<Temperature Controlling Unit>

The temperature controlling unit 53 performs control to transmit the control signal to the temperature adjusting unit 23 to activate or stop the heater so as to reach a set temperature. A predetermined numerical range for the temperature adjusting unit 23 may be set arbitrarily, and the predetermined numerical range is set to 30 to 120° C. and is preferably set to 60 to 90° C., for example.

Additionally, the temperature controlling unit 53 includes a determining unit 66. Right before one friction stir joining, the determining unit 66 determines whether the result (temperature T) transmitted from the temperature sensor 23a of the temperature controlling unit 53 is within the predetermined numerical range. Note that, the temperature T indicates the temperature of the front surface of the platform 21, which is, more specifically, the temperature of the placing portion 25.

When the temperature T is determined to be out of the predetermined numerical range, the determining unit 66 determines the first metallic member 101 and the second metallic member 102 as an out-of-numerical-range product in association with a work number. The determining unit 66 transmits the determination result to the main controlling unit 41 and also stores in the storing unit 44. The determination result may be displayed on the displaying unit 43 or may be notified by a notifying device that outputs sound and light in accordance with the determination result. Additionally, the determining unit 66 may be provided in a main control unit 41.

Note that, when the result transmitted from the temperature sensor 23a is determined to be out of the predetermined numerical range, the temperature controlling unit 53 may perform a control to heat up or cool down the placing portion 25 by controlling the heater of the temperature adjusting unit 23 such that the result transmitted from the temperature sensor 23a falls within the predetermined numerical range.

\<Clamp Controlling Unit\>

The clamp controlling unit 54 performs control to transmit the control signal to the clamp units 24 and to fix (set) the first metallic member 101 and the second metallic member 102 placed on the platform 21. Additionally, when the friction stir joining ends, the clamp controlling unit 54 performs control to transmit the control signal to the clamp units 24 and to release the fixation of the first metallic member 101 and the second metallic member 102.

Note that, when the fixation state (the step dimension h, the clearance amount D, and the temperature T) before the friction stir joining is determined to be out of the predetermined numerical range, the clamp units 24 may immediately perform control to release the fixation of the first metallic member 101 and the second metallic member 102. In this case, for example, the positions of the first metallic member 101 and the second metallic member 102 may be slightly modified by the robotic arm 11 of the conveying device 2, or the first metallic member 101 and the second metallic member 102 may be taken out from the platform 21 to arrange a new first metallic member 101 and second metallic member 102.

\<Friction Stir Controlling Unit\>

The friction stir controlling unit 55 performs control to transmit the control signal to the friction stir device 4 and to perform the friction stir joining of the first metallic member 101 and the second metallic member 102. The friction stir controlling unit 55 includes a target moving route generating unit 61, an acceptable range generating unit 62, a set moving route generating unit 65, a modified moving route generating unit 63, and a determining unit 64.

Figure 9:
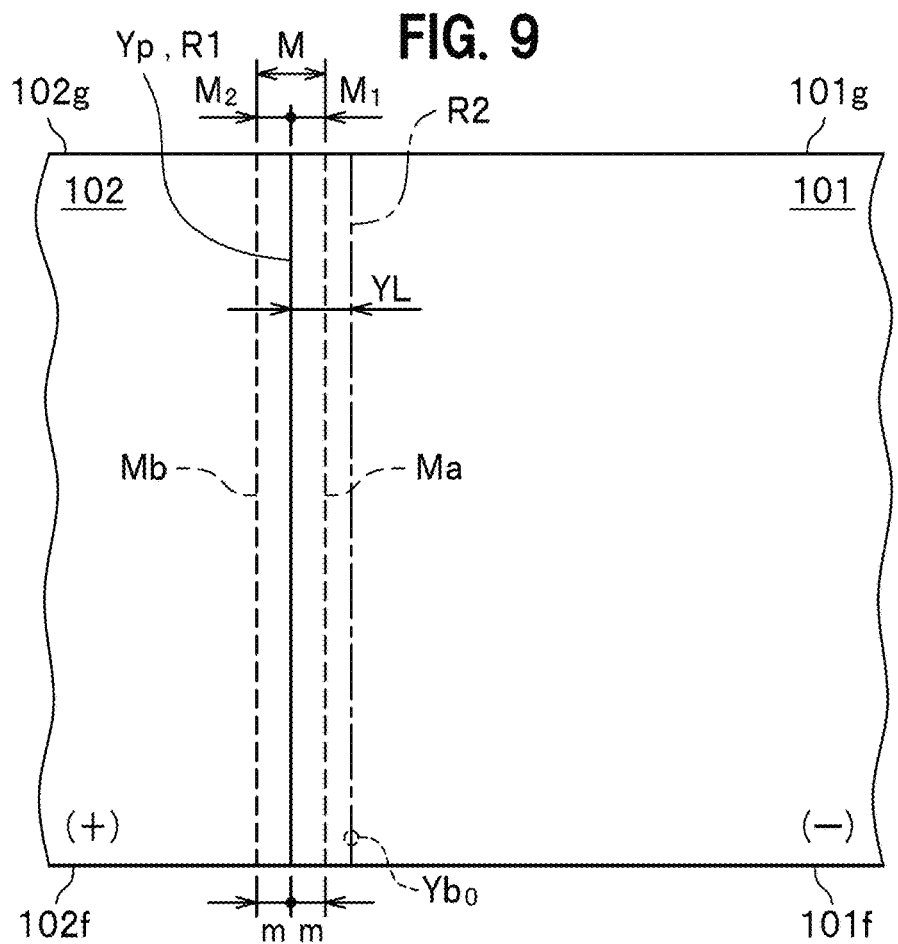
FIG. 9 is a schematic plan view for describing an acceptable range according to the first embodiment.

As shown in FIG. 9, the target moving route generating unit 61 is a unit that generates a target moving route R1 of the rotating tool F. Here, FIG. 9 is a schematic diagram showing a relationship between the target moving route R1 along which the rotating tool F moves while performing the friction stir joining and a modified moving route R2 along which the rotating tool F moves in a state with no load. The target moving route R1 is for setting a trajectory to be a target for the movement of the rotating tool F when the friction stir joining of the butting portion J1 is performed. The target moving route generating unit 61 calculates the ridge line position Yp, which is transmitted from the measuring unit 34 before the friction stir joining is performed, as the target moving route R1. The ridge line 101e of the first metallic member 101 is not necessarily a straight line because of a tolerance and the like; for this reason, the ridge line position Yp is generally a jagged line. The target moving route R1 may be the same route (a jagged route) as the ridge line position Yp or may be a straight line based on the method of least squares or the like.

The acceptable range generating unit 62 sets an acceptable range M in which the movement of the rotating tool F in the Y direction is accepted during the friction stir joining. As shown in FIG. 9, the acceptable range M is calculated as a range surrounded by boundary lines Ma and Mb having distances m, m respectively from the ridge line position Yp in the width direction, for example. More specifically, the acceptable range M is a range surrounded by the boundary lines Ma and Mb, ridge lines 101f and 101g of the first metallic member 101, and ridge lines 102f and 102g of the second metallic member 102. The size of the acceptable range M may be set arbitrarily in accordance with the accuracy and the like required in the friction stir joining, and the distance m may be set to 0.3 to 0.6 mm, for example. Particularly, it is favorable that an acceptable range $M_1$ on the first metallic member 101 side is set to be wider than an acceptable range $M_2$ on the second metallic member 102 side. Note that, the boundary lines Ma and Mb of the acceptable range M may be jagged lines in accordance with the ridge line position Yp or may be straight lines based on the method of least squares or the like. Additionally, although the boundary lines Ma and Mb are at an equal distance from the ridge line position Yp in this embodiment, the boundary lines Ma and Mb may be set at different distances.

The set moving route generating unit 65 is a unit that generates a set moving route. The set moving route is an instructing position (teaching position) to move the rotating tool F. The set moving route indicates a trajectory through which the rotating tool F passes by coordinate positions. For example, the set moving route can indicate coordinate positions of a start point and an end point of the movement of the rotating tool and also can indicate a line between the start point and the end point as the trajectory along which the rotating tool moves. The friction stir controlling unit 55 operates the robotic arm 31 by transmitting the control signal thereto based on the set moving route and thereby controls the rotating tool F to move along the trajectory indicated by the set moving route. When the rotating tool F is controlled to move along the set moving route, in some cases, depending on a situation during the joining, the rotating tool F does not pass through the coordinate positions indicated by the set moving route, and the trajectory is displaced. The set moving route is used in order to generate the modified moving route R2 by using such displacement of the trajectory of the rotating tool F.

The modified moving route generating unit 63 is a unit that generates the modified moving route R2. As with the set moving route, the modified moving route R2 is an instructing position to move the rotating tool F. Particularly, the modified moving route R2 indicates a trajectory for the rotating tool F that is controlled to move along this route when the friction stir joining of the butting portion J1 is performed. With the rotating tool F controlled to move along the modified moving route R2, the friction stir joining is performed such that the rotating tool F moves along the target moving route R1. Additionally, as described later, the modified moving route is set by using the set moving route.

Figure 10:
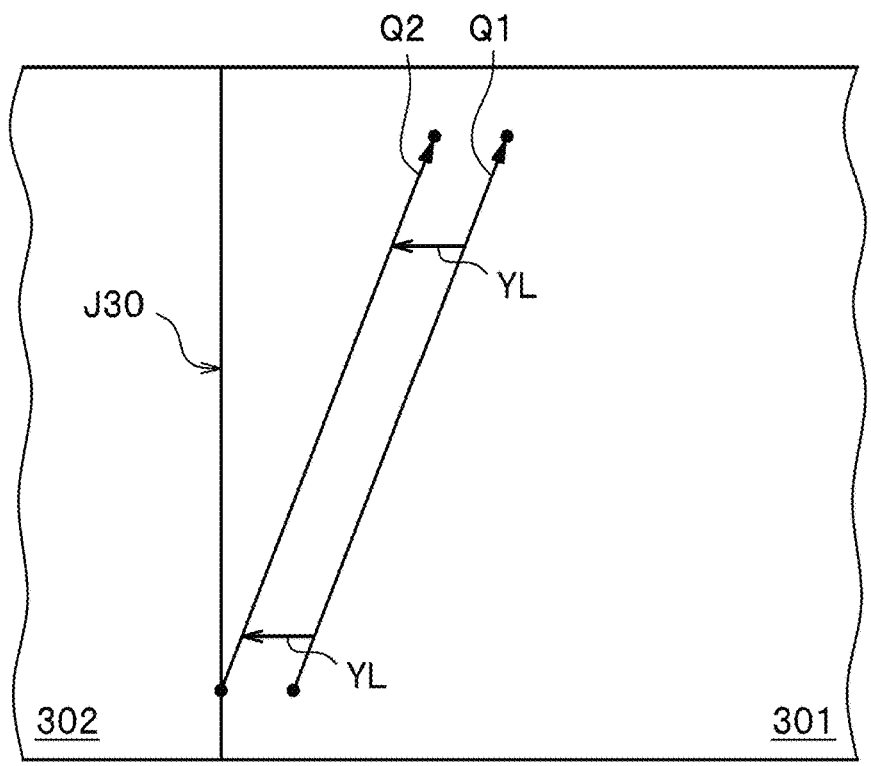
FIG. 10 is a schematic plan view for describing a difference according to the first embodiment.

Here, FIG. 10 is a schematic diagram showing a test trajectory Q1 and a test trajectory Q2. As shown in FIG. 10, before the friction stir joining is performed, a test trial to generate the modified moving route R2 is conducted by using a pair of metallic members 301 and 302. It is favorable that the metallic members 301 and 302 are made of the same or similar material and have the same or similar thickness and the like as the first metallic member 101 and the second metallic member 102 on which the friction stir joining is actually performed. That is, as with the butting portion J1 of the first metallic member 101 and the second metallic member 102, a butting portion J30 is formed by butting the metallic members 301 and 302 to each other. To be specific, in this test trial, it is favorable to use two metallic members 301 and 302 having front surfaces at different height positions, which are, comparing with the first metallic member 101 and the second metallic member 102, formed of metal of a similar material type and formed by butting plate-shaped members having a similar plate-thickness dimension to each other to form a step having a similar height.

The test trajectory Q1 indicates a traveling trajectory along which the friction stir device 4 is moved as a trial along the set moving route set in advance without inserting the rotating tool F into the metallic members 301 and 302. That is, the test trajectory Q1 is a traveling trajectory along which the robotic arm 31 of the friction stir device 4 is moved in a state with no load. In this case, as long as the robotic arm 31 is moved in a state with no load without the rotating tool is inserted in the metallic members 301 and 302, the robotic arm 31 may be moved without attaching the rotating tool F. Note that, in this specification, the "traveling trajectory" may be simply referred to as a "trajectory".

On the other hand, the test trajectory Q2 is a trajectory of the friction stir performed as a trial in accordance with the set moving route set in advance as with that for the test trajectory Q1 while the rotating tool F is inserted in the metallic members 301 and 302. Even though both the test trajectory Q1 and test trajectory Q2 are moved in accordance with the same set moving route, a predetermined difference (difference YL) occurs with the friction stir actually performed. In the difference in this case, the test trajectory Q2 is displaced in a direction orthogonal to the joining direction in substantially parallel with respect to the test trajectory Q1 by the difference YL.

It is inferred that this is because the position of the rotating tool F is displaced from the test trajectory Q1 to the test trajectory Q2 due to a flexure in the robotic arm 31 with the rotating tool F put in contact with the two metallic members butted to each other such that the front surfaces are at different height positions. Additionally, it is inferred that the tendency of the robotic arm 31, the material resistance of the metallic member, and the like also affect. For this reason, when the test trajectory Q2 is desired to travel in the friction stir joining, the set moving route is required to be set in consideration of the difference YL. The difference YL can be calculated in advance based on performing of a test trial in which the friction stir joining is performed while the rotating tool F is inserted in the metallic member and a test trial performed in a state with no load, before the friction stir joining of the first metallic member 101 and the second metallic member 102. More specifically, the difference YL can be calculated from a difference (an average of differences) in traveling trajectories between the test trajectory Q2 of a case where the rotating tool F is moved while the friction stir joining is performed while the rotating tool F is inserted in the metallic member in which the butting portion is formed as with the butting portion J1 of the first metallic member 101 and the second metallic member 102 and the test trajectory Q1 of a case where the rotating tool F is moved in a state with no load without being inserted in the metallic member. Note that, it is favorable that the set moving route for obtaining the test trajectory Q1 and the test trajectory Q2 is set such that the test trajectory Q2 passes through the butting portion J30 of the butted metallic members. Particularly, it is favorable that the set moving route is set such that the rotating tool F passes through the butting portion J30 near a start position of the test trajectory Q2 and moves along the butting portion J30 toward the thick plate metallic member side. When a test trial is conducted, the test trajectories Q1 and Q2 may be obtained by inserting the rotating tool F into at least either of the metallic members 301 and 302.

As shown in FIG. 9, the modified moving route generating unit 63 calculates the modified moving route R2 based on the target moving route R1 and the difference YL. In this embodiment, as shown in FIG. 10, since the test trajectory Q2 along which the friction stir joining is performed while the rotating tool F is inserted is likely to be displaced in substantially parallel from the test trajectory Q1 in a state with no load toward the left side (the thin plate side) by the difference YL, the modified moving route R2 is set at a position that is displaced by the difference YL to the right side (the thick plate (first metallic member 101) side) with respect to the target moving route R1. In other words, the modified moving route generating unit 63 sets the modified moving route R2 at a position at which the target moving route R1 is displaced in substantially parallel, the displacement being in a direction opposite of the direction in which the test trajectory Q2 is displaced, by a length (the difference YL) of the displacement of the test trajectory Q2, which is a traveling trajectory in a state where the tool is inserted, in substantially parallel to the test trajectory Q1, which is a traveling trajectory in a state with no load. That is, the difference YL is compensated with the friction stir controlling unit 55 controlling the rotating tool F to move along the modified moving route R2, and thus the rotating tool F is moved on the target moving route R1 while the friction stir joining is performed.

Note that, when the difference YL between the test trajectory Q1 and the test trajectory Q2 is small or nothing, the rotating tool F may be moved based on the target moving route R1 without setting the modified moving route. Additionally, the obtainment (calculation) of the difference YL is not necessarily performed for each friction stir joining and, for example, when the rotating tool F is to be replaced, it is favorable to calculate the difference YL and the modified moving route R2 by obtaining the plate-thickness dimension, the material type, the height positions of the surfaces and the like of the first metallic member 101 and the second metallic member 102 in accordance with a case of changing them.

It is favorable that, when the determining unit 64 determines that the position of the rotating tool F during the friction stir joining is out of the acceptable range M, the modified moving route generating unit 63 calculates the modified moving route R2 in which the position of the rotating tool F is reset in accordance with the position of the rotating tool F during the friction stir joining. Specifically, in a portion in which the position of the rotating tool F in the Y direction during the friction stir joining is on the first metallic member 101 side, the modified moving route R2 is reset such that the position of the rotating tool F in this portion is on the second metallic member 102 side. Likewise, in a portion in which the position of the rotating tool F in the Y direction during the friction stir joining is on the second metallic member 102 side, the modified moving route R2 is reset such that the position of the rotating tool F in this portion is on the first metallic member 101 side.

As shown in FIG. 8, the determining unit 64 is a unit that determines whether the result transmitted from the measuring unit 34 is within a predetermined numerical range. That is, the determining unit 64 determines whether each of the step dimension h, the clearance amount D, the temperature T, and the initial position Yb0 of the rotating tool F before the friction stir joining is within the predetermined numerical range. Additionally, the determining unit 64 determines whether the position Yn of the rotating tool F during the friction stir joining is within a predetermined numerical range (the acceptable range M). Particularly, the determining unit 64 determines whether the right and left positions, with respect to the advancing direction, of the position Yn of the rotating tool F during the friction stir joining are within the predetermined numerical range (the acceptable range M). Moreover, the determining unit 64 determines whether both the burr height S and surface roughness Ra of the joining portion after the friction stir joining are within a predetermined numerical range. Furthermore, the determining unit 64 determines whether the reaction load in the axial direction applied to the rotating tool F is within a predetermined numerical range. The determining unit 64 may perform determination on any one of the above determination items, or may perform determination on a combination of two or more of the above determination items. For example, the determining unit 64 may determine whether at least either of the position Yn of the rotating tool F during the friction stir joining and the load during the friction stir joining is within the predetermined numerical range. In this embodiment, cases where determination is performed on the set state (the step dimension h, the clearance amount D, the temperature T, and the initial position Yb0 of the rotating tool F) before the friction stir joining, the position Yn of the rotating tool F during the friction stir joining, and the burr height S and the surface roughness Ra of the joining portion after the friction stir joining are exemplified and described.

<Step Dimension h>

The determining unit 64 determines whether the result (the step dimension h (mm)) transmitted from the measuring unit 34 is within the predetermined numerical range by moving the measuring unit 34 along the butting portion J1 before the friction stir joining is performed.

In this embodiment, the plate-thickness dimension of the first metallic member 101 is 2.0 mm, and the plate-thickness dimension of the second metallic member 102 is set to 1.2 mm; accordingly, the set step dimension is 0.8 mm. The predetermined numerical range of the step dimension h may be set arbitrarily and, for example, when the set step dimension h of the first metallic member 101 and the second metallic member 102 is 0.8 mm, the predetermined numerical range can be set to $0.75 \leq h \leq 0.93$. The step dimension h as a determination target may be all the numbers obtained by the measuring unit 34, may be an average value of the step dimensions from the entire joining length, may be the maximum value thereof, or may be respectively extracted and determined multiple step dimensions at predetermined intervals.

When the step dimension h is determined to be out of the predetermined numerical range, the determining unit 64 determines the first metallic member 101 and the second metallic member 102 as an out-of-numerical-range product in association with a work number. The determining unit 64 transmits the determination result to the main controlling unit 41 and also stores in the storing unit 44. The determination result may be displayed on the displaying unit 43 or may be notified by a notifying device that outputs sound and light in accordance with the determination result.

<Clearance Amount D>

Additionally, the determining unit 64 determines whether the clearance amount D (mm) transmitted from the measuring unit 34 is within the predetermined numerical range by moving the measuring unit 34 along the butting portion J1 before the friction stir joining is performed. The predetermined range of the clearance amount D may be set arbitrarily and can be set to $0 \leq D \leq 0.4$, for example. The clearance amount D to be determined may be all the numbers obtained by the measuring unit 34, may be an average value of the clearance amounts from the entire joining length, may be the maximum value thereof, or may be respectively extracted and determined multiple clearance amounts at predetermined intervals.

When the clearance amount D is determined to be out of the predetermined numerical range, the determining unit 64 determines the first metallic member 101 and the second metallic member 102 as an out-of-numerical-range product in association with a work number. The determining unit 64 transmits the determination result to the main controlling unit 41 and also stores in the storing unit 44. The determination result may be displayed on the displaying unit 43 or may be notified by a notifying device that outputs sound and light in accordance with the determination result.

<Initial Position>

Additionally, the determining unit 64 determines whether the initial position Yb0 transmitted from the measuring unit 34 is within the predetermined numerical range with respect to the start position of the modified moving route R2 by measuring the initial position Yb0 of the rotating tool F by the measuring unit 34 before the friction stir joining is performed. The predetermined range of the initial position Yb0 may be set arbitrarily and can be set to be within a range of 0 mm or more and 0.3 mm or less around the start position of the modified moving route R2 as the center, for example. Particularly, the predetermined range may be set to be within a range of 0 mm or more and 0.3 mm or less in the Y direction around the start position of the modified moving route R2 as the center.

When the initial position Yb0 is determined to be out of the predetermined numerical range, the determining unit 64 determines the first metallic member 101 and the second metallic member 102 as an out-of-numerical-range product in association with a work number. The determining unit 64 transmits the determination result to the main controlling unit 41 and also stores in the storing unit 44. The determination result may be displayed on the displaying unit 43 or may be notified by a notifying device that outputs sound and light in accordance with the determination result.

<Acceptable Range M>

Figure 11:
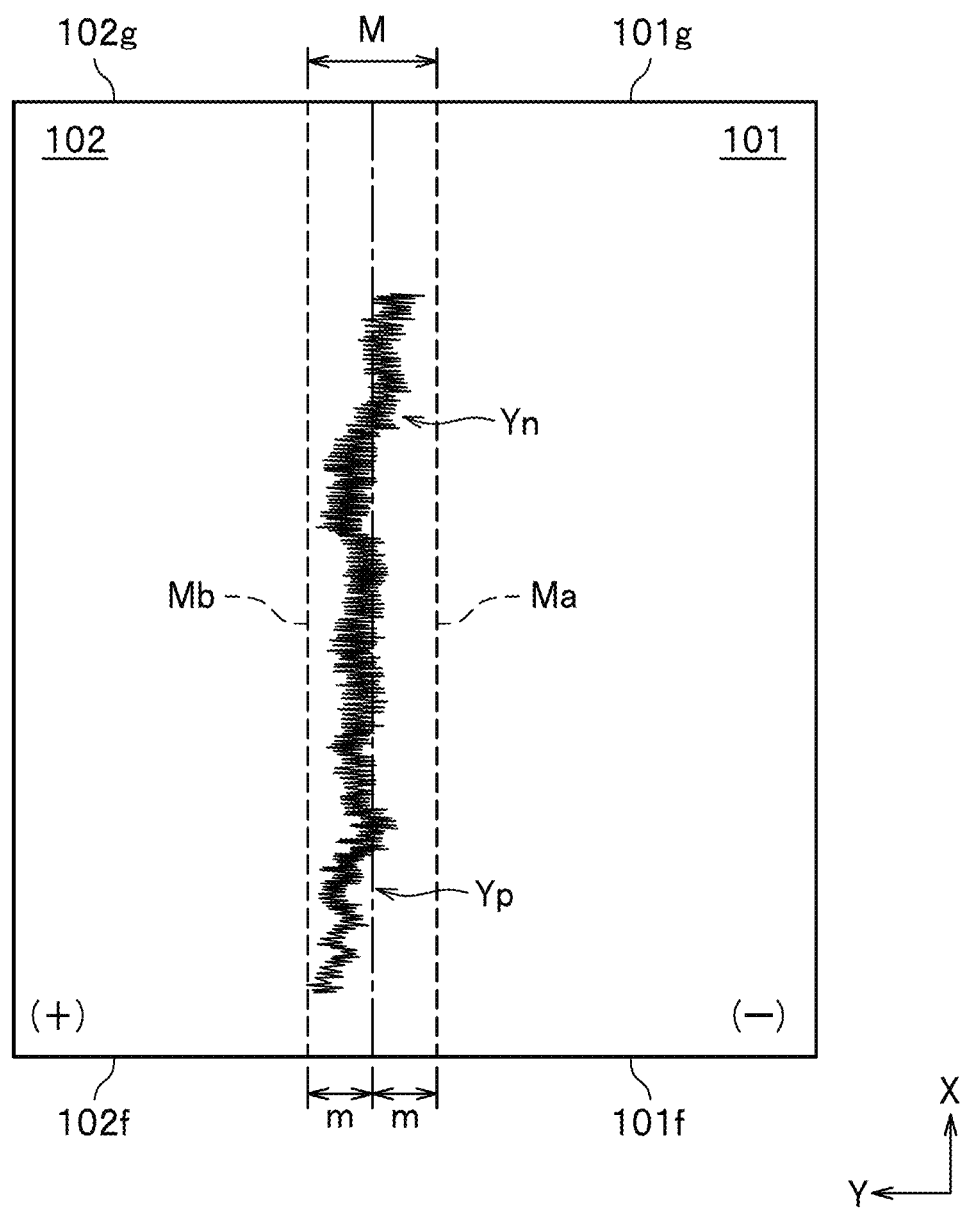
FIG. 11 is a schematic plan view for describing the position of the rotating tool during the friction stir joining according to the first embodiment.

Additionally, the determining unit 64 determines whether the position Yn of the rotating tool F transmitted from the measuring unit 34 during the friction stir joining is within the acceptable range (numerical range) M. FIG. 11 is a schematic diagram showing the position Yn (the traveling trajectory) of the rotating tool F after the friction stir joining is performed. In FIG. 11, for the sake of convenience for description, the scale in the X direction and the Y direction is changed for easy understanding of the movement in the Y direction. In FIG. 11, the rotating tool F is moved from the lower side to the upper side in the diagram, and the position Yn of the rotating tool F is moved within the acceptable range M.

The range of the acceptable range M may be set arbitrarily and can be set to a region surrounded with respect to the entire length direction of the ridge line position Yp at positions of 0.6 mm (m=0.6) toward the first metallic member 101 side and 0.3 mm (m=0.3) toward the second metallic member 102 side in the Y direction from the ridge line position Yp as the center, for example.

When the position Yn of the rotating tool F during the friction stir joining is determined to be out of the acceptable range (numerical range) M, the determining unit 64 determines the first metallic member 101 and the second metallic member 102 as an out-of-numerical-range product in association with a work number. The determining unit 64 transmits the determination result to the main controlling unit 41 and also stores in the storing unit 44. The determination result may be displayed on the displaying unit 43 or may be notified by a notifying device that outputs sound and light in accordance with the determination result.

<Burr Height S and Surface Roughness Ra>

Additionally, after the friction stir joining, the determining unit 64 determines whether both the burr height S and surface roughness Ra obtained by moving the measuring unit (the inspecting unit) 34 of the friction stir device 4 along the joining portion (a plasticized region W) are within the predetermined numerical range. The burr height S may be set arbitrarily and can be set to 0≤S≤0.1 mm, for example. Additionally, the surface roughness Ra may be set arbitrarily and can be set to 0≤Ra≤5.0 µm, for example. The burr height S and surface roughness Ra to be determined may be all the numbers obtained by the measuring unit 34, may be an average value from the entire joining length, may be the maximum value thereof, or may be respectively extracted and determined multiple burr heights S and surface roughness Ra at predetermined intervals.

Figure 12:
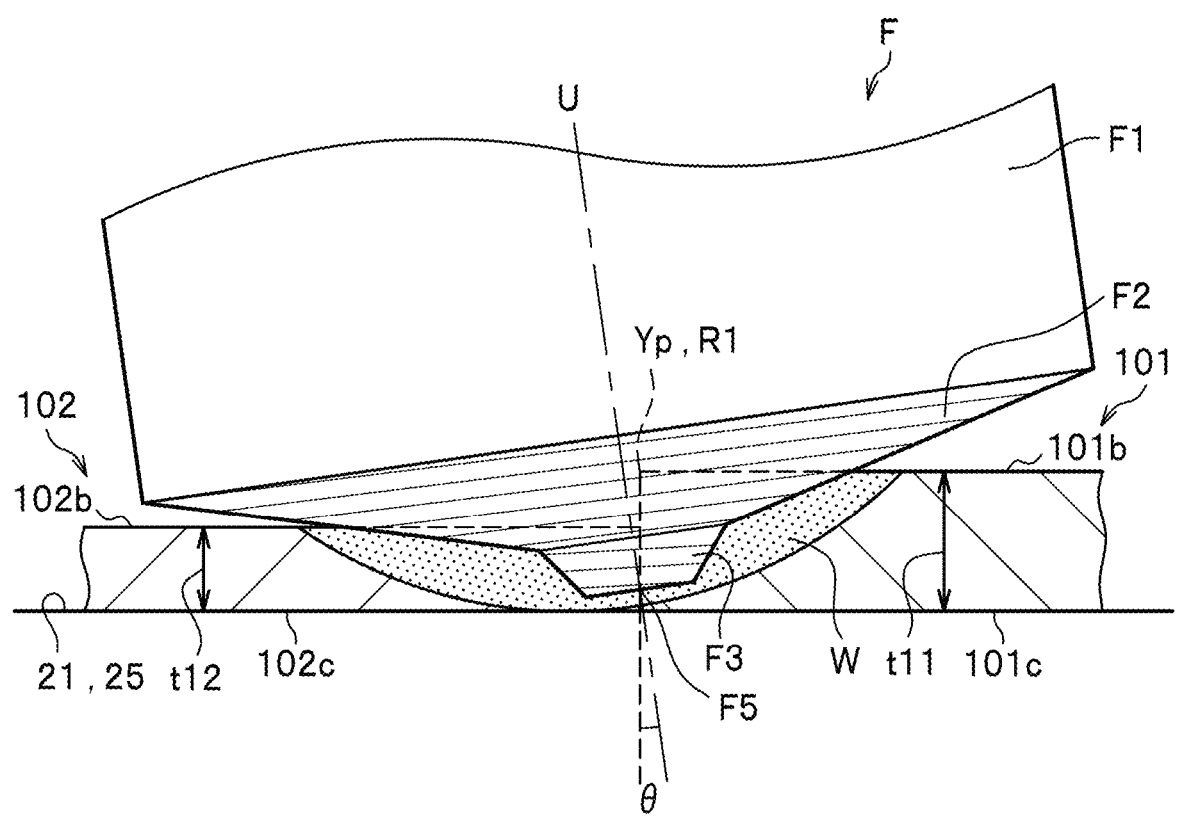
FIG. 12 is a cross-sectional view showing an insertion state of the rotating tool according to the first embodiment.

FIG. 12 is a cross-sectional view showing an insertion state of the rotating tool according to this embodiment. As shown in FIG. 12, during the friction stir joining, the rotating tool F is moved while being tilted with respect to a vertical line at a predetermined aiming angle θ toward the second metallic member 102 side. The plasticized region W is formed along the traveling trajectory of the rotating tool F. The aiming angle θ may be set arbitrarily. In this embodiment, the aiming angle θ is set such that the center F5 of the flat surface of the tip end side pin F3 is overlapped with the target moving route R1 when viewed from above, for example.

The insertion depth during the friction stir joining may be set arbitrarily and, in this embodiment, the insertion depth is set such that the outer periphery of the base end side pin F2 is put in contact with each of the front surface 101b of the first metallic member 101 and the front surface 102b of the second metallic member 102 while the tip end side pin F3 is not put in contact with the platform 21.

In this embodiment, the rotating direction and the advancing direction of the rotating tool F is set such that the rotating tool F is rotated clockwise, and the first metallic member 101 is positioned on the advancing direction right side. The rotating direction and the advancing direction of the rotating tool F may be set arbitrarily and, in this embodiment, the rotating direction and the advancing direction are set such that, in the plasticized region W formed along the traveling trajectory of the rotating tool F, the second metallic member 102 side is a shear side, and the first metallic member 101 side is a flow side.

Note that, the shear side (Advancing side) means a side on which the relative speed of the outer circumference of the rotating tool with respect to the joined portion is a value obtained by adding the magnitude of the moving speed to the magnitude of the tangential speed of the outer circumference of the rotating tool. On the other hand, the flow side (Retreating side) means a side on which the rotating tool turns in the opposite direction of the moving direction of the rotating tool and thus the relative speed of the rotating tool with respect to the joined portion is low.

Note that, in the automatic joining system 1 in this embodiment, for example, when the friction stir joining is performed, the tilt angle of the rotating tool F may be tilted frontward or rearward with respect to the advancing direction at a predetermined angle.

[B-2. Operation Flow]

Figure 13:
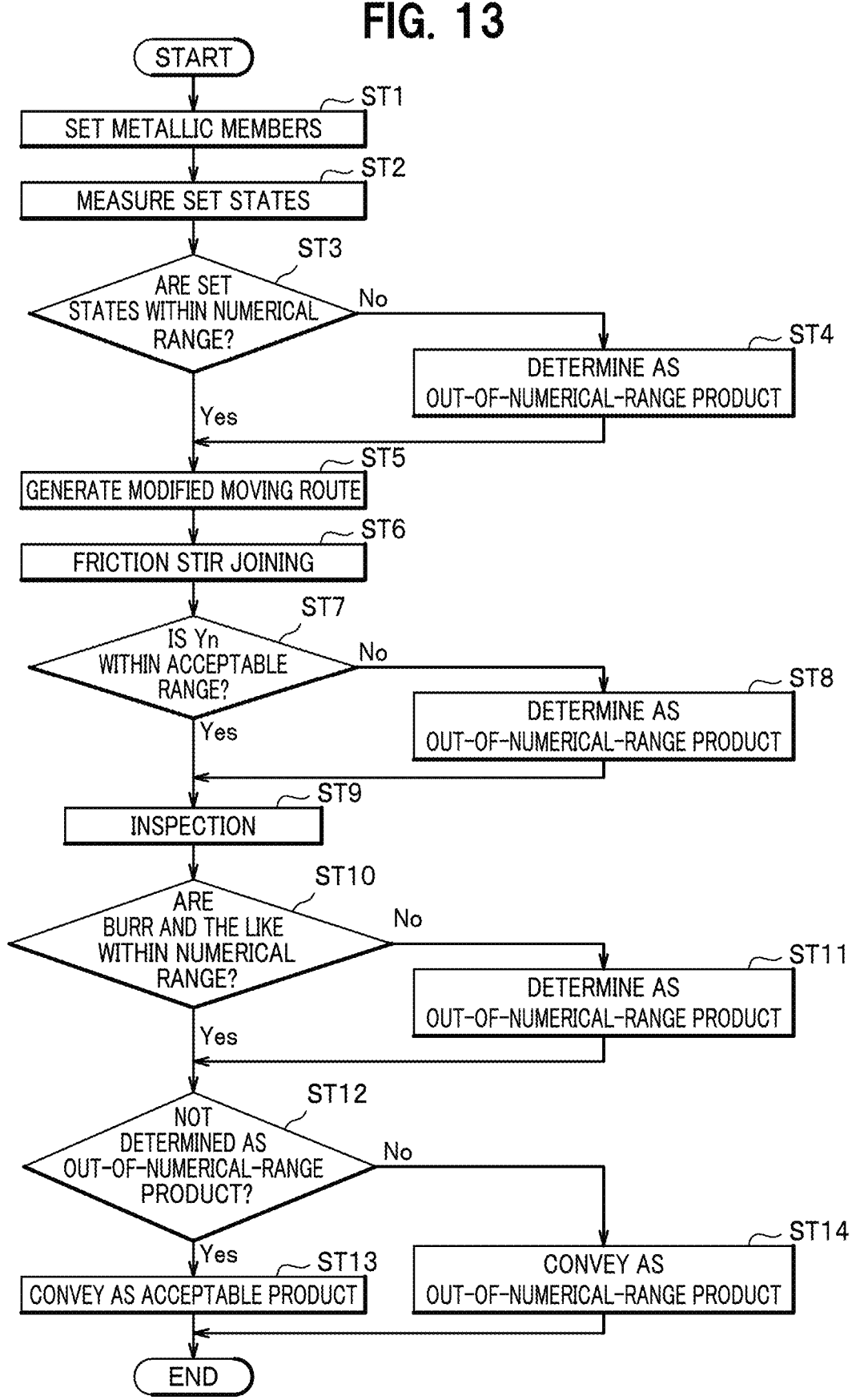
FIG. 13 is a flowchart showing an example of operations of the automatic joining system according to the first embodiment.

Next, an example of the operation flow of the automatic joining system 1 according to this embodiment is described. FIG. 13 is a flowchart showing an example of operations of the automatic joining system according to this embodiment. In the automatic joining system 1 according to this embodiment, the friction stir joining is automatically performed based on the control signal transmitted to each device from the controlling device 5.

As shown in FIG. 13, in step ST1, the conveyance controlling unit 51 controls the conveying device 2 to convey the first metallic member 101 and the second metallic member 102 to a predetermined position on the fixing device 3. The first metallic member 101 and the second metallic member 102 are fixed by the clamp units 24, and the end portion of the second metallic member 102 is sucked by the sucking unit 22.

In step ST2, the friction stir controlling unit 55 moves the measuring unit 34 of the friction stir device 4 along the butting portion J1 to measure the fixation state (the set state). That is, the step dimension h, the clearance amount D, and the ridge line 101e of the first metallic member 101 are measured by the measuring unit 34. Additionally, the initial position Yb0 of the rotating tool F is measured by the measuring unit 34. The measuring unit 34 transmits the measurement result to the friction stir controlling unit 55. Moreover, the temperature sensor 23a of the temperature adjusting unit 23 transmits the measurement result to the temperature controlling unit 53.

In step ST3, the determining unit 66 of the temperature controlling unit 53 and the determining unit 64 of the friction stir controlling unit 55 determine respectively whether the set states of the first metallic member 101 and the second metallic member 102 are within the predetermined numerical range. When the determining units 64 and 66 determine that all the step dimension h, clearance amount D, temperature T, and initial position Yb0 of the rotating tool F are within the numerical range (YES in step ST3), the process proceeds to step ST5. When at least one of the step dimension h, the clearance amount D, the temperature T, and the initial position Yb0 of the rotating tool F is determined to be out of the numerical range (NO in step ST3), the determining unit 64 or the determining unit 66 determines the first metallic member 101 and the second metallic member 102 as an out-of-numerical-range product in association with a work number (step ST4), and the process proceeds to step ST5.

In step ST6, the friction stir controlling unit 55 controls the friction stir device 4 such that the friction stir joining is performed by moving the rotating tool F, which rotates at a predetermined rotating speed, while being inserted in the first metallic member 101 and the second metallic member 102. Specifically, the friction stir controlling unit 55 controls the rotating tool F to move along the modified moving route R2. In this process, with the insertion of the rotating tool F in the first metallic member 101 and the second metallic member 102, the displacement of the difference YL occurs from the initial position Yb0 before the insertion, which is near the start position of the modified moving route R2, toward the second metallic member 102 side, and the position of the rotating tool F is moved to near the ridge line position Yp. Thus, the friction stir joining is performed with the rotating tool F moved along the target moving route R1.

In step ST7, the determining unit 64 of the friction stir controlling unit 55 determines whether the position Yn of the rotating tool F during the friction stir joining is within the acceptable range (numerical range) M. When the determining unit 64 determines that the position Yn of the rotating tool F is within the acceptable range M (YES in step ST7), the process proceeds to step ST9. When at least a part of the position Yn of the rotating tool F during the friction stir joining is determined to be out of the acceptable range M (NO in step ST7), the determining unit 64 determines that the first metallic member 101 and the second metallic member 102 as an out-of-numerical-range product in association with a work number (step ST8), and the process proceeds to step ST9.

In step ST9, after the friction stir joining ends, the friction stir controlling unit 55 measures the burr height S and the surface roughness Ra by moving the measuring unit 34 of the friction stir device 4 along the butting portion J1.

In step ST10, the determining unit 64 of the friction stir controlling unit 55 determines whether both the burr height S and surface roughness Ra after the friction stir joining are within the predetermined numerical range. When both the burr height S and surface roughness Ra are determined to be within the predetermined numerical range (YES in step ST10), the process proceeds to step ST12. When at least either of the burr height S and the surface roughness Ra is determined to be out of the predetermined numerical range (NO in step ST10), the determining unit 64 determines the joined metallic member 103 as an out-of-numerical-range product associate with a work number (step ST11), and the process proceeds to step ST12.

In step ST12, the main controlling unit 41 determines whether the determination to be an out-of-numerical-range product is made during one friction stir joining step. When the main controlling unit 41 determines that the determination to be an out-of-numerical-range product is never made (YES in step ST12), the process proceeds to step ST13. When the main controlling unit 41 determines that the determination to be an out-of-numerical-range product is made at least once (NO in step ST12), the process proceeds to step ST14.

In step ST13, the conveyance controlling unit 51 controls the conveying device 2 to take out the joined metallic member 103 and arrange the joined metallic member 103 in the acceptable product arrangement area 15 (see FIG. 6), and the process ends.

In step ST14, the conveyance controlling unit 51 controls the conveying device 2 to take out the joined metallic member 103 and arrange the joined metallic member 103 in the out-of-numerical-range product arrangement area 16, and the process ends.

Although an example of the operation flow of this embodiment is described above, it is able to make a proper change. For example, when there is a failure in the set state in step ST3, that is, when the step dimension h and the clearance amount D are out of the predetermined numerical range, the clamp units 24 may be released and, for example, modification of the positions of the first metallic member 101 and the second metallic member 102 may be made by the robotic arm 11, or the first metallic member 101 and the second metallic member 102 may be taken out from the fixing device 3 to arrange a new first metallic member 101 and second metallic member 102. Additionally, in step ST3, when the initial position Yb0 of the rotating tool F is out of the predetermined numerical range, adjustment of the position of the rotating tool F may be made.

Additionally, although the step dimension h, the clearance amount D, the temperature T, and the initial position Yb0 of the rotating tool F are determined in step ST3, at least one of the above may be the determination target. Moreover, when the temperature T is determined to be out of the predetermined numerical range in step ST3, the process may proceed to step ST5 after the temperature adjusting unit 23 heats up or cools down the temperature T to be within the predetermined numerical range. Note that, the determination and the heat up or cool down of the temperature T by the temperature adjusting unit 23 may be performed during the friction stir joining step.

Furthermore, when it is determined as NO in step ST3 and step ST7, the automatic joining system 1 may be stopped, the determination result may be displayed on the displaying unit 43, or, furthermore, the determination result may be notified by a notifying device that outputs sound and light in accordance with the determination result.

Additionally, although it is omitted in the description of the operation flow with reference to the flowchart in FIG. 13, it is favorable that the difference YL is obtained prior to the generation of the modified moving route R2 by the modified moving route generating unit 63 in step ST5. First, in the obtainment of the difference YL, the target moving route generating unit 61 sets the target moving route R1, and the set moving route generating unit 65 generates the set moving route. Next, in accordance with the generated set moving route, the test trajectory Q1 along which the rotating tool F is moved in a state with no load without being inserted in the metallic members 301 and 302 and the test trajectory Q2a along which the rotating tool F is moved while being inserted in the metallic members 301 and 302 and while the friction stir joining is performed are respectively obtained. Then, the difference YL is obtained from the difference between the test trajectory Q1 and the test trajectory Q2. The obtainment of the difference YL may be performed at a timing before step ST5, and it is preferred to perform before step ST1 in which the first metallic member 101 and the second metallic member 102 are set.

[B-3. Operation and Effect]

Essentially, it is favorable that the ridge line 101e (see FIG. 7) of the first metallic member 101 is a straight line; however, due to a tolerance and the like, the ridge line 101e is not strictly a straight line. Additionally, when the first metallic member 101 and the second metallic member 102 are conveyed by the conveying device 2 and fixed to the platform 21, the fix position (set position) may be deviated. Accordingly, even though the rotating tool F is moved rectilinearly to follow the reference position Y0 (see FIG. 6) set on the platform 21, the rotating tool F may be deviated from the actually set butting portion J1, and the joining quality may be deteriorated. Particularly, when the height positions of the front surfaces 101b and 102b of the first metallic member 101 and the second metallic member 102 are different like this embodiment, there is a tendency that a failure occurs even with a slight deviation of the joining position.

However, through the consideration of the present inventors, it is found out that the trajectory of the position at which the rotating tool F actually moves when the friction stir joining of the butting portion J1 is performed is displaced toward the second metallic member 102 side (the thin plate side) substantially parallel with respect to the trajectory of the position at which the movement of the rotating tool F is controlled. Mainly, it is considered that such substantially parallel displacement occurs due to the set states of the two metallic members butted to each other such that the surfaces have different height positions. To be specific, in the first metallic members 101 and 301 and the second metallic members 102 and 302, there are formed the butting portions J1 and J30 provided with a step formed by butting the end surfaces with each other such that the surfaces of the first metallic members 101 and 301 are higher than the surfaces of the second metallic members 102 and 302. In such a set state, when the friction stir joining is performed while the rotating tool F is inserted, the position of the rotating tool F is moved toward the second metallic members 102 and 302 side on the thin plate side over the entire joining length with the rotating tool F receiving reactions from the first metallic members 101 and 301 on the thick plate side. It is considered that the substantially parallel displacement thus occurs.

According to the automatic joining system 1 according to this embodiment, the target moving route R1 of the rotating tool F is set based on the ridge line position Yp of the first metallic member 101 measured before the friction stir joining is performed, and also the modified moving route R2 is set at the position displaced toward the first metallic member 101 side (thick plate side) in substantially parallel with respect to the target moving route R1. Then, with the rotating tool F controlled to move along the modified moving route R2, it is possible to perform the friction stir joining while the rotating tool F is along the target moving route R1. Thus, with the rotating tool F controlled, based on the ridge line position Yp of each first metallic member 101 being set, to move to the position at which the displacement that occurs when the friction stir joining of the butting portion J1 is performed is compensated, it is possible to set easily an accurate moving route in which the displacement of the rotating tool F is inhibited. With this, the joining quality can be enhanced. Particularly, in this embodiment, based on the length of the difference YL between the test trajectory Q2, which is the traveling trajectory while the tool is inserted, and the test trajectory Q1, which is the traveling trajectory in a state with no load, the modified moving route R2 is set at the position at which the target moving route R1 is displaced in substantially parallel. With this, a moving route in which the substantially parallel displacement of the traveling trajectory of the rotating tool F that occurs depending on the set states of the metallic members 101 and 102 is inhibited is set, and the joining quality can be enhanced.

Additionally, since the robotic arm 31 has a flexure, tendency, and the like of the machine, and there is also a resistance that the rotating tool F receives from the first metallic member 101 and the second metallic member 102, the route along which the rotating tool F actually moves may be deviated from the target moving route R1, with respect to the modified moving route R2 set by the controlling device 5. In this regard, in this embodiment, with the modified moving route R2 set based on the target moving route R1 based on the ridge line position Yp and the difference YL calculated in advance, the route along which the rotating tool F actually moves can be set more accurately. In this case, according to the target moving route R1 or the modified moving route R2 in this embodiment, the rotating tool F can be moved at a proper position in accordance with the first metallic member 101 and the second metallic member 102. With this, the joining quality can be further enhanced.

Additionally, according to the automatic joining system 1 according to this embodiment, the controlling device 5 sets the set moving route. Then, based on the difference between the traveling trajectory along which the rotating tool F is controlled to move along the set moving route while being inserted and while the friction stir joining is performed and the traveling trajectory along which the rotating tool F is controlled to move along the set moving route in a state with no load, the controlling device 5 calculates the modified moving route R2 at the position at which the target moving route R1 is displaced toward the first metallic member 101 side in substantially parallel by the difference YL. Thus, since the difference YL is obtained by comparing the traveling trajectory of a case where the friction stir device 4 is moved in a state with no load with the traveling trajectory of the movement while the friction stir joining is performed, it is possible to compensate an effect that occurs when the friction stir device 4 is operated actually.

Moreover, with the friction stir joining performed while the rotating tool F is tilted at the aiming angle θ toward the second metallic member 102 side on the thin plate side and while the plastic fluidized material is pressed by the stepped bottom surface F21a of the pin step portion F21 of the base end side pin F2, it is possible to prevent occurrence of a burr and occurrence of an undercut and also possible to clean up the joining front surfaces.

More specifically, with the plastic fluidized material pressed by putting the outer periphery of the base end side pin F2 in contact with the front surfaces 101b and 102b of the first metallic member 101 and the second metallic member 102, it is possible to inhibit occurrence of a burr. Additionally, since the plastic fluidized material can be pressed by the outer periphery of the base end side pin F2, it is possible to remove or reduce a stepped concave groove formed on the joining front surfaces (front surfaces 101b and 102b) and also possible to remove or reduce a bulging portion formed beside the step concave groove. Moreover, since the stepwise pin step portion F21 of the base end side pin F2 is shallow and has a wide exit, the plastic fluidized material flows out easily to the outside the pin step portion F21 while the plastic fluidized material is pressed by the stepped bottom surface F21a. For this reason, even when the plastic fluidized material is pressed by the base end side pin F2, the plastic fluidized material is unlikely to be attached to the outer periphery of the base end side pin F2. Therefore, it is possible to reduce the surface roughness Ra and also possible to stabilize the joining quality favorably.

Furthermore, when the step dimension h is out of the predetermined numerical range, there is a risk that the burr height S may be reduced, and an undercut may occur. Additionally, when the clearance amount D is out of the predetermined numerical range, there is a risk that the burr height S may be reduced, and an undercut may occur. In this regard, according to this embodiment, when either the step dimension h or the clearance amount D obtained by the measuring unit 34 before the friction stir joining is out of the predetermined numerical range, for example, it is possible to perform the friction stir joining favorably in a proper set state by resetting the first metallic member 101 and the second metallic member 102 to the fixing device 3. Moreover, in the case of being out of the predetermined numerical range, for example, with the first metallic member 101 and the second metallic member 102 (the joined metallic member 103) determined as an out-of-numerical-range product, it is possible to perform the quality management easily.

In this case, even when the movement is controlled by setting the moving route of the rotating tool, in a case of performing the friction stir joining actually, the traveling trajectory of the rotating tool may be changed, and the rotating tool may not move along the ridge line position. For example, depending on the friction stir device 4, especially the robotic arm 31, the displacement amount of the rotating tool F for the target moving route R1 may be changed. Additionally, depending on the robotic arm 31, the tilt in the moving direction of the rotating tool F with respect to the ridge line position Yp may be changed, or the traveling trajectory of the rotating tool F may be changed partially. In addition to the above, depending on wear of the rotating tool F and a damage of the platform 21, the traveling trajectory of the rotating tool F may be changed. Moreover, the traveling trajectory of the rotating tool F may be changed also when the first metallic member 101 and the second metallic member 102 and the butting conditions thereof are changed.

According to the automatic joining system 1 according to this embodiment, since the determining unit 64 determines whether the position Yn of the rotating tool F moving actually is within the acceptable range (predetermined numerical range) M during the friction stir joining, it is possible to further improve the joining quality.

Additionally, when the position of the rotating tool F during the friction stir joining is determined to be out of the acceptable range M, the modified moving route generating unit 63 calculates the modified moving route R2 in which the position of the rotating tool F is reset in accordance with the position of the rotating tool F during the friction stir joining. With this, by feeding back information during the friction stir joining based on the position Yn of the rotating tool F moving actually, it is possible to modify more accurately the traveling trajectory of the rotating tool F and to further improve the joining quality.

Moreover, after the friction stir joining, with the burr height S and the surface roughness Ra of the joining portion measured by the inspecting unit (that is used as also the measuring unit 34 in this embodiment) after the friction stir joining, it is possible to further enhance the joining quality.

That is, according to the automatic joining system 1 in this embodiment, since all the numbers on which the friction stir joining is performed can be monitored, and the quality inspection can be conducted on all the numbers, it is possible to perform the quality management easily. Additionally, with the set state (the step dimension h, the clearance amount D, the temperature T, and the initial position Yb0 of the rotating tool F) before the friction stir joining added to the determination elements for the quality management, it is possible to further improve the joining quality (reliability of the quality).

Moreover, with the friction stir joining performed all the way even when it is determined as an out-of-numerical-range product in the middle of steps, it is possible to enhance the work efficiency more than a case where the system is stopped, or the first metallic member 101 and the second metallic member 102 are reset. Furthermore, with the friction stir joining performed all the way even when it is determined as an out-of-numerical-range product in the middle of steps, it is possible to accumulate data on an out-of-numerical-range product and to use the data for setting more favorable joining conditions and numerical range.

Furthermore, in the automatic joining system 1 in this embodiment, with factors before the friction stir joining, during the friction stir joining, and after the friction stir joining added to the determination elements for the quality management, it is possible to perform the quality management in a balanced manner.

Additionally, in this embodiment, since the load applying unit 33 and the load measuring unit 35 of the friction stir device 4 feedback a reaction load to make a load control such that the reaction load that the rotating tool F receives is substantially constant, it is possible to enhance the joining accuracy. That is, in this embodiment, since the acceptable range M is provided for the Y direction, and the load control is made for the Z direction, it is possible to further enhance the joining accuracy.

Moreover, since the placing portion 25 is provided on the front surface side of the platform 21, and the anodized coating is formed on the front surface side of the placing portion 25, it is possible to enhance the abrasion resistance, the corrosion resistance, and the like of the platform 21.

In this case, since the second metallic member 102 has a small plate-thickness dimension, the end portion thereof is likely to be uplifted. Additionally, as indicated in the later-described examples, when the end portion of the second metallic member 102 is uplifted and the step dimension h is excessively small, a joining failure is likely to occur as well. In this regard, according to this embodiment, since there is provided the sucking unit 22 that sucks the end portion of the second metallic member 102 from the back surface 102c side, it is possible to inhibit the uplift of the end portion of the second metallic member 102. With this, it is possible to further improve the accuracy of joining.

Moreover, regarding the clearance amount D, as indicated in the later-described examples, the burr height S is likely to affect the clearance amount on the start position side more than that on the end position side. Accordingly, regarding the determination target of the clearance amount D, for example, the clearance amount D at a predetermined distance (for example, 5 to 15 cm) from the start position may be extracted to compare with the predetermined numerical range and make determination.

Furthermore, as indicated in the later-described examples, when the temperature T is less than 30° C., a cavity defect is likely to be great, and when the temperature T is 60 to 120° C., a cavity defect is likely to be small or not occur, for example. With the predetermined numerical range of the temperature T set and added to the determination elements for the quality management like this embodiment, it is possible to further improve the joining quality.

C. First Modification

[C-1. Automatic Joining System]

Figure 14:
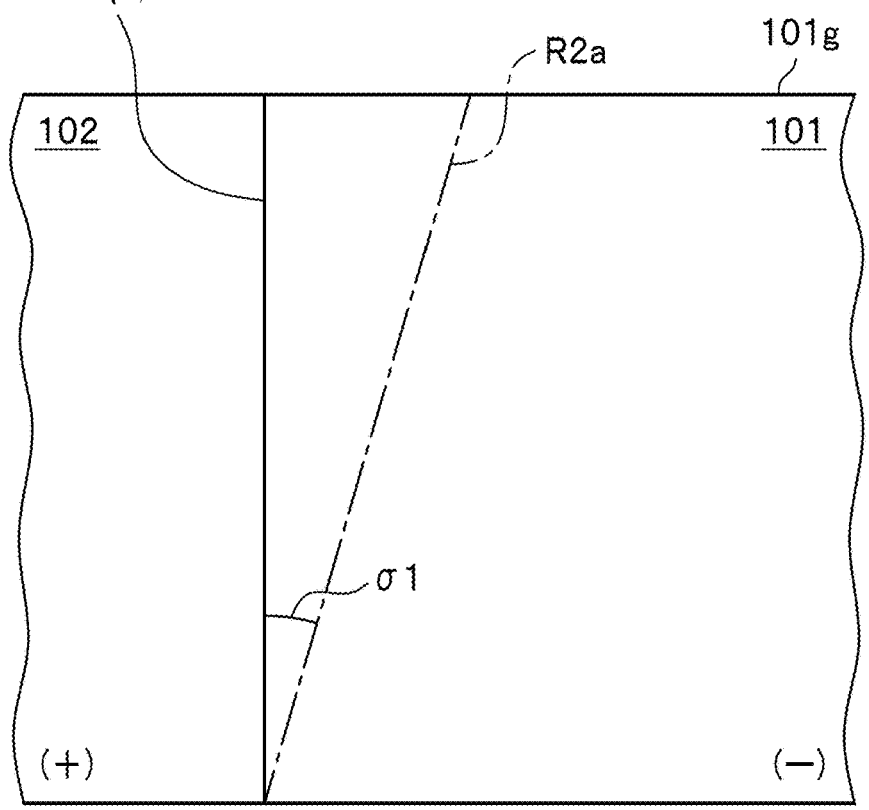
FIG. 14 is a schematic plan view for describing a modified moving route according to a first modification of the first embodiment.

Next, a first modification of the above-described first embodiment is described. In the first modification, the calculating method of the modified moving route is different from the above-described embodiment. In the first modification, portions different from the above-described embodiment are mainly described. In the above-described first embodiment, the modified moving route R2 is set at the position moved in substantially parallel with respect to the target moving route R1 (see FIG. 9); however, in the first modification, as shown in FIG. 14, a modified moving route R2a is set at a position displaced obliquely with respect to a target moving route R1a.

Figure 15:
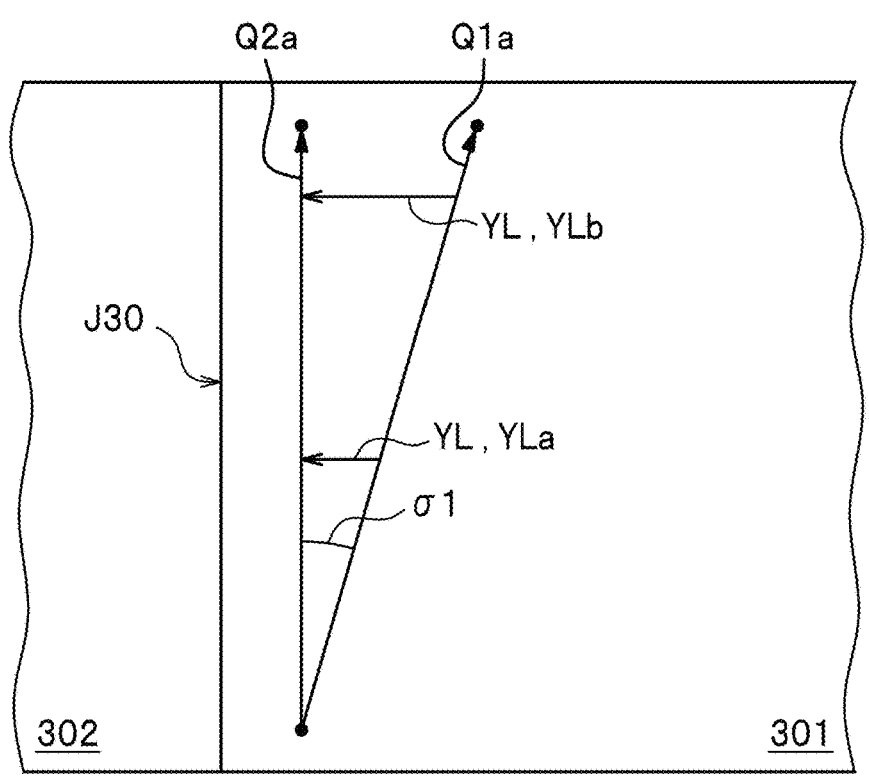
FIG. 15 is a schematic plan view for describing a difference according to the first modification of the first embodiment.

FIG. 15 is a schematic diagram showing a test trajectory Q1a and a test trajectory Q2a. As shown in FIG. 15, in the first modification, before the friction stir joining is performed, a test trial to generate the modified moving route R2a by using the pair of the metallic members 301 and 302 is conducted. It is favorable that the metallic members 301 and 302 are made of the same or similar material and have the same or similar thickness and the like as the first metallic member 101 and the second metallic member 102 on which the friction stir joining is performed actually. That is, as with the butting portion J1 of the first metallic member 101 and the second metallic member 102, the butting portion J30 is formed by butting the metallic members 301 and 302 to each other. To be specific, in this test trial, it is favorable to use two metallic members 301 and 302 having surfaces at different height positions, which are, comparing with the first metallic member 101 and the second metallic member 102, formed of metal of a similar material type and formed by butting plate-shaped members having a similar plate-thickness dimension to each other to form a step having a similar height.

The test trajectory Q1a indicates a traveling trajectory along which the friction stir device 4 is moved as a trial in accordance with the set moving route set in advance without inserting the rotating tool F in the metallic members 301 and 302. That is, the test trajectory Q1a is the traveling trajectory along which the robotic arm 31 of the friction stir device 4 is moved in a state with no load. In this process, as long as the robotic arm 31 is moved in a state with no load without the rotating tool is inserted in the metallic members 301 and 302, the robotic arm 31 may be moved without attaching the rotating tool F.

On the other hand, the test trajectory Q2a is a trajectory along which the friction stir is performed as a trial in accordance with the same set moving route set in advance as that for the test trajectory Q1a while the rotating tool F is inserted in the metallic members 301 and 302. Both the test trajectory Q1a and test trajectory Q2a allow the rotating tool F to move from the near side to the far side of the metallic members 301 and 302. Although both the test trajectory Q1a and test trajectory Q2a allow for the movement in accordance with the same set moving route, a difference σ1 at a predetermined angle occurs with the friction stir performed actually. Although the test trajectory Q1a and the test trajectory Q2a are coincide with each other at the position of the start point of the friction stir, the test trajectory Q2a is displaced obliquely from the test trajectory Q1a in a state with no load toward the left side (the thin plate (the second metallic member 302) side) by the difference at the angle σ1. With this, the test trajectory Q1a and the test trajectory Q2a have a difference YLb on the far side, which is greater than a difference YLa on the around-middle side. That is, the difference YL in a direction straight to the joining direction becomes gradually greater as the rotating tool F advances.

It is inferred that such displacement of the rotating tool F is caused because the position of the rotating tool F is displaced from the test trajectory Q1a to the test trajectory Q2a due to the flexure that occurs in the robotic arm 31 with the rotating tool F put in contact with the two metallic members butted to each other such that the front surfaces have different height positions. Additionally, it is inferred that the tendency of the robotic arm 31, the material resistance of the metallic member, and the like may affect as well.

Accordingly, when the test trajectory Q2a is desired to travel in the friction stir joining, the set moving route is required to be set in consideration of the difference σ1. The difference σ1 can be calculated in advance based on performing of the test trial in which the friction stir joining is performed while the rotating tool F is inserted in the metallic member and the test trial performed in a state with no load, before the friction stir joining of the first metallic member 101 and the second metallic member 102. More specifically, the difference σ1 can be calculated from the difference σ1 between angles of the traveling trajectories of the test trajectory Q2a in a case where the rotating tool F is moved while the friction stir joining is performed while the rotating tool F is inserted in the metallic member in which the butting portion is formed as with the butting portion J1 of the first metallic member 101 and the second metallic member 102 and the test trajectory Q1a in a case where the rotating tool F is moved in a state with no load without being inserted in the metallic member.

Note that, it is favorable that the set moving route to obtain the test trajectory Q1a and the test trajectory Q2a is set such that the test trajectory Q2a passes through near the butting portion J30 of the metallic members butted to each other. Particularly, it is favorable that the set moving route is set so as to pass through the butting portion J30 near the start position of the test trajectory Q2a and move along the butting portion J30 toward the thick plate metallic member side. Note that, when the test trial is conducted, the test trajectories Q1a and Q2a may be obtained by inserting the rotating tool F into at least either of the metallic members 301 and 302.

In the modified moving route generating unit 63, as shown in FIG. 14, the modified moving route R2a is calculated based on the target moving route R1a and the difference σ1. In this modification, as shown in FIG. 15, since the test trajectory Q2a along which the friction stir joining is performed while the rotating tool F is inserted is likely to be displaced obliquely from the test trajectory Q1a in a state with no load toward the left side (thin plate side) by the difference σ1, the modified moving route R2a is set at a position displaced obliquely toward the right side (the thick plate (first metallic member 101) side) with respect to the target moving route R1a by the difference σ1. In other words, the modified moving route generating unit 63 sets the modified moving route R2a at a position at which the advancing direction (tilt) of the target moving route R1a is displaced obliquely in an opposite direction of the direction in which the test trajectory Q2a is displaced, by the angle σ1 of the oblique displacement of the test trajectory Q2a with respect to the test trajectory Q1a, the test trajectory Q2a being a traveling trajectory while the tool is inserted, and the test trajectory Q1a being a traveling trajectory in a state with no load. That is, the modified moving route R2a is set so as to be gradually away from the target moving route R1a as advancing in the advancing direction of the rotating tool F. With the friction stir controlling unit 55 controlling the rotating tool F to move along the modified moving route R2a, the difference σ1 is compensated, and the friction stir joining is performed while the rotating tool F is moved on the target moving route R1a.

In the first modification, it is favorable that, when the determining unit 64 determines that the position of the rotating tool F during the friction stir joining is out of the acceptable range M, the modified moving route generating unit 63 calculates the modified moving route R2a in which the position of the rotating tool F is reset in accordance with the position of the rotating tool F during the friction stir joining. Specifically, in a portion in which the position of the rotating tool F in the Y direction during the friction stir joining is on the first metallic member 101 side, the modified moving route R2a is reset such that the position of the rotating tool F in the portion is on the second metallic member 102 side. Likewise, in a portion in which the position of the rotating tool F in the Y direction during the friction stir joining is on the second metallic member 102 side, the modified moving route R2a is reset such that the position of the rotating tool F in the portion is on the first metallic member 101 side.

Additionally, when the position of the rotating tool F during the friction stir joining is determined to be out of the acceptable range M, the determining unit 64 may determine the first metallic member 101 and the second metallic member 102 as an out-of-numerical-range product in association with a work number.

Note that, when the difference σ1 between the test trajectory Q1a and the test trajectory Q2a is small or nothing, the rotating tool F may be moved based on the target moving route R1a without setting the modified moving route. Additionally, although it is not necessary to perform the obtainment (calculation) of the difference σ1 for each friction stir joining, it is favorable that, for example, when the rotating tool F is replaced, the difference σ1 is obtained in accordance with a case where the plate-thickness dimensions, the material types, the height positions of the surfaces, and the like of the first metallic member 101 and the second metallic member 102 are changed, and thus the difference σ1 and the modified moving route R2a are calculated.

[C-2. Operation Flow]

The automatic joining system 1 according to this modification can perform operations as with the operation flow of the automatic joining system according to the first embodiment described with reference to FIG. 13.

In the automatic joining system 1 according to this modification, in step ST5, the friction stir controlling unit 55 (the modified moving route generating unit 63) generates the modified moving route R2a based on the ridge line position Yp and the difference σ1 obtained in advance. Specifically, the ridge line position Yp is calculated as the target moving route R1a, and also the modified moving route R2a is set at the position displaced obliquely with respect to the target moving route R1a by the difference σ1.

It is favorable that the difference σ1 is obtained prior to the generation of the modified moving route R2a by the modified moving route generating unit 63 in step ST5. In the obtainment of the difference σ1, first, the target moving route generating unit 61 sets the target moving route R1a, and the set moving route generating unit 65 generates the set moving route. Next, in accordance with the generated set moving route, the test trajectory Q1a along which the rotating tool F is moved in a state with no load without being inserted in the metallic members 301 and 302 and the test trajectory Q2a along which the rotating tool F is moved while being inserted in the metallic members 301 and 302 and while the friction stir joining is performed are respectively obtained. Then, the difference σ1 is obtained from the difference between the test trajectory Q1a and the test trajectory Q2a. The obtainment of the difference σ1 may be performed in a timing before step ST5 and, preferably, preliminarily performed before step ST1 in which the first metallic member 101 and the second metallic member 102 are set.

[C-3. Operation and Effect]

When the rotating tool F is controlled to move along a predetermined moving route while being inserted and is moved while the friction stir joining is performed, there is a risk that the traveling trajectory of the rotating tool F may be deviated from the moving route, and the joining quality may be deteriorated due to occurrence of a root flaw and the like. For example, as shown in FIG. 6, when the friction stir joining is to be performed while passing through the moving route parallel to the butting portion J1 of the first metallic member 101 and the second metallic member 102 by the friction stir device 4 including the robotic arm 31, in some cases, the traveling trajectory of the rotating tool F is displaced obliquely from the butting portion J1, and the displacement of the position of the rotating tool F becomes greater as advancing in the advancing direction.

Through the consideration of the present inventors, there is found out a case where the traveling trajectory along which the rotating tool F actually moves when the friction stir joining of the butting portion J1 is performed is displaced obliquely with respect to the trajectory at the position at which the movement of the rotating tool F is controlled. Such oblique displacement can be considered to occur mainly because of the orientation of the robotic arm 31 of the friction stir device 4. To be specific, as the rotating tool F advances in the joining direction along with the joining on the butting portion J1 of the metallic members 101 and 102, the orientation of the robotic arm 31 including the tip end to which the rotating tool F is attached is changed. For example, when the robotic arm 31 includes the multi jointed arm 31a, the orientation is different between a case of joining a position far from the main body of the friction stir device 4 by extending and expanding the multi jointed arm 31a and a case of joining a position near the main body of the friction stir device 4 by folding and contracting the multi-jointed arm 31a. When the orientation of the robotic arm 31 is changed depending on the traveling position, the direction in which the robotic arm 31 receives force is changed, and accordingly the spring constant of the robotic arm 31 is changed. Although the flexure occurs in the robotic arm 31 with the rotating tool F inserted into the metallic members 101 and 102, the flexure amount in the robotic arm 31 is changed with the spring constant of the robotic arm 31 changed depending on the traveling position of the rotating tool F. When the rotating tool F is moved by being controlled to move along a predetermined moving route, the flexure amount in the robotic arm 31 is increased as the rotating tool F moves, and the traveling trajectory of the rotating tool F is displaced from the predetermined moving route. It is considered that the oblique displacement thus occurs.

According to the automatic joining system 1 according to this modification, the target moving route R1a of the rotating tool F is set based on the ridge line position Yp of the first metallic member 101 measured before the friction stir joining is performed, and also the modified moving route R2a is set at the position displaced obliquely with respect to the target moving route R1a. Additionally, with the rotating tool F controlled to move along the modified moving route R2a, the friction stir joining can be performed while the rotating tool F is along the target moving route R1a. Thus, with the rotating tool F controlled to move to the position at which the displacement, which occurs when the friction stir joining of the butting portion J1 is performed, is compensated, based on the ridge line position Yp of each set first metallic member 101, it is possible to set easily an accurate moving route in which the displacement of the rotating tool F is inhibited. With this, it is possible to enhance the joining quality. Particularly, in this modification, based on the angle of the difference σ1 between the test trajectory Q2a, which is the traveling trajectory while the tool is inserted, and the test trajectory Q1a, which is the traveling trajectory in a state with no load, the modified moving route R2a is set at the position at which the advancing direction (tilt) of the target moving route R1a is displaced obliquely. With this, a moving route is set in which the oblique displacement of the traveling trajectory of the rotating tool F, which occurs in accordance with the orientation of the robotic arm 31 of the friction stir device 4 for joining the metallic members 101 and 102, and it is possible to enhance the joining quality.

D. Second Modification

Next, a second modification of the above-described first embodiment is described. Although the step dimension h is measured before the friction stir joining is performed in the above-described embodiment, a first thickness dimension t11 and a second thickness dimension t12 (see FIG. 12) may be measured instead of the step dimension h or in addition to the step dimension h.

As shown in FIG. 12, the first thickness dimension t11 means a distance (height dimension) from the front surface of the platform 21 to the front surface 101b of the first metallic member 101. The second thickness dimension t12 means a distance (height dimension) from the front surface of the platform 21 to the front surface 102b of the second metallic member 102.

The first thickness dimension t11 and the second thickness dimension t12 can be measured by the measuring unit 34, for example. That is, the first thickness dimension t11 and the second thickness dimension t12 can be obtained by moving the measuring unit 34 along the butting portion J1 before the friction stir joining is performed. In this process, with the measuring unit 34 moved so as to measure the height position of the front surface of the platform 21 in addition to the butting portion J1, it is possible to measure the distances from the front surface of the platform 21 to the front surface 101b of the first metallic member 101 and to the front surface 102b of the second metallic member 102.

In the second modification, the determining unit 64 determines whether the result (the first thickness dimension t11 and the second thickness dimension t12) transmitted from the measuring unit 34 before the friction stir joining is performed or during the friction stir joining is within a predetermined numerical range. When the first thickness dimension t11 and the second thickness dimension t12 are determined to be out of the predetermined numerical range, the determining unit 64 determines the first metallic member 101 and the second metallic member 102 as an out-of-numerical-range product in association with a work number. The determining unit 64 transmits the determination result to the main controlling unit 41 and also stores in the storing unit 44. The determination result may be displayed on the displaying unit 43 or may be notified by a notifying device that outputs sound and light in accordance with the determination result.

Additionally, when the first thickness dimension t11 and the second thickness dimension t12 are determined to be out of the predetermined numerical range before the friction stir joining is performed of during the friction stir joining, the clamp units 24 may immediately perform a control to release the fixation of the first metallic member 101 and the second metallic member 102. In this case, for example, the positions of the first metallic member 101 and the second metallic member 102 may be slightly modified (reset) by the robotic arm 11 of the conveying device 2, or the first metallic member 101 and the second metallic member 102 may be taken out from the platform 21 to arrange a new first metallic member 101 and second metallic member 102.

In this case, in the friction stir joining, the plate-thicknesses of the first metallic member 101 and the second metallic member 102 affect the joining quality greatly. Depending on the combination of the plate-thicknesses of the first metallic member 101 and the second metallic member 102, joining failure may occur in any case of controlling the rotating tool F. Additionally, for example, when the members are procured overseas, a variation in the plate-thicknesses of the first metallic member 101 and the second metallic member 102 tends to be great.

In this regard, it is possible to further enhance the accuracy of the quality management by, like the second modification, measuring the first thickness dimension t11 and the second thickness dimension t12 before the friction stir joining is performed or during the friction stir joining and also determining whether the measurement results are out of the predetermined numerical range.

Additionally, when the first thickness dimension t11 and the second thickness dimension t12 are determined to be out of the predetermined numerical range, the controlling device 5 in the second modification may perform a control to change at least one of the aiming angle, the angle of advance, and the insertion amount of the rotating tool F as well as the position of the rotating tool F from the preliminarily set conditions. For the aiming angle, the angle of advance, and the insertion amount of the rotating tool F as well as the position of the rotating tool F for the first thickness dimension t11 and the second thickness dimension t12, it is possible to prepare conditions that are optimal or close to optimal based on tests conducted in advance where multiple first metallic members 101 and second metallic members 102 with different thicknesses are prepared.

According to such a second modification, the friction stir joining can be performed under the conditions that are optimal or close to optimal in accordance with the first thickness dimension t11 and the second thickness dimension t12, and thus it is possible to maintain a stable joining quality.

Note that, the angle of advance means an angle of a rotary center axis U of the rotating tool F with respect to the vertical axis when the rotating tool F is viewed laterally with respect to the advancing direction. The insertion amount means a distance from the front surface 101b of the first metallic member 101 to the center F5 (see FIG. 12) of the flat surface of the tip end side pin F3.

Figure 17:
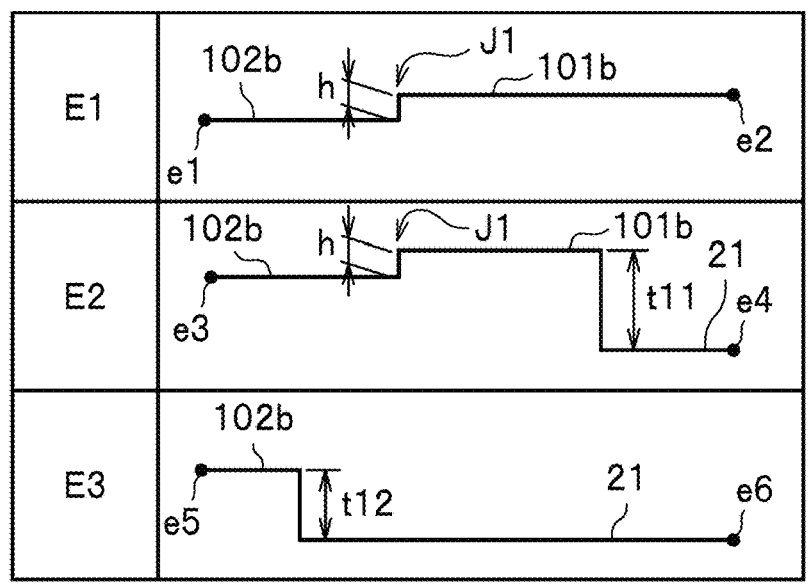
FIG. 17 is a schematic cross-sectional view showing the measuring method according to the second modification of the first embodiment.

In this case, the measurement of the first thickness dimension t11 and the second thickness dimension t12 may be measured separately from the measurement of the step dimension h and the like before the friction stir joining is performed. For example, a line sensor (a laser displacement meter) can be used as the measuring unit. As shown in FIG. 17, when the butting portion J1 is formed by butting the first metallic member 101 of a great plate-thickness and the second metallic member 102 of a small plate-thickness to each other, the first thickness dimension t11 and the second thickness dimension t12 before the friction stir joining can be measured by moving the measuring unit multiple times (here, three times) while changing the positions from a route E1, a route E2, to a route E3.

Figure 16:
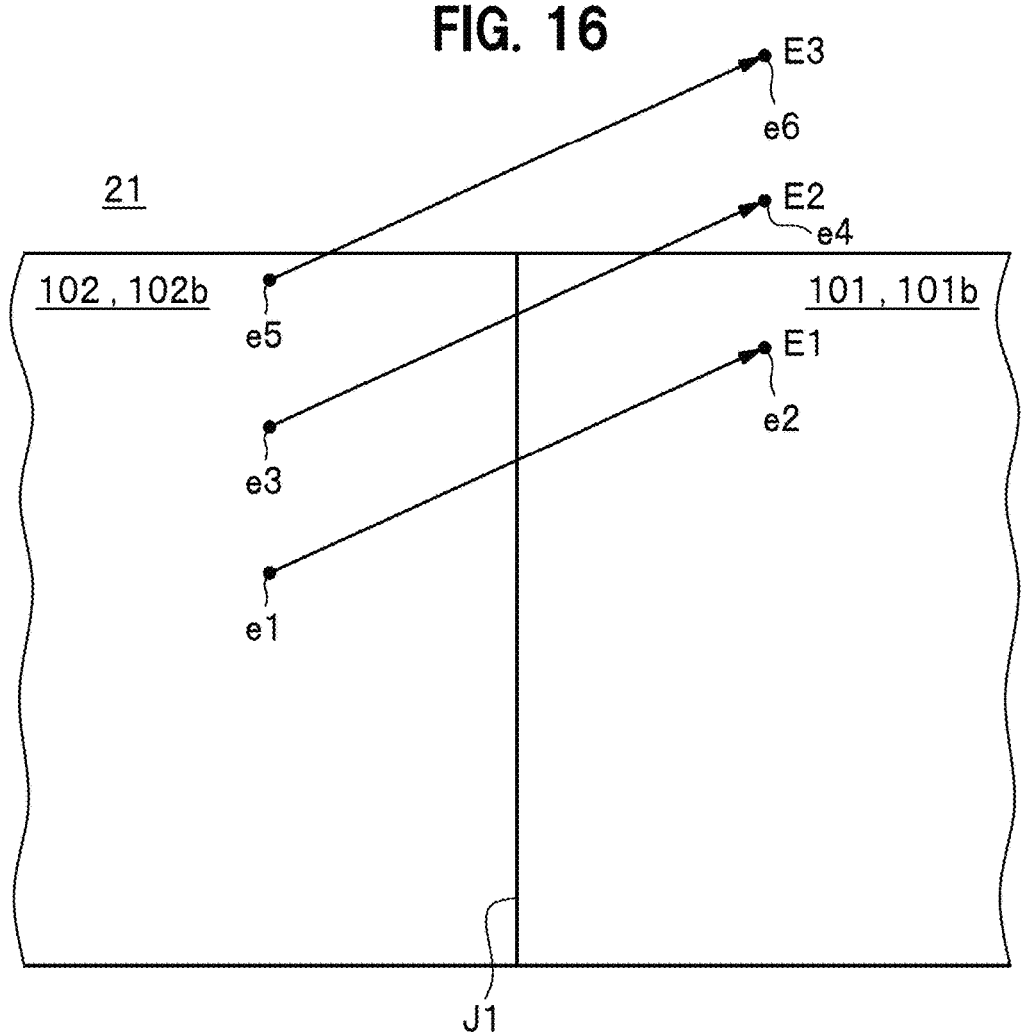
FIG. 16 is a schematic plan view showing a measuring direction according to a second modification of the first embodiment.

As shown in FIG. 16, the route E1 allows the measuring unit to move obliquely with respect to the butting portion J1 from a point e1 of the front surface 102b of the second metallic member 102 to a point e2 of the front surface 101b of the first metallic member 101. That is, the measuring unit passes through the front surface 102b of the second metallic member 102, the butting portion J1, and the front surface 101b of the first metallic member 101. With this, the step dimension h can be measured as shown in the top column of FIG. 17.

Additionally, the route E2 allows the measuring unit to move obliquely with respect to the butting portion J1 from a point e3 of the front surface 102b of the second metallic member 102 to a point e4 of the front surface of the platform 21. The route E2 and the route E1 are parallel to each other. That is, the measuring unit passes through the front surface 102b of the second metallic member 102, the butting portion J1, the front surface 101b of the first metallic member 101, and the platform 21. With this, the step dimension h and the distance from the front surface of the platform 21 to the front surface 101b of the first metallic member 101 (the first thickness dimension t11) can be measured as shown in the middle column of FIG. 17.

Moreover, the route E3 allows the measuring unit to move obliquely with respect to the butting portion J1 from a point e5 of the front surface 102b of the second metallic member 102 to a point e6 of the front surface of the platform 21. The route E3 and the route E2 are parallel to each other. That is, the measuring unit passes through the front surface 102b of the second metallic member 102 and the platform 21. With this, a distance from the front surface of the platform 21 to the front surface 102b of the second metallic member 102 (second thickness dimension t12) can be measured as shown in the bottom column of FIG. 17.

The first thickness dimension t11 and the second thickness dimension t12 may be measured as described above. Additionally, the first thickness dimension t11 and the second thickness dimension t12 may be measured by another method or another instrument.

E. Second Embodiment

Next, a second embodiment of the present invention is described. In the second embodiment, the calculating method of the modified moving route is different from the above-described first embodiment. In the second embodiment, portions different from the first embodiment are mainly described. In the above-described first embodiment, the modified moving route R2 is set at the position at which the target moving route R1 is displaced, based on the difference between the traveling trajectory along which the rotating tool F is moved while being inserted and the traveling trajectory along which the rotating tool F is moved in a state with no load. In the second embodiment, a modified moving route R2b is set at a position at which a set moving route P1b is displaced, based on a difference between the traveling trajectory along which the rotating tool F is moved while being inserted and the target moving route. In the second embodiment, a method of setting the modified moving route R2b at a position at which the set moving route P1b is displaced in substantially parallel can be performed as with the setting of the modified moving route R2 based on the difference YL described in the above-described first embodiment. Additionally, in the second embodiment, a method of setting the modified moving route R2b at a position at which the set moving route P1b is displaced obliquely can be performed as with the setting of the modified moving route R2a based on the difference σ1 described in the above-described first modification of the first embodiment.

Figure 18:
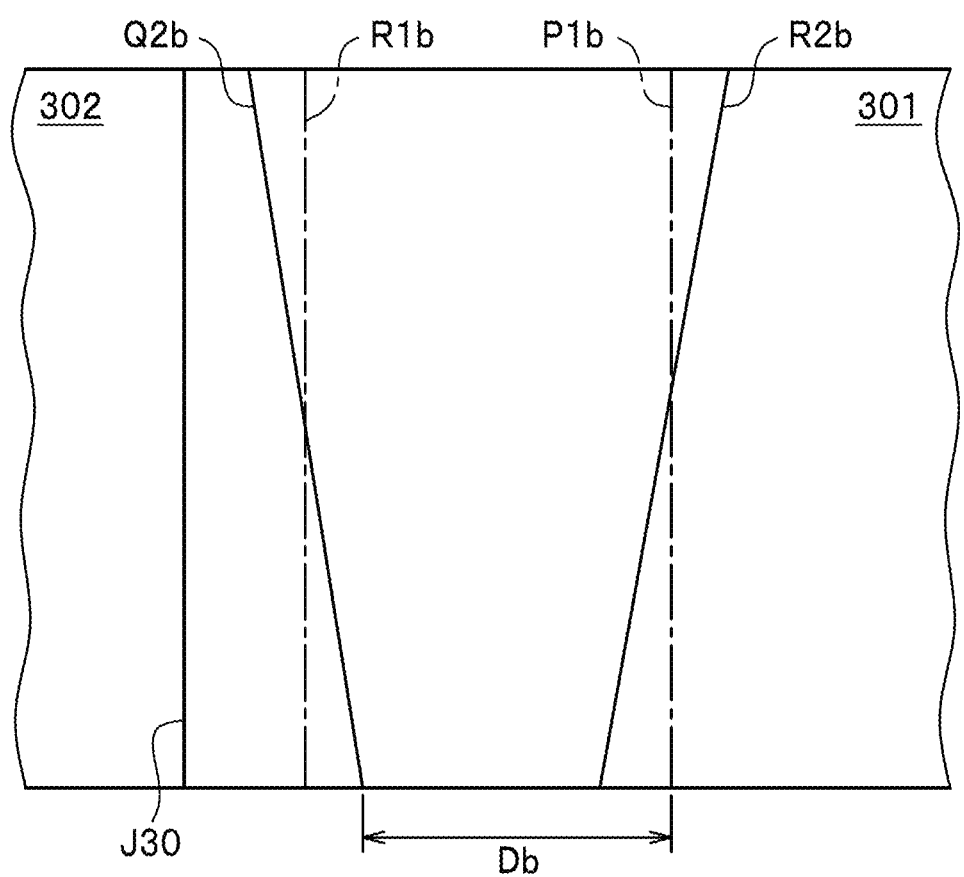
FIG. 18 is a schematic plan view for describing a calculating method of a modified moving route according to a second embodiment of the present invention.

FIG. 18 is a schematic plan view describing a calculating method of a modified moving route according to the second embodiment. FIG. 18 shows a target moving route Rib, the set moving route P1b, a test trajectory Q2b, and the modified moving route R2b. In the calculating method of the modified moving route according to the second embodiment, a test trial to generate the modified moving route R2b by using the pair of the metallic members 301 and 302 is conducted. It is favorable that the metallic members 301 and 302 are made of the same or similar material and have the same or similar thickness and the like as the first metallic member 101 and the second metallic member 102 on which the friction stir joining is actually performed. That is, as with the butting portion J1 of the first metallic member 101 and the second metallic member 102, the butting portion J30 is formed by butting the metallic members 301 and 302 to each other. To be specific, in this test trial, it is favorable to use two metallic members 301 and 302 having surfaces at different height positions, which are, comparing with the first metallic member 101 and the second metallic member 102, formed of metal of a similar material type and formed by butting plate-shaped members having a similar plate-thickness dimension to each other to form a step having a similar height.

As with the target moving route R1 described in the first embodiment, the target moving route R1b sets a trajectory as a target along which the rotating tool F is moved when the friction stir joining of the butting portion J1 is performed.

As with the set moving route generating unit 65 described in the first embodiment, the set moving route P1b is an instructing position for moving the rotating tool F. The set moving route P1b is used to generate the modified moving route R2b by using the displacement of the trajectory of the rotating tool F.

The test trajectory Q2b is a traveling trajectory along which the rotating tool F is moved by being controlled to move along the set moving route P1b while the friction stir joining is performed and while the rotating tool F is inserted in the metallic members 301 and 302.

As with the modified moving route R2 described in the first embodiment, the modified moving route R2b is an instructing position for moving the rotating tool F. Particularly, the modified moving route R2b indicates a trajectory along which the rotating tool F is controlled to move along this route when the friction stir joining of the butting portion J1 is performed. With the rotating tool F controlled to move along the modified moving route R2b, the friction stir joining is performed such that the rotating tool F is moved along the target moving route R1b. Additionally, as described later, the modified moving route R2b is set by using the test trajectory Q2b and the target moving route R1b.

In the calculating method of the modified moving route according to the second embodiment, first, the target moving route generating unit 61 sets the target moving route R1b. The target moving route R1b is a route along which the rotating tool F is desired to move actually. The target moving route R1b is set to be parallel to the butting portion J30 on the front surface of the first metallic member 301 in this modification.

Next, the set moving route generating unit 65 sets the set moving route P1b at a position displaced in parallel from the target moving route R1b. The set moving route P1b is a virtual moving route determined by being inputted to the friction stir device 4. The set moving route P1b is set on the opposite side to the butting portion J30 with respect to the target moving route R1b.

Next, the test trajectory (traveling trajectory) Q2b is obtained by moving the rotating tool F along the set moving route P1b. The test trajectory Q2b can be obtained as an approximate straight line based on measurement data. In this case, the rotating tool F is inserted into the front surface of the first metallic member 301, and the rotating tool F is moved along the set moving route P1b. In this process, as described above, when the rotating tool F is moved along the butting portion J30, the first metallic member 301 and the second metallic member 302 are put in contact with the rotating tool F, and thus the traveling trajectory of the rotating tool F is displaced obliquely in accordance with the orientation of the robotic arm 31. Additionally, since the plate-thickness of the metallic member 302 is thinner than the plate-thickness of the metallic member 301, the traveling trajectory of the rotating tool F is displaced toward the thin plate side (the metallic member 302) in substantially parallel. With this, as the rotating tool F is advanced, the test trajectory Q2b and the target moving route R1b have differences in the tilt and the distance.

Therefore, the modified moving route generating unit 63 sets the modified moving route R2b based on such differences between the test trajectory Q2b and the target moving route R1b. Specifically, the modified moving route generating unit 63 sets the modified moving route R2b at a position at which, by an angle of the oblique displacement of the test trajectory Q2b, which is the traveling trajectory while the tool is inserted, with respect to the target moving route Rib, the advancing direction (tilt) of the set moving route P1b is displaced obliquely in the opposite direction of the direction in which the test trajectory Q2b is displaced, and at which, by a length of the substantially parallel displacement of the test trajectory Q2b, which is the traveling trajectory while the tool is inserted, with respect to the target moving route R1b, also the set moving route P1b is displaced in substantially parallel in the opposite direction of the direction in which the test trajectory Q2b is displaced.

With the rotating tool F moved along the modified moving route R2b, the rotating tool F is moved on the target moving route R1b.

Thus, the modified moving route R2b can be set in the second embodiment. With the friction stir controlling unit 55 controlling the rotating tool F to move along the modified moving route R2b, the difference is compensated, and the friction stir joining is performed while the rotating tool F is moved on the target moving route R1b. To be specific, in this embodiment, based on the angle of the difference between the test trajectory Q2b, which is the traveling trajectory while the rotating tool F is inserted, and the target moving route R1b, the modified moving route R2b is set to the position at which the advancing direction (tilt) of the set moving route P1b is displaced obliquely. With this, as with the first modification of the first embodiment, it is possible to enhance the joining quality by setting a moving route in which the oblique displacement of the traveling trajectory of the rotating tool F, which occurs in accordance with the orientation of the robotic arm 31 of the friction stir device 4 for joining the metallic members 101 and 102, is inhibited. Additionally, in this embodiment, based on the length of the difference YL between the test trajectory Q2b, which is the traveling trajectory while the tool is inserted, and the target moving route R1b, the modified moving route R2b is set at the position at which the set moving route P1b is displaced in substantially parallel. With this, as with the first embodiment, it is possible to enhance the joining quality by setting a moving route in which the substantially parallel displacement of the traveling trajectory of the rotating tool F, which occurs in accordance with the set states of the metallic members 101 and 102, is inhibited. Accordingly, it is possible to further enhance the joining quality by displacing the advancing direction of the set moving route P1b obliquely and setting the modified moving route R2b at the position displaced in substantially parallel to perform the friction stir while both effects of an effect of the friction stir device performing the joining and an effect of the metallic members performing the joining are mitigated.

Additionally, in the second embodiment, based on the difference between the test trajectory Q2b, which is the traveling trajectory while the tool is inserted, and the target moving route R1b, the modified moving route R2b is set at the position at which the set moving route P1b is displaced. With this, in this embodiment, since the rotating tool F is not required to be moved in a state with no load as described in the above-described first embodiment, it is possible to perform easily the setting of the modified moving route R2b by comparing the traveling trajectory and the target moving route during the joining without performing a test operation in a state with no load.

Note that, although the descriptions are given using a case as an example where the pair of the metallic members 301 and 302 are used to conduct the test trial to generate the modified moving route R2b in the above-described second embodiment, the modified moving route R2b may be generated by using a joining result obtained by using the first metallic member 101 and the second metallic member 102. To be specific, when the friction stir joining under substantially the same conditions for the butting portion J1 of the first metallic member 101 and the second metallic member 102 is performed continuously for multiple times, the modified moving route R2b may be set in accordance with the target moving route R1b, the set moving route P1b, and the test trajectory Q2b in one joining, and this modified moving route R2b may be used as the set moving route P1b in the joining thereafter.

F. Others

The above-described embodiments and modifications can be combined with each other as needed.

For example, the automatic joining system 1 may set the modified moving route by combining the setting of the modified moving route described in the first embodiment and the setting of the modified moving route described in the first modification of the first embodiment.

Figure 19:
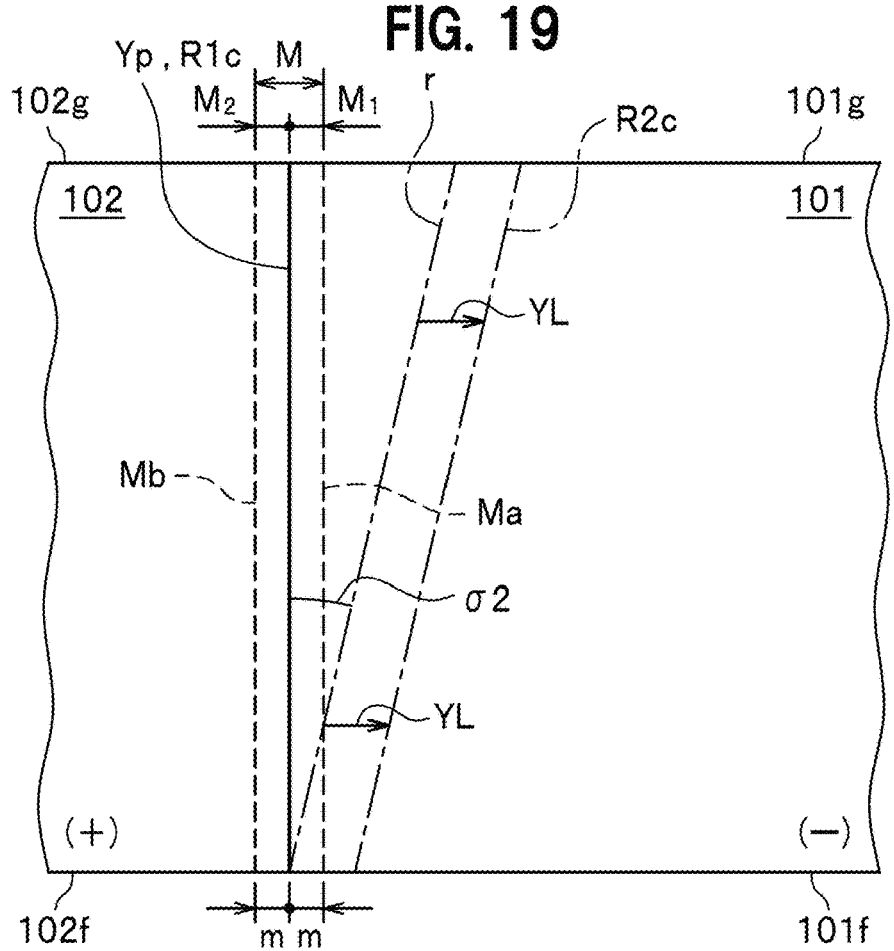
FIG. 19 is a schematic plan view for describing a modified moving route according to another embodiment.
Figure 20:
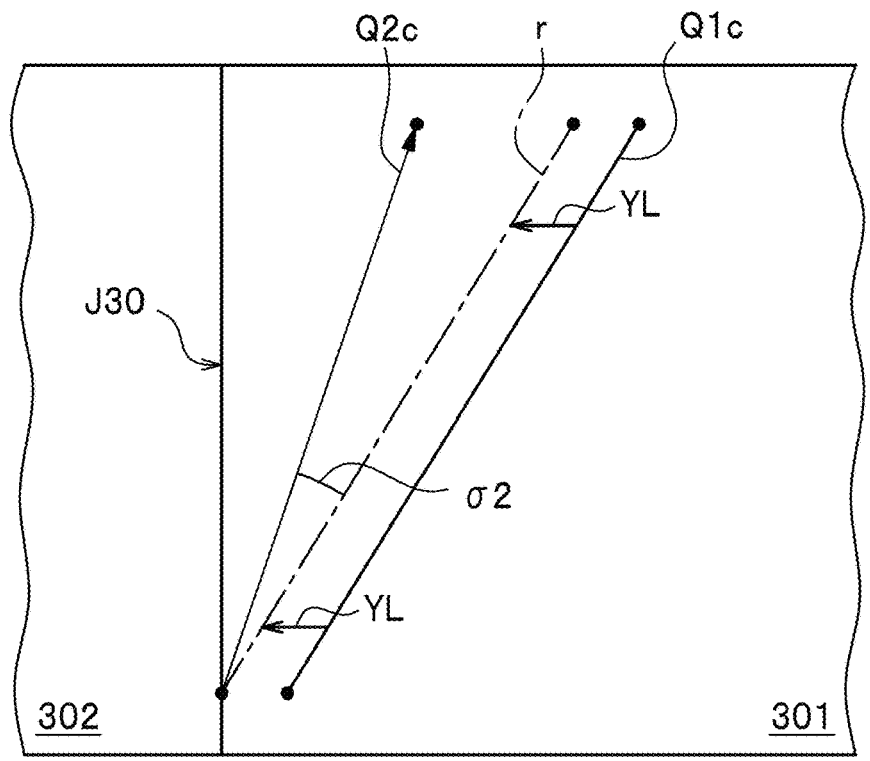
FIG. 20 is a schematic plan view for describing a difference according to the other embodiment.

In this case, as shown in FIGS. 19 and 20, the controlling device 5 sets the target moving route R1c based on the ridge line position Yp and calculates a modified moving route R2c at a position that is displaced obliquely toward the first metallic member 101 side with respect to the target moving route R1c and also displaced toward the first metallic member 101 side in substantially parallel with respect to the target moving route R1c.

More specifically, as shown in FIG. 20, the controlling device 5 obtains a test trajectory Q2c along which the rotating tool F is moved while the friction stir joining is performed while being controlled to move along the predetermined set moving route while the rotating tool F is inserted in at least either of the pair of metallic members 301 and 302. Additionally, the controlling device 5 obtains a test trajectory Q1c along which the rotating tool F is moved while being controlled to move along the set moving route similar to that in a case of obtaining the test trajectory Q2c, in a state with no load without the rotating tool F is inserted in the metallic members 301 and 302. The test trajectory Q2c is displaced (see a virtual line r) toward the left side (the thin plate (second metallic member 302) side) in substantially parallel from the test trajectory Q1c in a state with no load by the difference YL and is also displaced obliquely toward the left side (the thin plate (the second metallic member 302) side) by a difference of an angle σ2. As shown in FIG. 19, the modified moving route generating unit 63 obliquely displaces, based on the difference YL and the difference 62 between the test trajectory Q2c and the test trajectory Q1c, the advancing direction of the target moving route R1c toward the thick plate (the first metallic member 101) side by the difference σ2 as advancing in the advancing direction of the rotating tool F (see the virtual line r in FIG. 19), and the modified moving route generating unit 63 calculates the modified moving route R2c in which the instructing position of the rotating tool F is set at a position at which the displaced target moving route R1c (the virtual line r) is displaced toward the thick plate (the first metallic member 101) side in substantially parallel by the difference YL.

With this, the modified moving route generating unit 63 can set a moving route in which the substantially parallel displacement of the traveling trajectory of the rotating tool F that occurs in accordance with the set states of the metallic members 101 and 102 is inhibited. Additionally, the modified moving route generating unit 63 can set a moving route in which the oblique displacement of the traveling trajectory of the rotating tool F that occurs in accordance with the orientation of the robotic arm 31 of the friction stir device 4 for joining the metallic members 101 and 102. Accordingly, it is possible to further enhance the joining quality by performing the friction stir while both effects of an effect of the metallic members performing the joining and an effect of the friction stir device performing the joining are mitigated.

The following appendices are disclosed additionally in relation to the above-described embodiment.

(Appendix 1)

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a ridge line position of the first metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a modified moving route at a position displaced toward the first metallic member side in substantially parallel with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

According to the automatic joining system, with the modified moving route set based on the target moving route, and with the rotating tool controlled to move along the modified moving route, it is possible to set accurately the route along which the rotating tool actually moves. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces.

Additionally, it is favorable that, the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which the target moving route is displaced toward the first metallic member side in substantially parallel by the difference.

According to the automatic joining system, with the modified moving route set based on the difference calculated in advance, it is possible to set more accurately the route along which the rotating tool actually moves.

Moreover, it is favorable that, the controlling device calculates the modified moving route at a position that is displaced obliquely toward the first metallic member side with respect to the target moving route and also displaced toward the first metallic member side in substantially parallel with respect to the target moving route.

According to the automatic joining system, since the shifting of the rotating tool to the second metallic member side on which the height position of the front surface is low can be inhibited, it is possible to set more accurately the route along which the rotating tool actually moves.

Furthermore, it is favorable that, the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which an advancing direction of the target moving route is displaced obliquely toward the first metallic member side by the difference as advancing in an advancing direction of the rotating tool, and at which also the target moving route is displaced toward the first metallic member side in substantially parallel by the difference.

According to the automatic joining system, with the modified moving route set based on the difference calculated in advance, it is possible to set more accurately the route along which the rotating tool actually moves.

Additionally, it is favorable that the measuring unit measures the position of the rotating tool, and the controlling device includes a determining unit that determines whether the position of the rotating tool before the friction stir joining is performed is within a predetermined numerical range with respect to the position of the modified moving route.

According to the automatic joining system, when the measurement result is out of the predetermined numerical range, for example, with the first metallic member and the second metallic member reset to the fixing device, or with the position of the rotating tool adjusted, it is possible to perform the friction stir joining in a favorable manner. Additionally, in a case of being out of the predetermined numerical range, for example, with the first metallic member and the second metallic member determined as an out-of-numerical-range product, it is possible to perform the quality management easily.

Moreover, it is favorable to further include an inspecting unit that measures at least either of the burr height and the surface roughness of the joining portion after the friction stir joining.

According to the automatic joining system, it is possible to perform the quality management more easily.

Furthermore, it is favorable that the friction stir device includes a load measuring unit that measures a reaction load in an axial direction applied to the rotating tool, and the friction stir device is load-controlled such that the reaction load is substantially constant based on a result of the load measuring unit.

According to the automatic joining system, since the reaction load of the rotating tool can be substantially constant, it is possible to enhance the joining accuracy.

Additionally, it is favorable that a front surface side of the platform is formed of aluminum or an aluminum alloy plate, and an anodized coating is formed on the front surface.

According to the automatic joining system, it is possible to enhance the abrasion resistance and the corrosion resistance of the platform.

Moreover, it is favorable that the fixing device includes a sucking unit that is arranged along the butting portion and sucks an end portion of the second metallic member from a back side.

According to the automatic joining system, since uplift of the end portion of the second metallic member can be inhibited, it is possible to perform the friction stir joining in a further favorable manner.

Additionally, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing a friction stir and performs friction stir joining of the butting portion; a measuring unit that measures a ridge line position of the first metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a modified moving route at a position displaced obliquely with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

According to the automatic joining system, with the modified moving route set based on the target moving route, and with the rotating tool controlled to move along the modified moving route, it is possible to set accurately the route along which the rotating tool actually moves. Additionally, since the shifting of the rotating tool to the second metallic member side on which the height position of the front surface is low can be inhibited by setting the modified moving route at a position displaced obliquely from the target moving route toward the first metallic member side, it is possible to set more accurately the route along which the rotating tool actually moves. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces.

Additionally, it is favorable that, the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which an advancing direction of the target moving route is displaced obliquely toward the first metallic member side by the difference as advancing in an advancing direction of the rotating tool.

According to the automatic joining system, with the modified moving route set based on the difference calculated in advance, it is possible to set more accurately the route along which the rotating tool actually moves.

(Appendix 2)

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a step dimension from the front surface of the first metallic member to the front surface of the second metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines whether the step dimension before the friction stir joining is performed is within a predetermined numerical range.

Additionally, an automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures each of a first thickness dimension of the first metallic member and a second thickness dimension of the second metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines whether the first thickness dimension and the second thickness dimension before the friction stir joining is performed or during the friction stir joining is within a predetermined numerical range.

According to the automatic joining system, since the friction stir joining is performed while the plastic fluidized material is pressed by the stepped bottom surface of the pin step portion of the base end side pin, it is possible to prevent occurrence of a burr and occurrence of an undercut and also possible to clean up the joining front surfaces. Additionally, with the determining unit provided that determines whether the step dimension is within the predetermined numerical range, it is possible to prevent a failure due to the step dimension. Moreover, with the determining unit provided that determines whether the plate-thickness of the first metallic member and the plate-thickness of the second metallic member are within a predetermined numerical range, it is possible to prevent a failure due to the plate-thicknesses.

Moreover, it is favorable that the fixing device includes a clamp unit that fixes the first metallic member and the second metallic member to the platform, and when the step dimension is determined to be out of the predetermined numerical range, the clamp unit releases the fixation of the first metallic member and the second metallic member.

Furthermore, it is favorable that the fixing device includes a clamp unit that fixes the first metallic member and the second metallic member to the platform, and when the first thickness dimension and the second thickness dimension are determined to be out of the predetermined numerical range, the clamp unit releases the fixation of the first metallic member and the second metallic member.

According to the automatic joining system, for example, with the first metallic member and the second metallic member reset to the fixing device, it is possible to perform the friction stir joining in a favorable manner.

Additionally, it is favorable that, when the step dimension is determined to be out of the predetermined numerical range, the controlling device determines the first metallic member and the second metallic member as an out-of-numerical-range product.

Moreover, it is favorable that, when the first thickness dimension and the second thickness dimension are determined to be out of the predetermined numerical range, the controlling device determines the first metallic member and the second metallic member as an out-of-numerical-range product.

According to the automatic joining system, it is possible to perform the quality management easily.

Moreover, it is favorable to further include an inspecting unit that measures at least either of the burr height and the surface roughness of the joining portion after the friction stir joining.

According to the automatic joining system, it is possible to perform the quality management more easily.

Furthermore, it is favorable that the friction stir device includes a load measuring unit that measures a reaction load in an axial direction applied to the rotating tool, and the friction stir device is load-controlled such that the reaction load is substantially constant based on a result of the load measuring unit.

According to the automatic joining system, since the reaction load of the rotating tool can be substantially constant, it is possible to enhance the joining accuracy.

Additionally, it is favorable that a front surface side of the platform is formed of aluminum or an aluminum alloy plate, and an anodized coating is formed on the front surface.

According to the automatic joining system, it is possible to enhance the abrasion resistance and the corrosion resistance of the platform.

Additionally, it is favorable that, the controlling device controls at least one of an aiming angle, an angle of advance, and an insertion amount of the rotating tool, and a position of the rotating tool in accordance with a combination of the first thickness dimension and the second thickness dimension.

According to the automatic joining system, it is possible to further enhance the joining accuracy.

(Appendix 3)

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a ridge line position of the first metallic member and also measures at least either of a position of the rotating tool and a load applied to the rotating tool; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a moving route along which the rotating tool moves when the friction stir joining of the butting portion is performed, based on the ridge line position before the friction stir joining is performed, the friction stir device performs the friction stir joining along the moving route while maintaining a predetermined aiming angle of the rotating tool and while pressing a plastic fluidized material by a stepped bottom surface of the pin step portion, and the controlling device includes a determining unit that determines whether at least either of the position of the rotating tool during the friction stir joining and the load during the friction stir joining is within a predetermined numerical range.

According to the automatic joining system, since the moving route of the rotating tool is set based on the ridge line position of the first metallic member that is measured before the friction stir joining is performed, it is possible to set easily an accurate moving route. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces. Moreover, with the determining unit provided that determines whether at least either of the position of the rotating tool and the load applied to the rotating tool during the friction stir joining is within a predetermined numerical range, it is possible to prevent a failure due to at least either of the position of the rotating tool and the load applied to the rotating tool during the friction stir joining.

Additionally, it is favorable that, when at least either of the position of the rotating tool during the friction stir joining and the load during the friction stir joining is determined to be out of the predetermined numerical range, the controlling device calculates a modified moving route in which a position of the rotating tool is reset in accordance with the position of the rotating tool during the friction stir joining.

According to the automatic joining system, it is possible to further enhance the joining accuracy.

Moreover, it is favorable that, when at least either of the position of the rotating tool during the friction stir joining and the load during the friction stir joining is determined to be out of the predetermined numerical range, the controlling device determines the first metallic member and the second metallic member as an out-of-numerical-range product.

According to the automatic joining system, it is possible to perform the quality management easily.

Furthermore, it is favorable that the measuring unit measures the ridge line position and also measures the position of the rotating tool, the controlling device sets an acceptable range of the moving route and the moving route based on the ridge line position before the friction stir joining is performed, and the determining unit determines whether the position of the rotating tool during the friction stir joining is within the acceptable range.

Additionally, it is favorable that the measuring unit measures the ridge line position and also measures the load, and the determining unit determines whether the load during the friction stir joining is within a predetermined numerical range.

Moreover, it is favorable that, the measuring unit measures the ridge line position and also measures the position of the rotating tool and the load, and the determining unit determines whether at least one of the position of the rotating tool during the friction stir joining and the load during the friction stir joining is within a predetermined numerical range.

Furthermore, it is favorable that, the position of the rotating tool is right and left positions with respect to an advancing direction of the rotating tool.

According to the automatic joining system, it is possible to prevent a failure due to the right and left positions of the rotating tool during the friction stir joining.

Moreover, it is favorable to further include an inspecting unit that measures at least either of the burr height and the surface roughness of the joining portion after the friction stir joining.

According to the automatic joining system, it is possible to perform the quality management more easily.

Furthermore, it is favorable that the friction stir device includes a load measuring unit that measures a reaction load in an axial direction applied to the rotating tool, and the friction stir device is load-controlled such that the reaction load is substantially constant based on a result of the load measuring unit.

According to the automatic joining system, since the reaction load of the rotating tool can be substantially constant, it is possible to enhance the joining accuracy.

Additionally, it is favorable that a front surface side of the platform is formed of aluminum or an aluminum alloy plate, and an anodized coating is formed on the front surface.

According to the automatic joining system, it is possible to enhance the abrasion resistance and the corrosion resistance of the platform.

(Appendix 4)

An automatic joining system according to the present invention is an automatic joining system that buts end surfaces of a first metallic member and a second metallic member arranged on a platform to each other such that a front surface of the second metallic member is lower than a front surface of the first metallic member and performs friction stir joining of a butting portion including a step, including: a friction stir device that includes a rotating tool performing friction stir and performs friction stir joining of the butting portion; a measuring unit that measures a ridge line position of the first metallic member; and a controlling device that controls the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a set moving route as an instructing position to move the rotating tool, based on a difference between a traveling trajectory along which the rotating tool is moved by being controlled to move along the set moving route, while the rotating tool is inserted, and while the friction stir joining is performed, and the target moving route, the controlling device calculates a modified moving route in which an instructing position of the rotating tool is set at a position at which an advancing direction of the set moving route is displaced obliquely with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

According to the automatic joining system, with the modified moving route set based on the target moving route, and with the rotating tool controlled to move along the modified moving route, it is possible to set accurately the route along which the rotating tool actually moves. Particularly, with the advancing direction displaced obliquely to set the modified moving route, it is possible to prevent the shifting of the right and left positions of the rotating tool with respect to the advancing direction. Additionally, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces.

Additionally, it is favorable that, the controlling device sets the set moving route at a position displaced in parallel from the target moving route, and calculates the modified moving route, based on a difference between a traveling trajectory along which the rotating tool is controlled to move along the set moving route and the target moving route, at a position at which an advancing direction of the set moving route is displaced obliquely toward the first metallic member side by the difference as advancing in an advancing direction of the rotating tool.

Moreover, it is favorable that, based on a difference between a traveling trajectory along which the rotating tool is controlled to move along the set moving route and the target moving route, the controlling device calculates the modified moving route in which an instructing position of the rotating tool is set at a position at which an advancing direction of the set moving route is displaced obliquely and also displaced in substantially parallel with respect to the target moving route.

According to the automatic joining system, with the modified moving route set based on the difference calculated in advance, it is possible to set more accurately the route along which the rotating tool actually moves.

Furthermore, it is favorable that, the controlling device sets the set moving route at a position displaced from the target moving route in parallel, obtains a traveling trajectory along which the rotating tool is controlled to move along the set moving route, and sets the modified moving route at a position at which, by an angle of oblique displacement of the traveling trajectory with respect to the target moving route, an advancing direction of the set moving route is displaced obliquely in an opposite direction of the direction in which the traveling trajectory is displaced, and at which, by a length of substantially parallel displacement of the traveling trajectory with respect to the target moving route, also the set moving route is displaced in substantially parallel in an opposite direction of the direction in which the traveling trajectory is displaced.

According to the automatic joining system, it is possible to set more accurately the route along which the rotating tool actually moves.

(Appendix 5)

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a measuring unit that measures a clearance amount between the first metallic member and the second metallic member; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines the clearance amount before the friction stir joining is performed is within a predetermined numerical range.

According to the automatic joining system, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces. Additionally, with the determining unit provided that determines whether the clearance amount is within a predetermined numerical range, it is possible to prevent a failure due to the clearance amount.

Moreover, it is favorable that the fixing device includes a clamp unit that fixes the first metallic member and the second metallic member to the platform, and when the clearance amount is determined to be out of the predetermined numerical range, the clamp unit releases the fixation of the first metallic member and the second metallic member.

According to the automatic joining system, for example, with the first metallic member and the second metallic member reset to the fixing device, it is possible to perform the friction stir joining in a favorable manner.

Moreover, it is favorable that, when the clearance amount is determined to be out of the predetermined numerical range, the controlling device determines the first metallic member and the second metallic member as an out-of-numerical-range product.

According to the automatic joining system, it is possible to perform the quality management easily.

Moreover, it is favorable to further include an inspecting unit that measures at least either of the burr height and the surface roughness of the joining portion after the friction stir joining.

According to the automatic joining system, it is possible to perform the quality management more easily.

Furthermore, it is favorable that the friction stir device includes a load measuring unit that measures a reaction load in an axial direction applied to the rotating tool, and the friction stir device is load-controlled such that the reaction load is substantially constant based on a result of the load measuring unit.

According to the automatic joining system, since the reaction load of the rotating tool can be substantially constant, it is possible to enhance the joining accuracy.

Additionally, it is favorable that a front surface side of the platform is formed of aluminum or an aluminum alloy plate, and an anodized coating is formed on the front surface.

According to the automatic joining system, it is possible to enhance the abrasion resistance and the corrosion resistance of the platform.

(Appendix 6)

An automatic joining system according to the present invention includes: a fixing device that fixes a first metallic member and a second metallic member arranged on a platform in a state where a butting portion including a step is formed by butting end surfaces to each other such that a front surface of the second metallic member is lower than a front surface of the first metallic member; a friction stir device that includes a rotating tool performing friction stir and performs friction stir joining of the butting portion; a temperature adjusting unit that is provided in the fixing device and performs measurement of a temperature of the platform and adjustment of the temperature; and a controlling device that controls the fixing device and the friction stir device. Here, the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the joining portion while maintaining a predetermined aiming angle of the rotating tool and while pressing a plastic fluidized material by a stepped bottom surface of the pin step portion, and the controlling device includes a determining unit that determines the temperature before the friction stir joining is performed is within a predetermined numerical range.

According to the automatic joining system, with the friction stir joining performed while the plastic fluidized material is pressed by the stepped bottom surface of the pin step portion of the base end side pin, it is possible to prevent occurrence of a burr and occurrence of an undercut and also possible to clean up the joining front surfaces. Additionally, with the determining unit provided that determines whether the temperature of the temperature adjusting unit is within a predetermined numerical range, it is possible to prevent a failure due to the temperature.

Additionally, it is favorable that the controlling device is capable of controlling the temperature adjusting unit to increase or decrease the temperature, and when the temperature is determined to be out of the predetermined numerical range, the controlling device increases or decreases the temperature such that the temperature is within the predetermined numerical range.

According to the automatic joining system, it is possible to inhibit occurrence of a cavity defect due to the temperatures of the first metallic member and the second metallic member.

Moreover, it is favorable that, when the temperature of the temperature adjusting unit is determined to be out of the predetermined numerical range, the controlling device determines the first metallic member and the second metallic member as an out-of-numerical-range product.

According to the automatic joining system, it is possible to perform the quality management easily.

Moreover, it is favorable to further include an inspecting unit that measures at least either of the burr height and the surface roughness of the joining portion after the friction stir joining.

According to the automatic joining system, it is possible to perform the quality management more easily.

Furthermore, it is favorable that the friction stir device includes a load measuring unit that measures a reaction load in an axial direction applied to the rotating tool, and the friction stir device is load-controlled such that the reaction load is substantially constant based on a result of the load measuring unit.

According to the automatic joining system, since the reaction load of the rotating tool can be substantially constant, it is possible to enhance the joining accuracy.

Additionally, it is favorable that a front surface side of the platform is formed of aluminum or an aluminum alloy plate, and an anodized coating is formed on the front surface.

According to the automatic joining system, it is possible to enhance the abrasion resistance and the corrosion resistance of the platform.

EXAMPLES

<Test 1: Relationship Between Step Dimension h and Burr Height S>

Figure 21A:
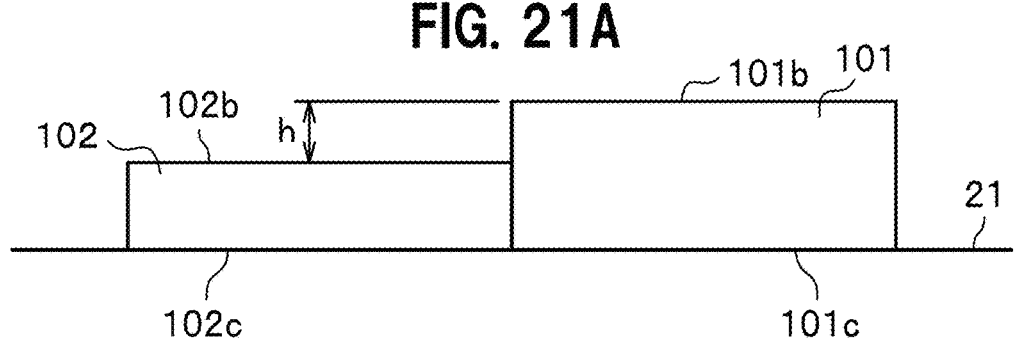
FIG. 21A is a schematic diagram showing a step dimension of a first metallic member and a second metallic member in Test 1 in an example.

Next, examples of the present invention are described. First, Test 1 for checking a relationship between the step dimension h and the burr height S was conducted. In Test 1, as shown in FIG. 21A, the first metallic member 101 and the second metallic member 102 were prepared. The step dimension h means a dimension from the front surface 101$b$ of the first metallic member 101 to the front surface 102$b$ of the second metallic member 102. The burr height S was obtained by the measuring unit 34 measuring the distance from the front surface 102$b$ of the second metallic member 102 to a tip end of a burr.

Both the first metallic member 101 and second metallic member 102 were an aluminum alloy. The plate-thickness dimension of the first metallic member 101 was 2.0 mm, and the plate-thickness dimension of the second metallic member 102 was 1.2 mm. Accordingly, when the entire surfaces of the back surfaces 101$c$ and 102$c$ of the first metallic member 101 and the second metallic member 102 have surface contact with the platform 21 as shown in FIG. 21A, the step dimension h is 0.8 mm.

Figure 21B:
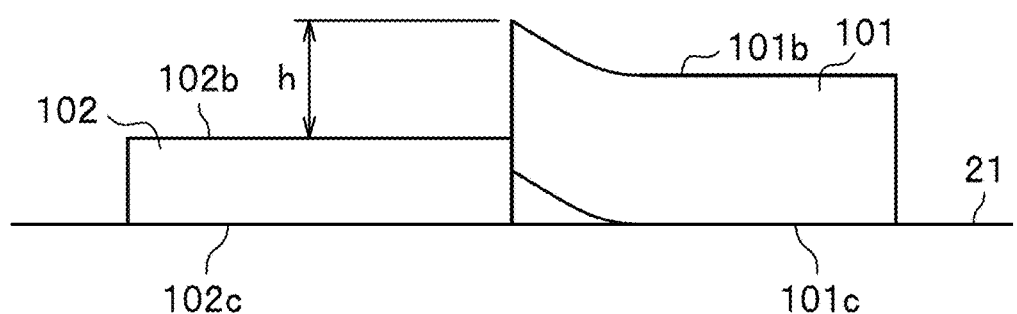
FIG. 21B is a schematic side view showing a state where the step dimension of the first metallic member and the second metallic member is great in Test 1 in the example.

FIG. 21B is a schematic side view showing a state in Test 1 in the example where the step dimension of the first metallic member and the second metallic member is great. When the two members are butted to each other, and the end portion of the first metallic member 101 warps upward as shown in FIG. 21B, the step dimension h may be great (may be excessively great) in some cases. The warping may be caused by a foreign object such as dust entering between the first metallic member 101 and the platform 21.

Figure 21C:
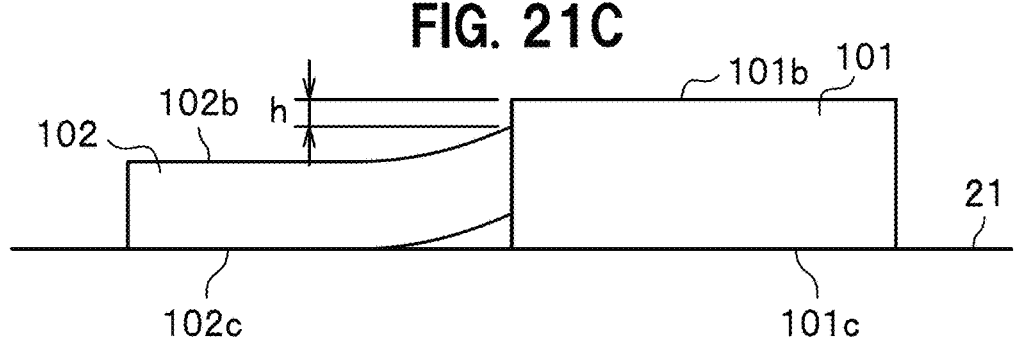
FIG. 21C is a schematic side view showing a state where the step dimension of the first metallic member and the second metallic member is small in Test 1 in the example.

On the other hand, FIG. 21C is a schematic side view showing a state in Test 1 in the example where the step dimension of the first metallic member and the second metallic member is small. When the two members are butted to each other, and the end portion of the second metallic member 102 warps upward as shown in FIG. 21C, the step dimension h may be small (may be excessively small) in some cases. The warping may be caused by a foreign object such as dust entering between the second metallic member 102 and the platform 21.

Figure 21D:
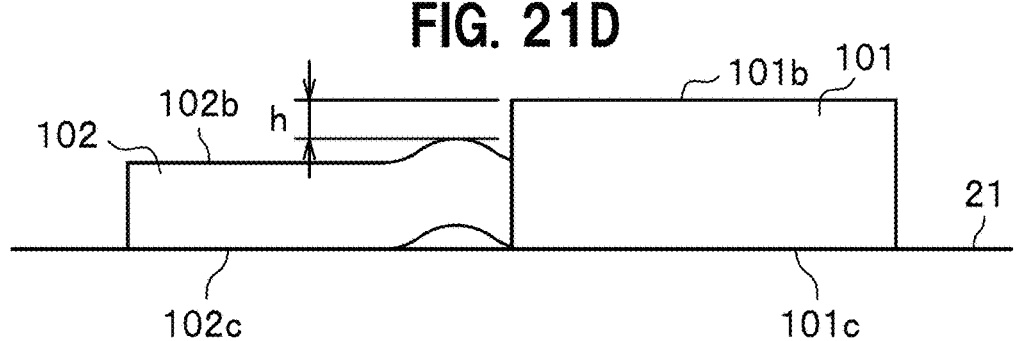
FIG. 21D is a schematic side view showing another state where the step dimension of the first metallic member and the second metallic member is small in Test 1 in the example.

Additionally, FIG. 21D is a schematic side view showing another state in Test 1 in the example where the step dimension of the first metallic member and the second metallic member is small. When the two members are butted to each other, and the end portion of the second metallic member 102 is curved as shown in FIG. 21D, the step dimension h may be small (may be excessively small) in some cases. Particularly, since the second metallic member 102 has a small plate-thickness, the end portion is likely to warp or to be curved.

In Test 1, multiple test objects of a pair of the first metallic member 101 and the second metallic member 102 were prepared, and after the step dimension h was measured by moving the measuring unit 34 over the entire length of the butting portion J1 of each test object, the friction stir joining was performed on the each test object under the same conditions. The burr height S was measured by moving, also after the joining, the measuring unit 34 over the entire length of the butting portion J1 of each test object.

Figure 22:
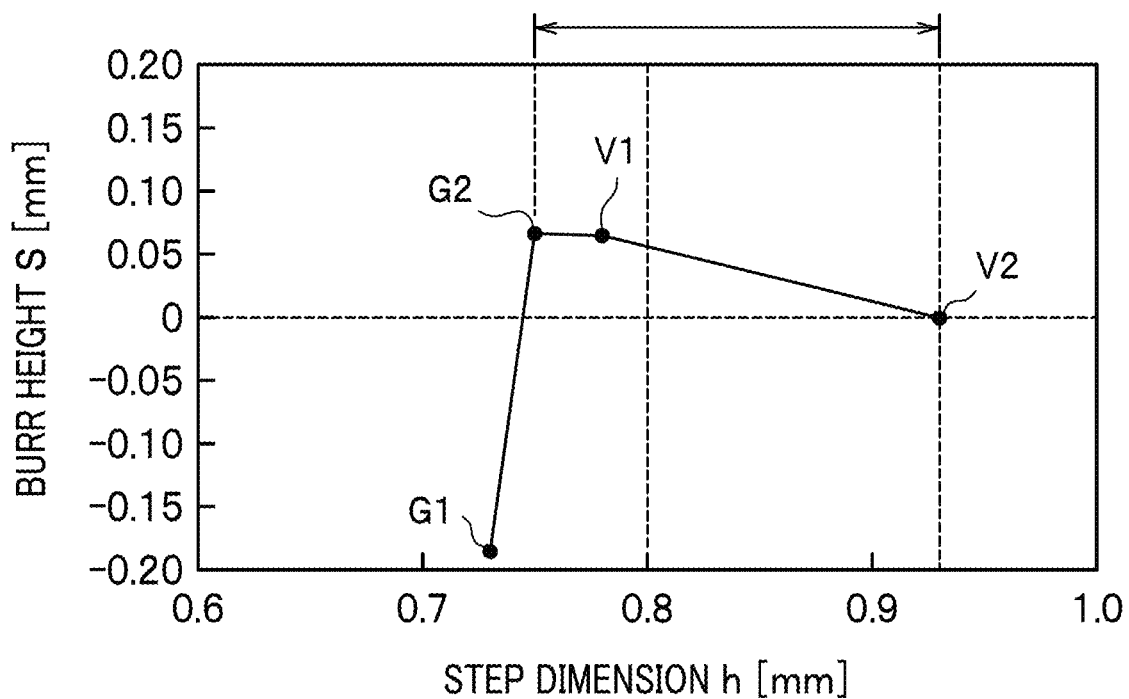
FIG. 22 is a graph showing a relationship between the step dimension and a burr height in Test 1 in the example.

FIG. 22 is a graph showing the relationship between the step dimension and the burr height in Test 1 in the example. In FIG. 22, the step dimension h and the burr height S were checked by extracting two objects from the multiple test objects and additionally extracting two points from each of the test objects. In a result G1 in FIG. 22, a position at which the step dimension h is small was extracted in the one test object, and the step dimension h=0.73 mm while the burr height S=−0.185 mm. When the burr height S is negative, it means that there is an undercut.

In a result G2 in FIG. 22, a position at which the step dimension h is substantially a median was extracted in the one test object, and the step dimension h=0.75 mm while the burr height S=0.067 mm.

In a result V1 in FIG. 22, a position at which the step dimension h is substantially the median was extracted in the other test object, and the step dimension was 0.78 mm while the burr height S=0.065 mm. In a result V2, a position at which the step dimension h is great was extracted in the other test object, and the step dimension h=0.093 mm while the burr height S=0 mm.

The results in FIG. 22 show that the step dimension h affects the burr height S. In the result G1, since an undercut occurs, the step dimension h is excessively small. Additionally, as indicated by the result V2, in a case of being more than the step dimension h=0.93 mm, an undercut is likely to occur. Accordingly, it is favorable to set the predetermined numerical range of the step dimension h to 0.75≤h≤0.93, for example.

Additionally, according to Test 1, there is a tendency that, when the step dimension h becomes gradually greater from the vicinity of the median (0.8 mm), the position Yn of the rotating tool F is displaced toward the second metallic member 102 side on which the plate-thickness is small, and the burr height S becomes small. On the other hand, it is inferred that, when the step dimension h becomes excessively small (becomes around 0.73 mm), an effect on the position Yn of the rotating tool F is small, but the rotating tool F carves the end portion of the second metallic member 102 by the uplifted amount of the end portion of the second metallic member 102, and thus an undercut occurs.

Moreover, a tilt in the graph on the excessively small side of the step dimension h is greater than a tilt in the graph on the excessively great side. That is, it is considered that a reduction amount in the burr height S affects the uplifting of the second metallic member 102 greatly.

<Test 2: Relationship Between Clearance Amount D and Burr Height S>

Next, Test 2 for checking a relationship between the clearance amount D and the burr height S was conducted. In Test 2, six test objects (test objects TP11, TP12, TP13, TP14, TP15, and TP16) of a pair of the first metallic member 101 and the second metallic member 102 were prepared, and the friction stir joining was performed. Before the friction stir joining was performed, each clearance amount D was measured by moving the measuring unit 34 along the butting portion J1. The clearance amount D is a clearance dimension between the corresponding members before the friction stir joining. Both the first metallic member 101 and second metallic member 102 were an aluminum alloy. The step dimension h of the first metallic member 101 and the second metallic member 102 was 0.8 mm. The joining length was 1800 mm.

Figure 23:
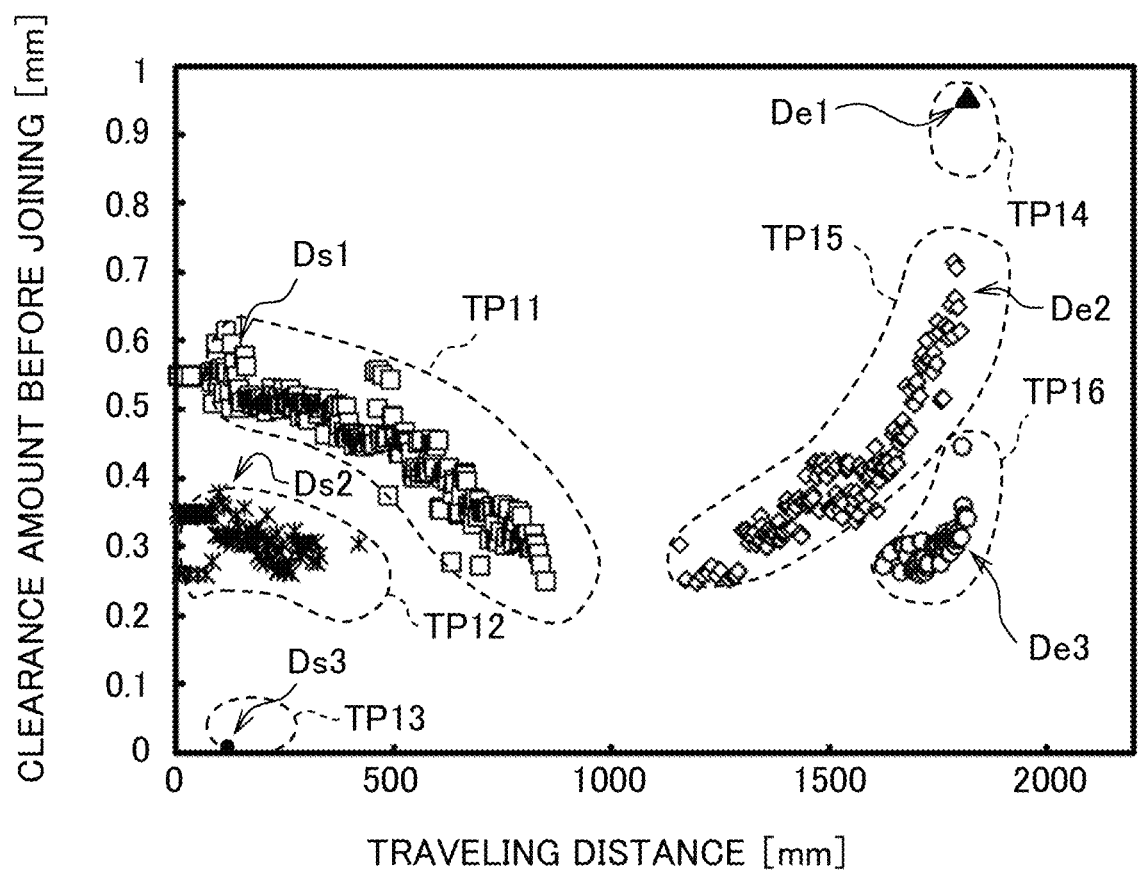
FIG. 23 is a graph showing a relationship between a traveling distance and a clearance amount before joining in Test 2 in the example.

FIG. 23 is a graph showing a relationship between a traveling distance and the clearance amount before the joining in Test 2 in the example. As shown in FIG. 23, the test objects TP11, TP12, and TP13 are results of the measuring of the clearance amount from a start position (the traveling distance of 0 mm) to 1000 mm. The test objects TP14, TP15, and TP16 are results of the measuring of the clearance amount from an end position (a position at which the traveling distance is 1800 mm) to 1000 mm. As shown in FIG. 23, regarding the clearance amount D before the friction stir joining, on the start position side, the clearance amount D is gradually reduced as being away from the start position. On the other hand, regarding the clearance amount D before the friction stir joining, the clearance amount D is gradually increased as being closer to the end position from the vicinity of the middle of the traveling distance. The end surfaces 101a and 102a of the first metallic member 101 and the second metallic member 102 are formed in the form of a substantially straight line in general. Accordingly, it is considered that, when the first metallic member 101 and the second metallic member 102 are butted to each other, the first metallic member 101 and the second metallic member 102 are arranged in a state of being slightly away from each other than being parallel where being close to each other at either of the start position and the end position while a clearance occurs at the other, and thus the clearance amount D becomes greater as being closer to the start position or the end position.

Figure 24:
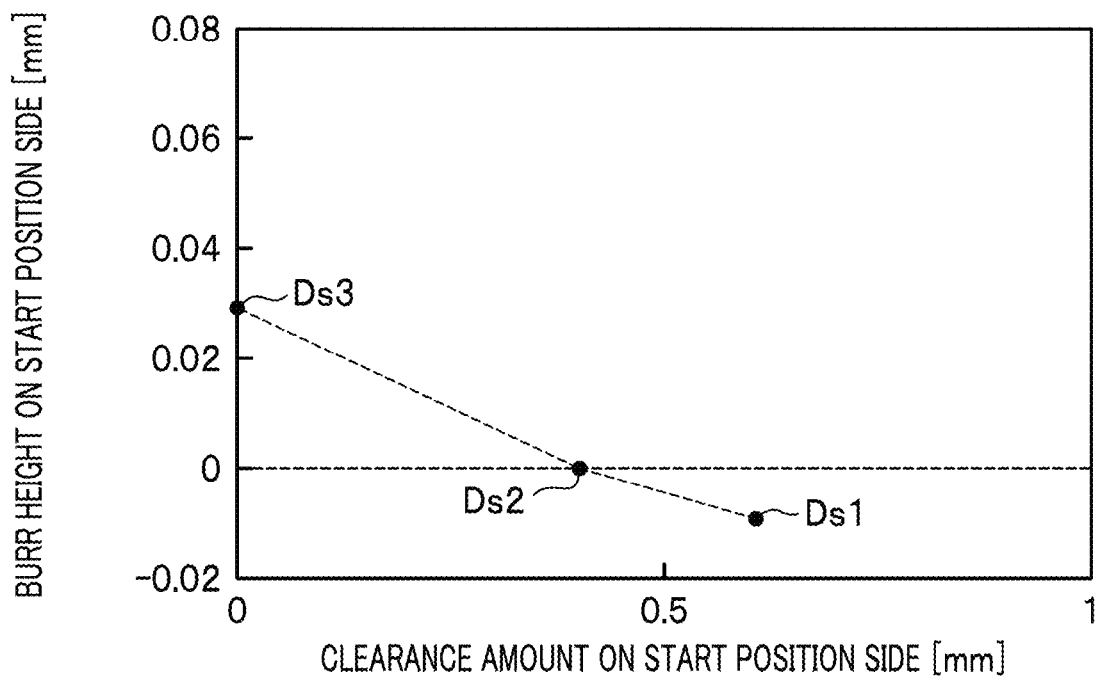
FIG. 24 is a graph showing a relationship between a clearance amount on a start position side and a burr height on the start position side in Test 2 in the example.
Figure 25:
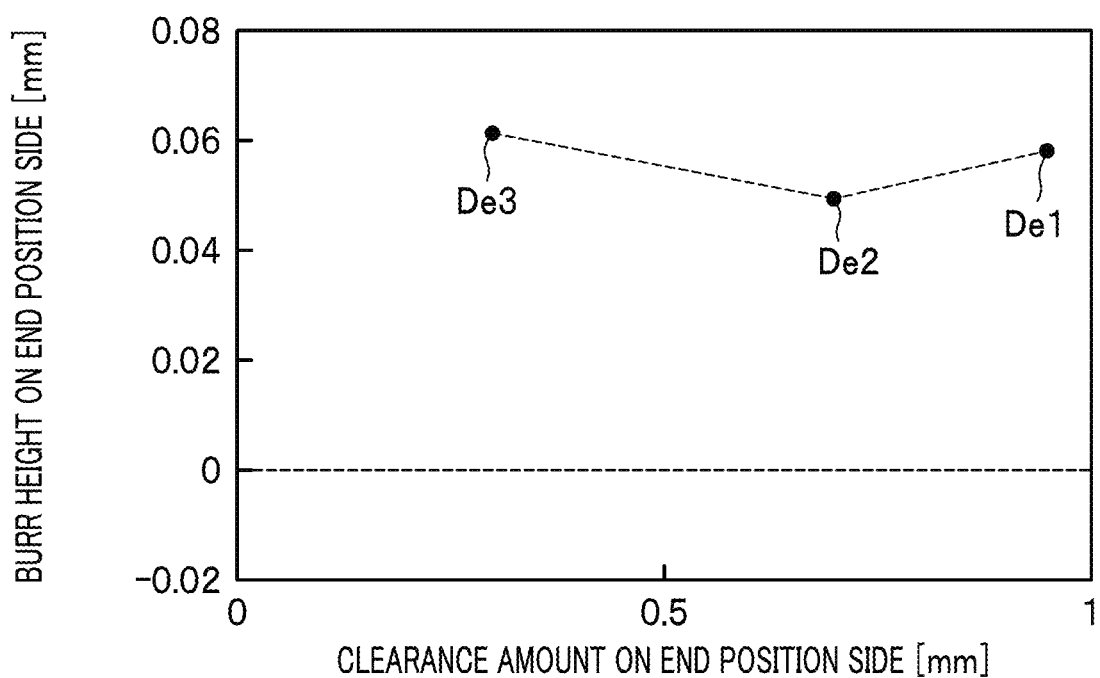
FIG. 25 is a graph showing a relationship between a clearance amount on an end position side and a burr height on the end position side in Test 2 in the example.

FIG. 24 is a graph showing a relationship between the clearance amount on the start position side and the burr height on the start position side in Test 2 in the example. FIG. 25 is a graph showing a relationship between the clearance amount on the end position side and the burr height on the end position side in Test 2 in the example.

In FIG. 24, a result Ds1 was extracted from the test object TP11 in FIG. 23, a result Ds2 was extracted from the test object TP12 in FIG. 23, and a result Ds3 was extracted from the test object TP13 in FIG. 23.

In the result Ds1, the clearance amount D=0.6 mm while the burr height S=−0.01 mm.

In the result Ds2, the clearance amount D=0.4 mm while the burr height S=0 mm.

In the result Ds3, the clearance amount D=0 mm while the burr height S=0.029 mm.

In FIG. 25, a result De1 was extracted from the test object TP14, a result De2 was extracted from the test object TP15, and a result De3 was extracted from the test object TP16 in FIG. 23.

In the result De1, the clearance amount D=0.95 mm while the burr height S=0.06 mm.

In the result De2, the clearance amount D=0.70 mm while the burr height S=0.05 mm.

In the result De3, the clearance amount D=0.30 mm while the burr height S=0.06 mm.

As shown in FIGS. 24 and 25, when the clearance amount D on the start position side was great, the burr height S on the start position side was small. However, in the result Ds1, an undercut occurs. It is considered that, when the clearance amount D is great, the rotating tool is inserted deeply even with the same set load (pressing load), and the rotating tool F is displaced toward the second metallic member 102 side on which the plate-thickness is small.

As shown in FIG. 25, on the end position side, the burr height S on the end position side was substantially constant regardless of the clearance amount D on the end position side. It is inferred that this is because the clearance is gradually reduced as the butting portion J1 is joined and the friction stir joining is advanced toward the end position side. Additionally, it is inferred that this is because the clearance is reduced with the first metallic member 101 and the second metallic member 102 bulging by a frictional heat. Considering the results of FIGS. 24 and 25, it is found out that the clearance amount D on the start position side more affects the burr height S than that on the end position side. That is, when the clearance amount D is compared with the predetermined numerical range, although clearance amounts in the entire length of the butting portion J1 may be the target, it is preferred to extract a clearance amount at a predetermined distance (for example, 50 to 100 mm) from the start position, for example.

<Test 3: Relationship Between Position of Rotating Tool F During Friction Stir Joining and Burr Height and Oxide Coating>

Figure 26:
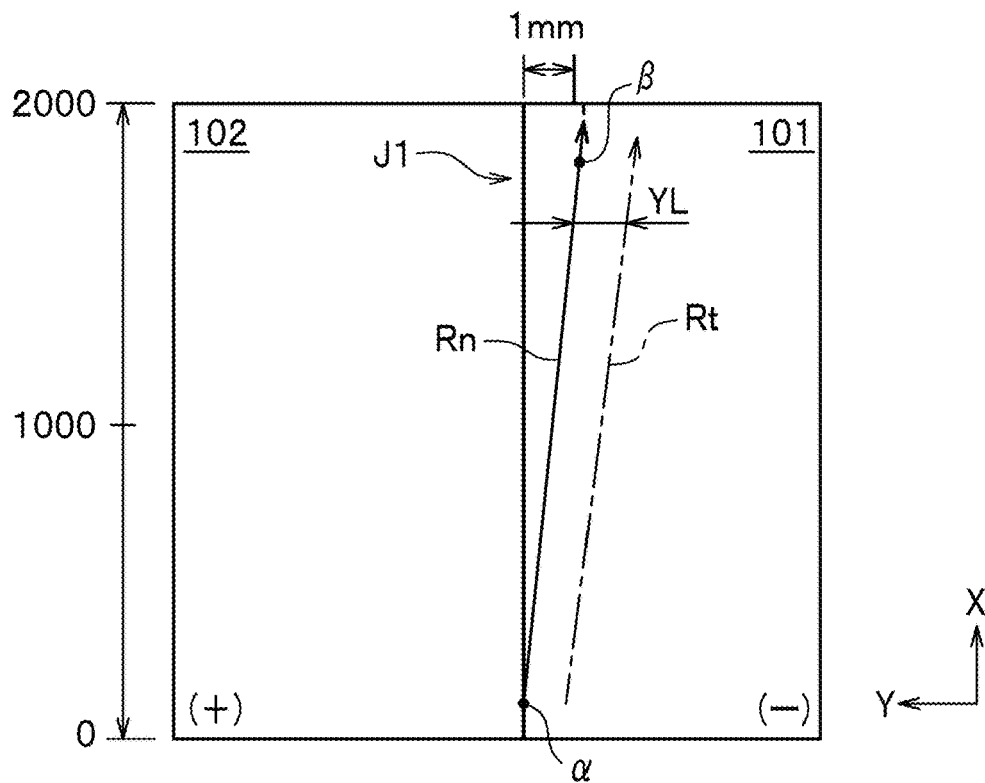
FIG. 26 is a schematic plan view showing an overview of Test 3 in the example.
Figure 27:
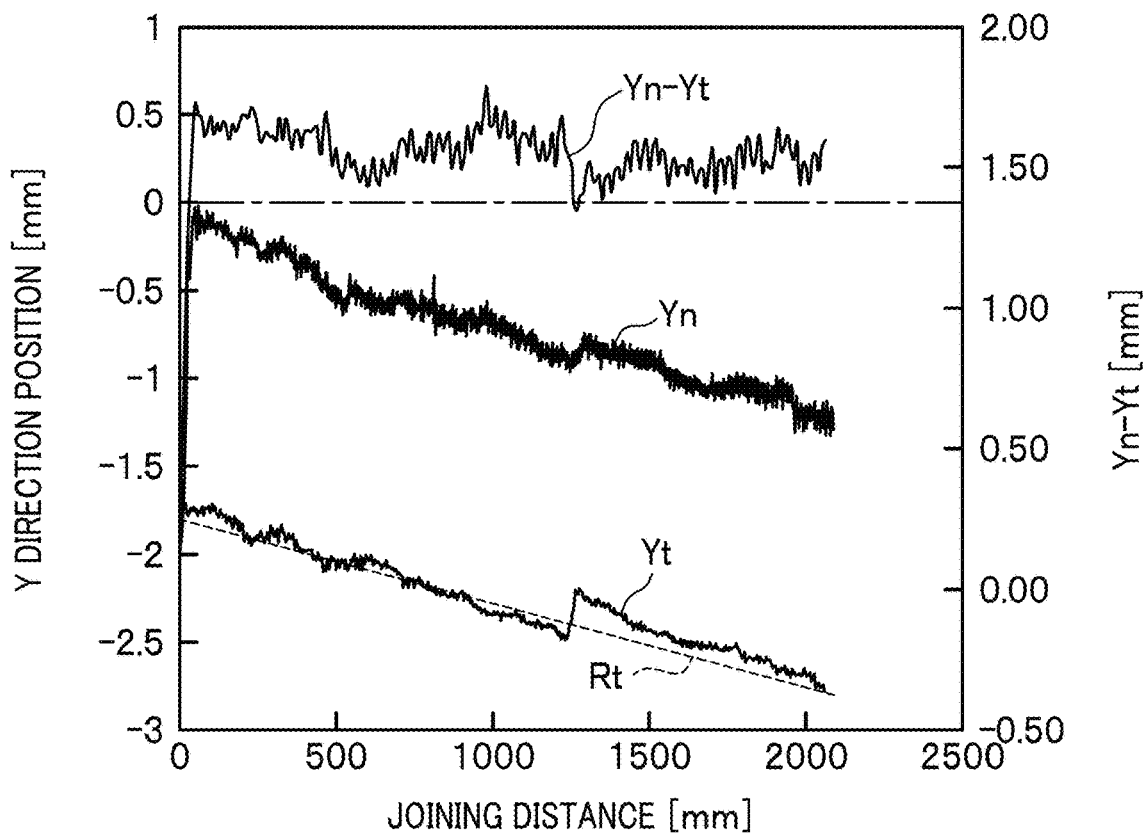
FIG. 27 is a graph showing a relationship between a joining distance and a Y direction position in Test 3 in the example.

Next, Test 3 for checking a relationship between the position of the rotating tool F during the friction stir joining and the burr height and the oxide coating was conducted. As shown in FIG. 26, in Test 3, after the first metallic member 101 and the second metallic member 102 are butted to each other to form the butting portion J1, the rotating tool F is not moved along the butting portion J1 but purposefully moved obliquely to be gradually away from the butting portion J1, and thus the relationship between the position Yn of the rotating tool F and the burr height S and an oxide coating K was checked. In FIGS. 26 and 27, for the sake of convenience for description, the scale in the X direction and the Y direction is changed for easy understanding of the movement in the Y direction. In FIG. 26, the rotating tool F is moved from the near side to the far side in FIG. 26.

FIG. 26 shows a relationship between a set moving route Rt that is controlled when the rotating tool F is moved in a state with no load and a moving route Rn along which the rotating tool F passes through actually while being inserted in the metallic member when the friction stir is performed. As shown in FIG. 26, in this example, the moving route Rn of the rotating tool F is set to pass through from a point α to a point β. The point α is a position on the butting portion J1 at which the joining distance is 100 mm. The point β is a position at which the joining distance is 1800 mm and is a position that is 1.0 mm from the butting portion J1 to the first metallic member 101 side.

FIG. 27 is a graph showing a relationship between the joining distance and the Y direction position in this example. The set moving route Rt in FIG. 27 is a moving route that is set for a test trial. A position Yt indicates a trajectory through which a rotary center axis of the rotary driving device of the friction stir device 4 passes actually when the rotating tool F is moved along the set moving route Rt without being inserted. The trajectory can be measured by the measuring unit 34 (the line sensor). The negative side in FIG. 27 is the first metallic member 101 side with respect to the butting portion J1, and the positive side is the second metallic member 102 side. As indicated by the position Yt, when the rotating tool F is moved in a state with no load without being mounted, the set moving route Rt and the trajectory through which the rotary center axis passes actually are substantially overlapped with each other.

On the other hand, as shown in FIG. 27, when the friction stir joining is performed along the set moving route Rt while the rotating tool F is mounted, the rotating tool F passes through the trajectory indicated by the position Yn of the rotating tool F. That is, since there are the flexure, tendency, and the like of the machine (the robotic arm 31), and there is also a resistance that the rotating tool F receives from the first metallic member 101 and the second metallic member 102, even when the rotating tool F is inserted on the set moving route Rt at the start position, the rotating tool F in this example is displaced immediately to the vicinity of Y=0, and thereafter, the rotating tool F is moved in substantially parallel to the set moving route Rt at a position displaced from the set moving route Rt. As indicated by a (Yn−Yt) value in FIG. 27, in this example, a displacement (difference) of about 1.5 mm occurs between the set moving route Rt and the trajectory indicated by the position Yn. Accordingly, in the friction stir joining, it is favorable to set the moving route (the modified moving route) in consideration of this difference in the trajectory.

Figure 28A:
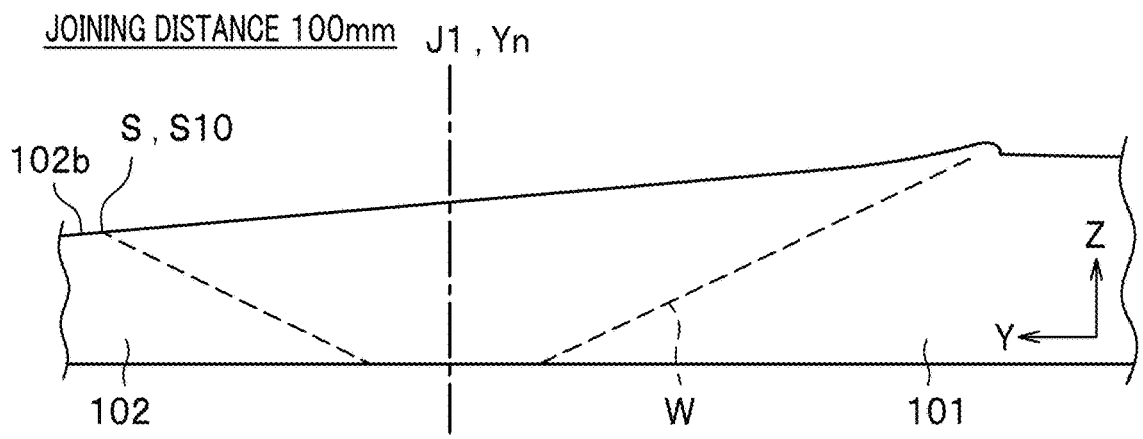
FIG. 28A is a cross-sectional view of a position at which the joining distance is 100 mm in Test 3 in the example.
Figure 28B:
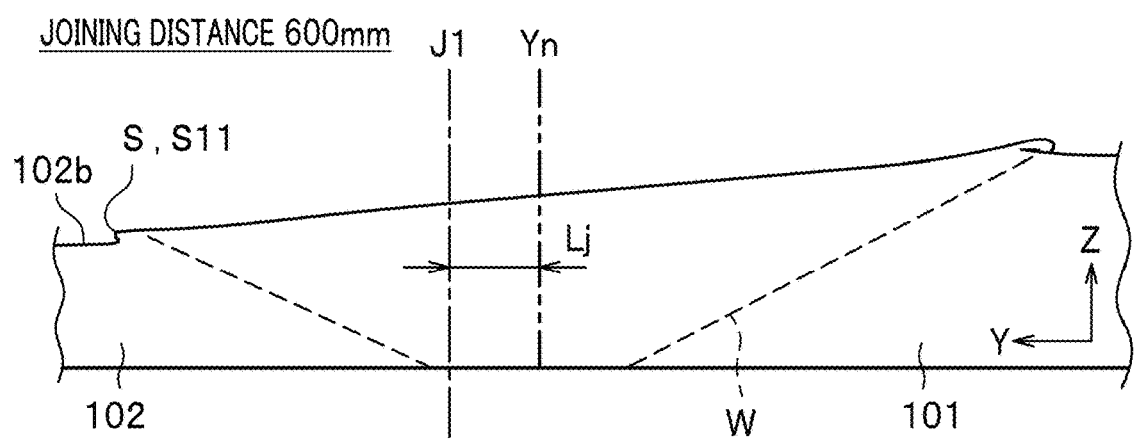
FIG. 28B is a cross-sectional view of a position at which the joining distance is 600 mm in Test 3 in the example.
Figure 28C:
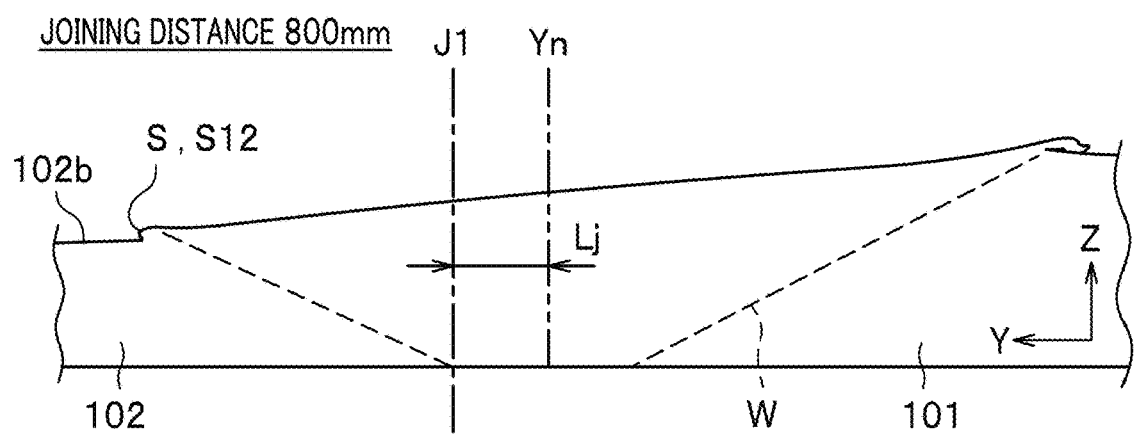
FIG. 28C is a cross-sectional view of a position at which the joining distance is 800 mm in Test 3 in the example.
Figure 29A:
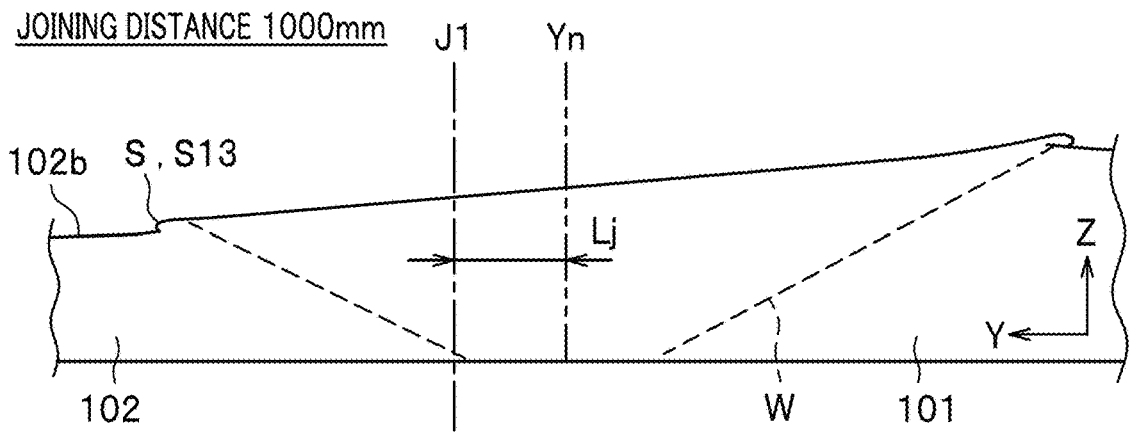
FIG. 29A is a cross-sectional view of a position at which the joining distance is 1000 mm in Test 3 in the example.
Figure 29B:
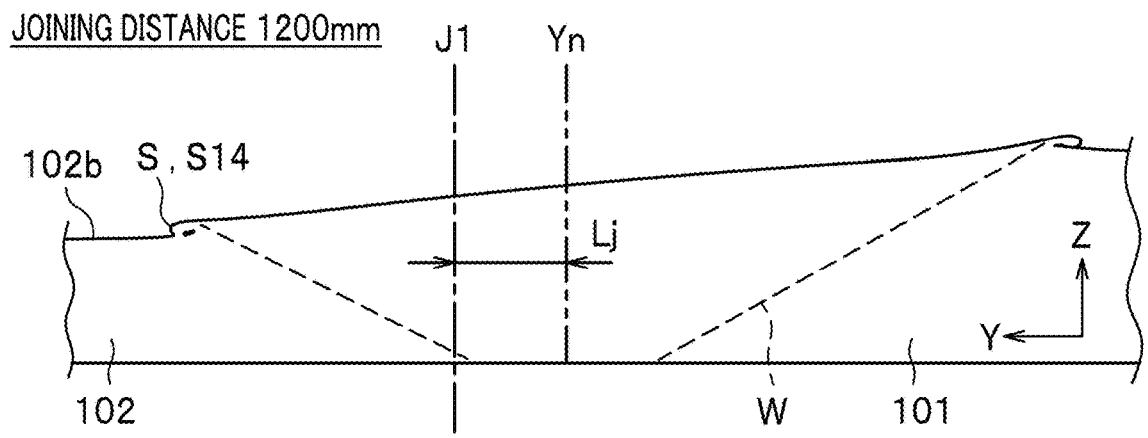
FIG. 29B is a cross-sectional view of a position at which the joining distance is 1200 mm in Test 3 in the example.
Figure 29C:
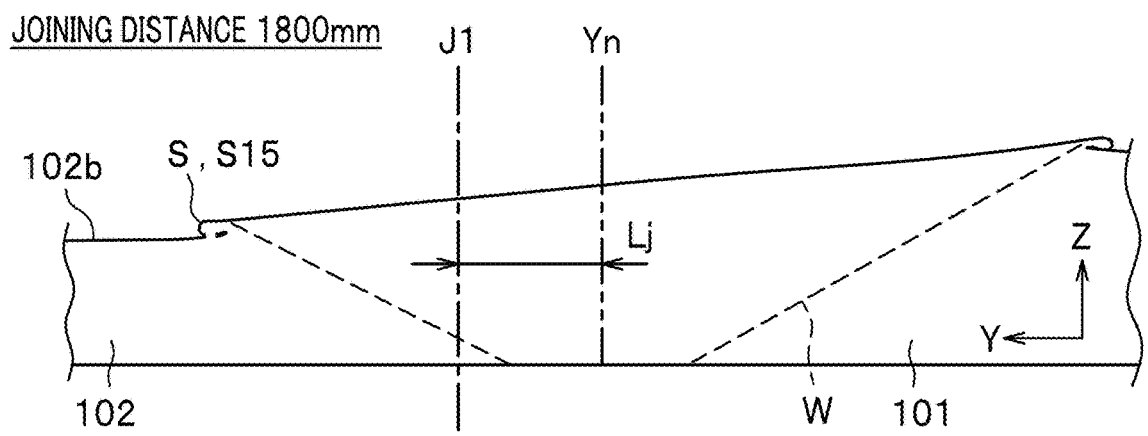
FIG. 29C is a cross-sectional view of a position at which the joining distance is 1800 mm in Test 3 in the example.

FIG. 28A is a cross-sectional view of a position at which the joining distance is 100 mm in Test 3 in the example. FIG. 28B is a cross-sectional view of a position at which the joining distance is 600 mm in Test 3 in the example. FIG. 28C is a cross-sectional view of a position at which the joining distance is 800 mm in Test 3 in the example. FIG. 29A is a cross-sectional view of a position at which the joining distance is 1000 mm in Test 3 in the example. FIG. 29B is a cross-sectional view of a position at which the joining distance is 1200 mm in Test 3 in the example. FIG. 29C is a cross-sectional view of a position at which the joining distance is 1800 mm in Test 3 in the example.

FIGS. 28A to 28C and FIGS. 29A to 29C show a state where the position Yn of the rotating tool F during the friction stir joining from the butting portion J1 is away from the butting portion J1 as the joining distance advances. A dotted line in the diagrams indicates a range of the plasticized region W of the rotating tool F. The burr height S is obtained by measuring the height dimension from the front surface 102b of the second metallic member 102.

As shown in FIG. 28A, at a position at which the joining distance is 100 mm, the butting portion J1 and the position Yn of the rotating tool F coincides with each other. The burr height S (S10) is 0.034 mm.

As shown in FIG. 28B, at a position at which the joining distance is 600 mm, a distance Lj from the butting portion J1 to the position Yn of the rotating tool F is 554 μm. The burr height S (S11) is 0.095 mm.

As shown in FIG. 28C, at a position at which the joining distance is 800 mm, the distance Lj is 686 μm. The burr height S (S12) is 0.105 mm.

As shown in FIG. 29A, at a position at which the joining distance is 1000 mm, the distance Lj is 743 μm. The burr height S (S13) is 0.092 mm.

As shown in FIG. 29B, at a position at which the joining distance is 1200 mm, the distance Lj is 840 μm. The burr height S (S14) is 0.113 mm.

As shown in FIG. 29C, at a position at which the joining distance is 1800 mm, the distance Lj is 1085 μm. The burr height S (S15) is 0.123 mm.

As shown in FIGS. 28A to 28C and FIGS. 29A to 29C, it is found out that the burr height S (the burr height on the second metallic member 102 side) is gradually increased as the position Yn of the rotating tool F is away from the butting portion J1. In other words, it is found out that the burr height S is reduced as the position Yn of the rotating tool F is close to the second metallic member 102 side.

Figure 32:
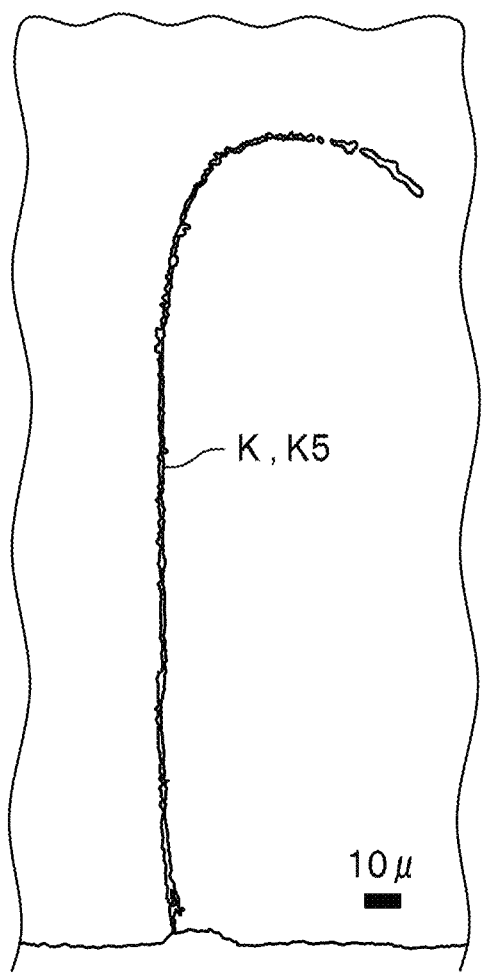
FIG. 32 is a macro cross-sectional view of a butting portion at a position at which the joining distance is 1800 mm in Test 3 in the example.

FIG. 30A is a macro cross-sectional view of the butting portion at the position at which the joining distance is 100 mm in Test 3 in the example. FIG. 30B is a macro cross-sectional view of the butting portion at the position at which the joining distance is 600 mm in Test 3 in the example. FIG. 30C is a macro cross-sectional view of the butting portion at the position at which the joining distance is 800 mm in Test 3 in the example. FIG. 31A is a macro cross-sectional view of the butting portion at the position at which the joining distance is 1000 mm in Test 3 in the example. FIG. 31B is a macro cross-sectional view of the butting portion at the position at which the joining distance is 1200 mm in Test 3 in the example. FIG. 32 is a macro cross-sectional view of the butting portion at the position at which the joining distance is 1800 mm in Test 3 in the example. That is, FIGS. 30A to 30C, 31A and 31B, and 32 are macro cross-sectional views of a periphery of the butting portion J1 at each position and show the size and shape of the oxide coating K.

As shown in FIG. 30A, there is no oxide coating at the position (the position Yn of the rotating tool F=0) at which the joining distance is 100 mm (K0).

As shown in FIG. 30B, the oxide coating K (K1) at the position (the position Yn of the rotating tool F=554 nm) at which the joining distance is 600 mm is 33 nm.

As shown in FIG. 30C, the oxide coating K (K2) at the position (the position Yn of the rotating tool F=686 nm) at which the joining distance is 800 mm is 59 nm.

As shown in FIG. 31A, the oxide coating K (K3) at the position (the position Yn of the rotating tool F=743 nm) at which the joining distance is 1000 mm is 72 nm.

As shown in FIG. 31B, the oxide coating K (K4) at the position (the position Yn of the rotating tool F=840 nm) at which the joining distance is 1200 mm is 115 nm.

As shown in FIG. 32, the oxide coating K (K5) at the position (the position Yn of the rotating tool F=1085 nm) at which the joining distance is 1800 mm is 235 nm.

Figure 33:
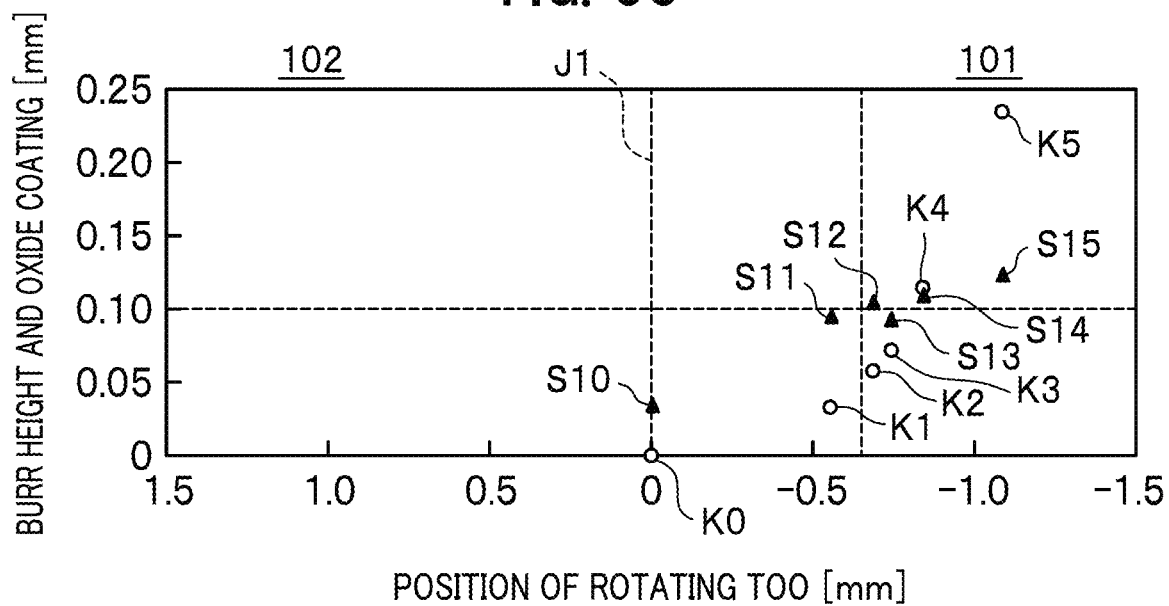
FIG. 33 is a graph showing a relationship between the position of the rotating tool and a burr height and an oxide coating height in Test 3 in the example.

FIG. 33 is a graph showing a relationship between the position of the rotating tool and the burr height and the oxide coating height in Test 3 in the example. As shown in FIG. 33, the burr height S is gradually increased as the position Yn of the rotating tool F during the friction stir joining is away from the butting portion J1. Additionally, the oxide coating K is also gradually increased as the position Yn of the rotating tool F during the friction stir joining is away from the butting portion J1. In other words, when the position Yn of the rotating tool F during the friction stir joining is close to the butting portion J1, both the burr height S and oxide coating K are reduced.

According to the result in FIG. 33, for example, when a threshold for the burr height S and the height of the oxide coating K is set to 0.10 mm, it is favorable that the position Yn of the rotating tool F is set to be within 0.6 mm (600 pin) from the butting portion J1 toward the second metallic member 102 side.

Figure 34:
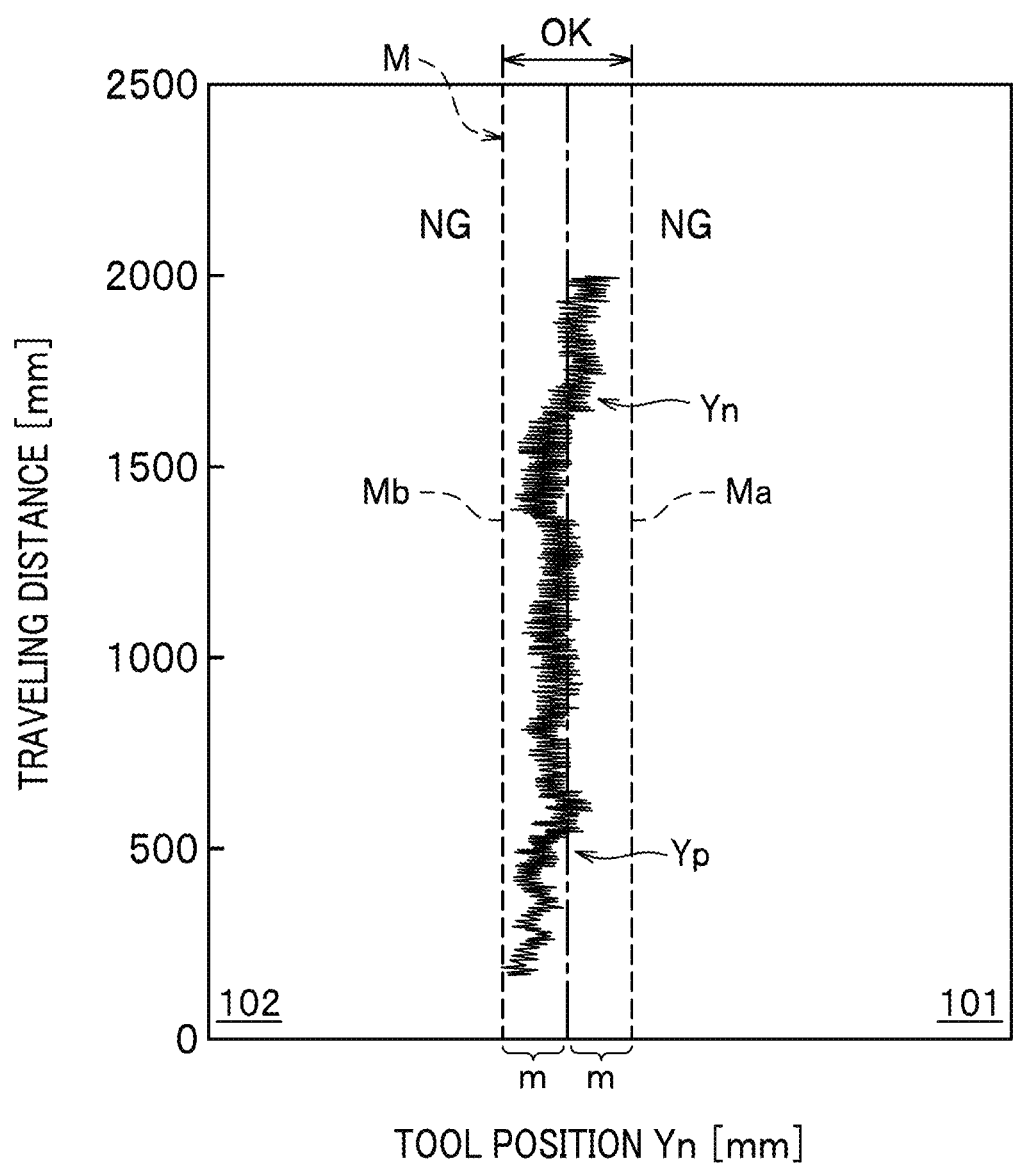
FIG. 34 is a schematic plan view showing the position of the rotating tool during the friction stir joining in Test 3 in the example.

Accordingly, as shown in FIG. 34, when the ridge line Yp is measured by measuring the ridge line of the first metallic member 101 is measured by moving the measuring unit 34 along the butting portion J1, it is favorable that a range of 0.6 mm (m=0.6 mm) to the first metallic member 101 side and 0.3 mm (m=0.3) to the second metallic member 102 side from the ridge line Yp as the center is set as the acceptable range M. Note that, the range of the acceptable range M is merely example, and the range may be set arbitrarily based on a required joining accuracy and the like.

<Test 4: Relationship Between Temperature and Cavity Defect Size>

Next, Test 4 for checking a relationship between the temperature and a cavity defect size was conducted. In Test 4, four pairs of the first metallic member 101 and the second metallic member 102 (test objects TP41, TP42, TP43, and TP44) were prepared, the temperature was set before the joining, and the friction stir joining was performed on each test object.

In the test object TP41, the friction stir joining was performed with no heater (room temperature of 20° C.), and the joining speed was raised from 500 mm/min to 1250 mm/min. In the test object TP42, the friction stir joining was performed with the temperature adjusting unit 23 setting the temperature to 30° C., and the joining speed was raised from 600 mm/min to 1000 mm/min.

Additionally, in the test object TP43, the temperature adjusting unit 23 set the temperature to 60° C., and the joining speed was raised from 600 mm/min to 1000 mm/min. Moreover, in the test object TP44, the temperature adjusting unit 23 set the temperature to 90° C., and the joining speed was raised from 600 mm/min to 1000 mm/min.

Figure 35:
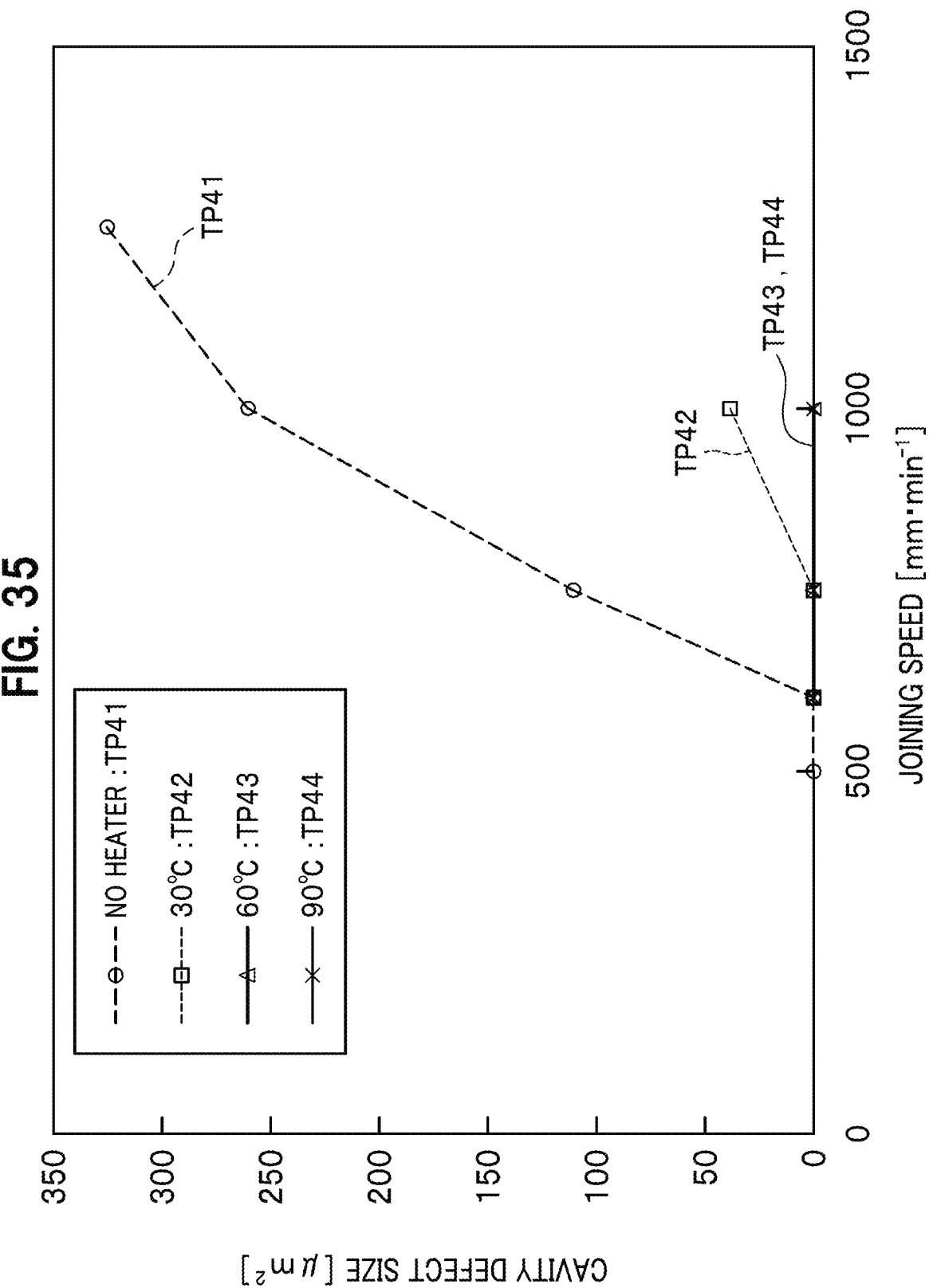
FIG. 35 is a graph showing a relationship between joining speed and a cavity defect size in Test 3 in the example.

As shown in FIG. 35, in the test object TP41, the temperature of the temperature adjusting unit 23 was 20° C., and the size of the cavity defect was considerably great. When the joining speed was raised, the cavity defect size was increased along with the rise. In the test object TP42, the temperature of the temperature adjusting unit 23 was 30° C., and the size of the cavity defect size was about 50 μm2. When the temperature of the temperature adjusting unit 23 was set to 60 to 90° C., there was almost no cavity defect. In this case, even when the joining speed was raised, there was no cavity defect.

According to the above, it is favorable that the predetermined numerical range of the temperature T of the temperature adjusting unit 23 is set to 60≤T≤90. In this case, since the cavity defect does not occur easily even when the joining speed is raised, it is possible to shorten the joining time while inhibiting the occurrence of the cavity defect.

<Test 5: Checking on Traveling Trajectory of Rotating Tool F>

Next, a test (Test 5) for checking a difference between the set moving route of the rotating tool F and the trajectory of the rotating tool F when the friction stir joining is performed actually was conducted. In Test 5, the first metallic member 101 and the second metallic member 102 having the plate-thickness smaller than that of the first metallic member 101 were butted to each other to form the butting portion J1, and the friction stir joining was performed on the butting portion J1 by using the rotating tool F. The length of the butting portion J1 was 1300 mm.

Figure 36:
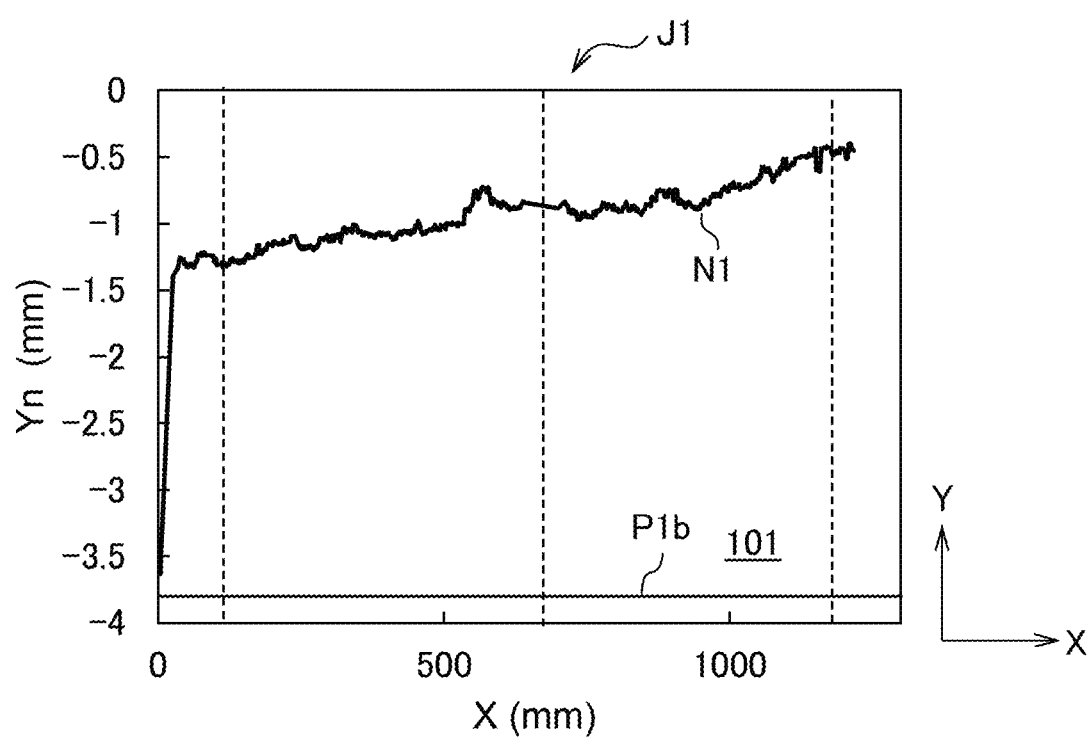
FIG. 36 is a graph showing a traveling trajectory of the rotating tool in Test 5.

FIG. 36 is a graph showing the traveling trajectory of the rotating tool in Test 5. The horizontal axis indicates the X direction (the advancing direction of the rotating tool F) while the vertical axis indicates the Y direction (the right and left direction with respect to the advancing direction of the rotating tool F). The butting portion J1 is assumed to be zero, and the first metallic member 101 side from the butting portion J1 is negative. As shown in FIG. 36, a set moving route (first moving route) P1$b$ in Test 5 was set in parallel to the butting portion J1 (Yn=0) at a position of Yn=−3.8 mm. The set moving route P1$b$ was set on the first metallic member 101.

A traveling trajectory N1 in Test 5 is a trajectory along which the rotating tool F actually moves when the friction stir joining is performed along the set moving route P1$b$. As indicated by the traveling trajectory N1, the rotating tool F is moved on the butting portion J1 side (the second metallic member 102 side) of the set moving route P1$b$. Additionally, the rotating tool F is displaced so as to be close to the butting portion J1 gradually in the advancing direction. That is, even though the set moving route P1$b$ is set in parallel to the butting portion J1, when the friction stir joining is actually performed, the rotating tool F is shifted toward the thin plate side (the second metallic member 102) while being advanced. In Test 5, it is found out that the rotating tool F was moved in a range of, substantially, Yn=−1.3 to −0.5.

Figure 37:
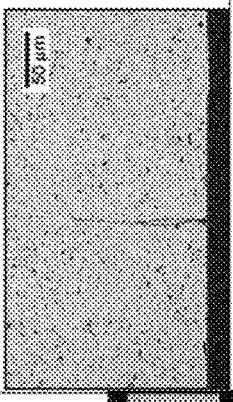
FIG. 37 is a macro structure diagram and a micro structure diagram of each position in Test 5.

FIG. 37 is a macro structure diagram and a micro structure diagram of each position in Test 5. The macro structure diagram is a vertical cross-sectional view with respect to the advancing direction of the rotating tool F. The micro structure diagram is an enlarged view of a part of the plasticized region at each position. Here, joining states at positions of sampling positions X=115, 675, and 1205 mm were checked. As shown in FIG. 37, at the position of the sampling position X=115, a root flaw (a joining defect) of 0.16 mm occurs. On the other hand, at the positions of the sampling positions X=675 and 1205 mm, almost no root flaw occurs. That is, it is found out that a risk of the occurrence of a root flaw is higher as being away from the butting portion J1. Additionally, it is found out that there is a risk that, when the modified moving route is set by moving in parallel by a difference with respect to the target moving route, the traveling trajectory of the rotating tool F along which the friction stir joining is performed may be displaced from the target moving route.

<Test 6: Modified Moving Route is Set Obliquely>

Figure 38:
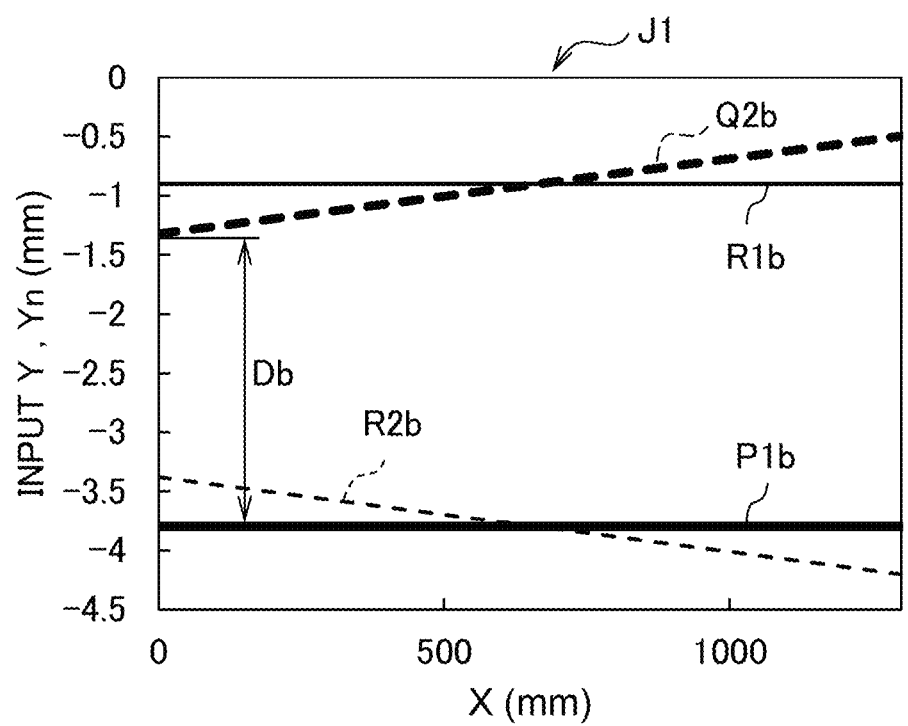
FIG. 38 is a schematic plan view for describing a calculating method of the modified moving route according to Test 6.

Then, the modified moving route (a second moving route) R2$b$ was calculated by implementing the above-described second modification under the conditions of Test 5, and thus a test (Test 6) for checking the joining accuracy when the friction stir joining is performed along the modified moving route R2$b$ was conducted. FIG. 38 is a schematic plan view for describing a calculating method of the modified moving route according to Test 6. As shown in FIG. 38, the target moving route R1$b$ was set at a position of Yn=−0.9 mm. The target moving route R1$b$ is parallel to the butting portion J1 (Yn=0). The target moving route R1$b$ is a route along which the rotating tool F is desired to travel when the friction stir joining is performed.

The set moving route (a first moving route) P1$b$ was set at a position of Yn=−3.8 mm to be parallel to the butting portion J1 (Yn=0) as with Test 5. The test trajectory (the traveling trajectory) Q2b is an approximate straight line obtained from the traveling trajectory N1 in Test 5.

First, the modified moving route R2b is calculated based on the target moving route R1b, the set moving route P1b, and the test trajectory Q2b. The modified moving route R2b is calculated by inverting the tilt of the test trajectory Q2b so as to be line-symmetric with the target moving route R1b and moving in parallel to a direction away from the butting portion J1 to be at a predetermined distance from the target moving route R1b. The predetermined distance means the shortest distance Db from the set moving route P1b to the test trajectory Q2b.

Figure 39:
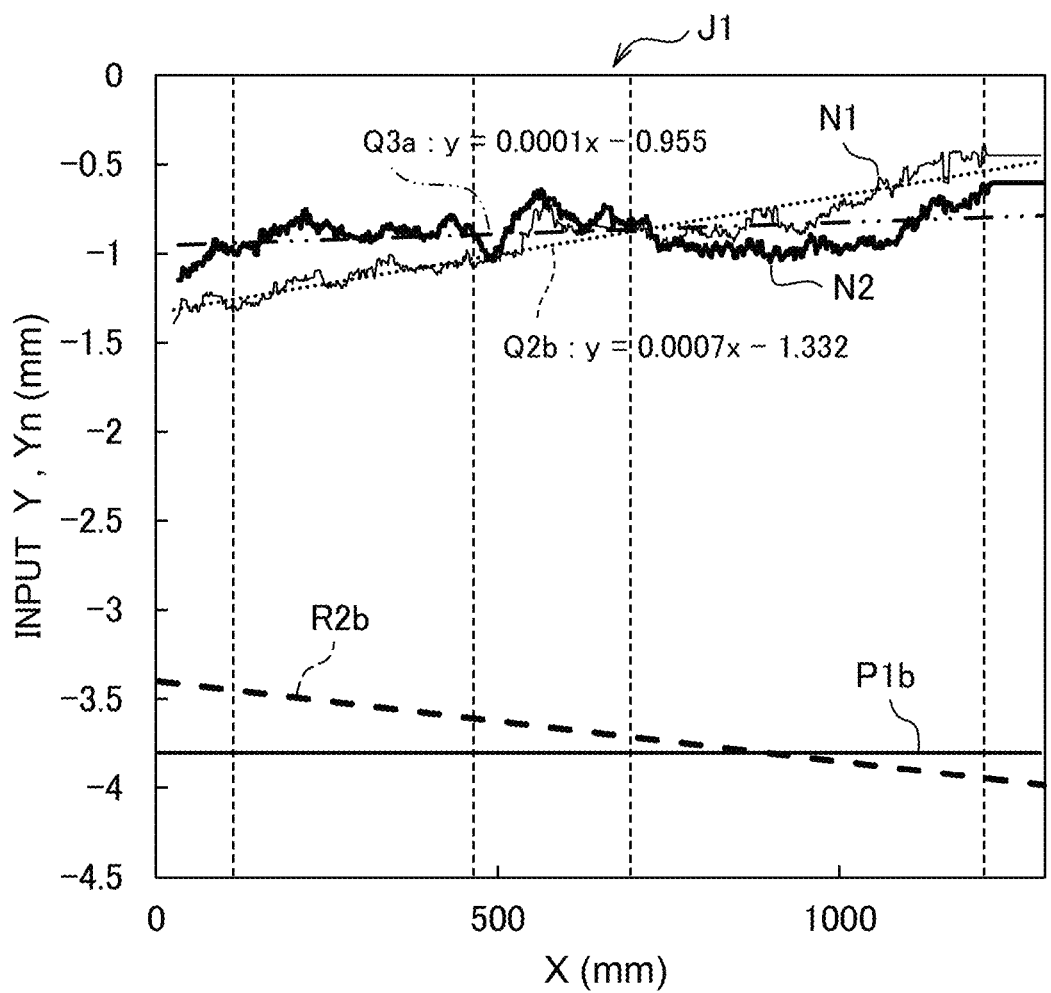
FIG. 39 is a graph showing a traveling trajectory of the rotating tool in Test 6.

Next, the friction stir joining is performed actually on the butting portion J1 by moving the rotating tool F along the modified moving route R2b. FIG. 39 is a graph showing the traveling trajectory of the rotating tool in Test 6. As shown in FIG. 39, a traveling trajectory N2 in Test 6 is a trajectory along which the rotating tool F actually moves when the friction stir joining is performed along the modified moving route R2b. A line shape Q3a is an approximate straight line of the traveling trajectory N2. The line shape Q3a expressed by a linear function indicated in the X axis and the Y axis is $y=0.0001x-0.955$.

On the other hand, the test trajectory Q2b as an approximate straight line of the traveling trajectory N1 performed in Test 5 expressed by a linear function indicated in the X axis and the Y axis is $y=0.0007x-1.332$. Thus, the line shape Q3a obtained by moving the rotating tool F along the modified moving route R2b is a value in which the tilt is smaller than that of the test trajectory Q2b, and the intercept of the line shape Q3a is close to that of the target moving route R1b ($Y_n=-0.9$ mm, see FIG. 38).

Figure 40:
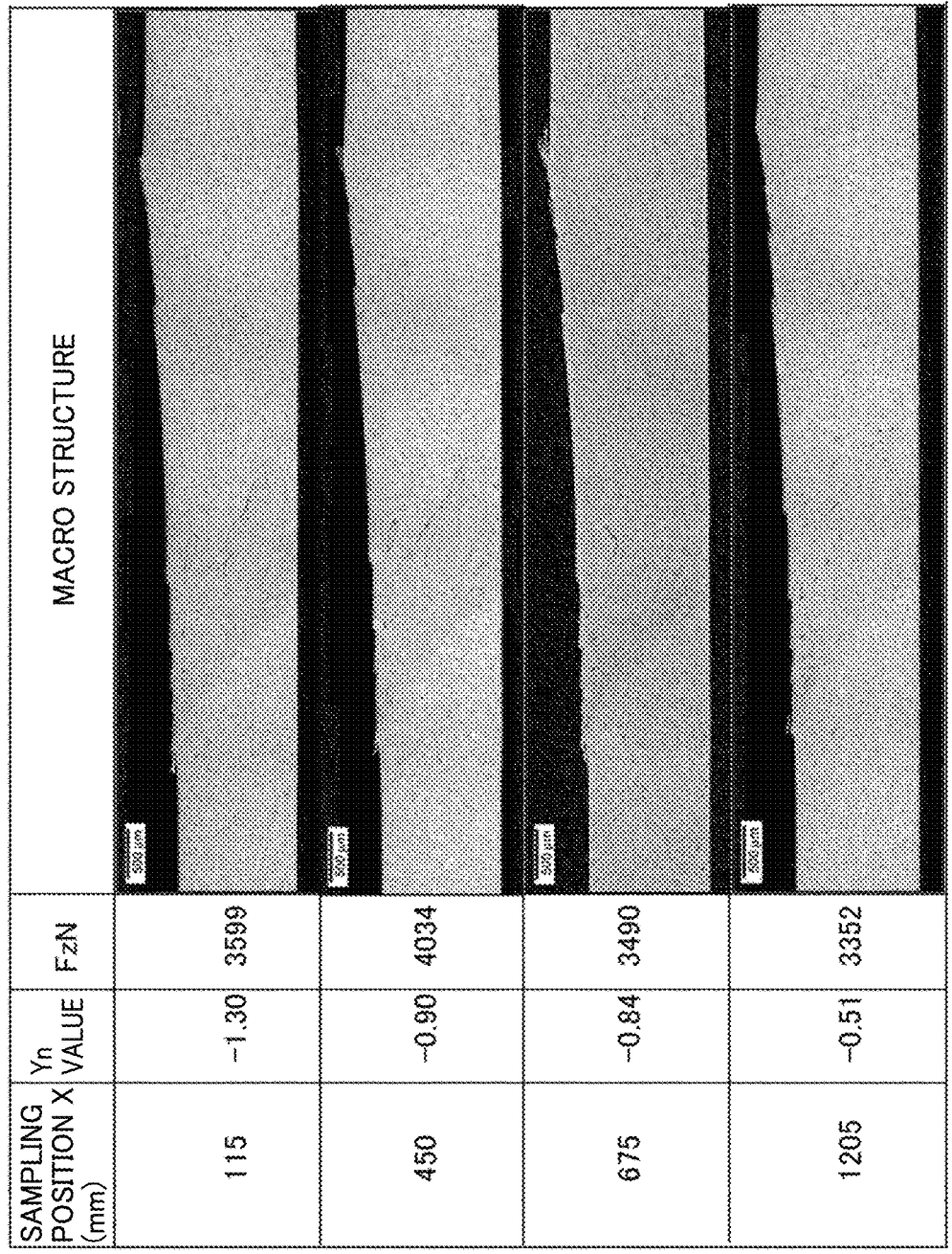
FIG. 40 is a macro structure diagram of each position in Test 6.

FIG. 40 is a macro structure diagram of each position in Test 6. The macro structure diagram is a vertical cross-sectional view with respect to the advancing direction of the rotating tool F. FIG. 41 is a micro structure diagram of each position in Test 6. The micro structure diagram is an enlarged view of a part of the plasticized region at each position. Here, joining states at positions of sampling positions X=115, 450, 675, and 1205 mm were checked. The Yn value is a distance from the butting portion J1 at each position. FzN is the reaction load applied in the axial direction of the rotating tool F at each position. As shown in FIG. 40, when the friction stir joining was performed along the modified moving route R2b, the joining states at any of the sampling positions were good. As shown in FIG. 41, when the friction stir joining was performed along the modified moving route R2b, the burr (the step) could be made small at any of the sampling positions. Additionally, no root flaw occurred at any of the sampling positions.

According to the above, it is found out that, comparing with a case where the rotating tool F is moved along the set moving route P1b, it is possible to perform the friction stir joining of a position closer to the target moving route R1b by moving the rotating tool F along the modified moving route R2b. Additionally, when the rotating tool F is moved along the modified moving route R2b, the joining state of the joining portion is good.

Figure 42:
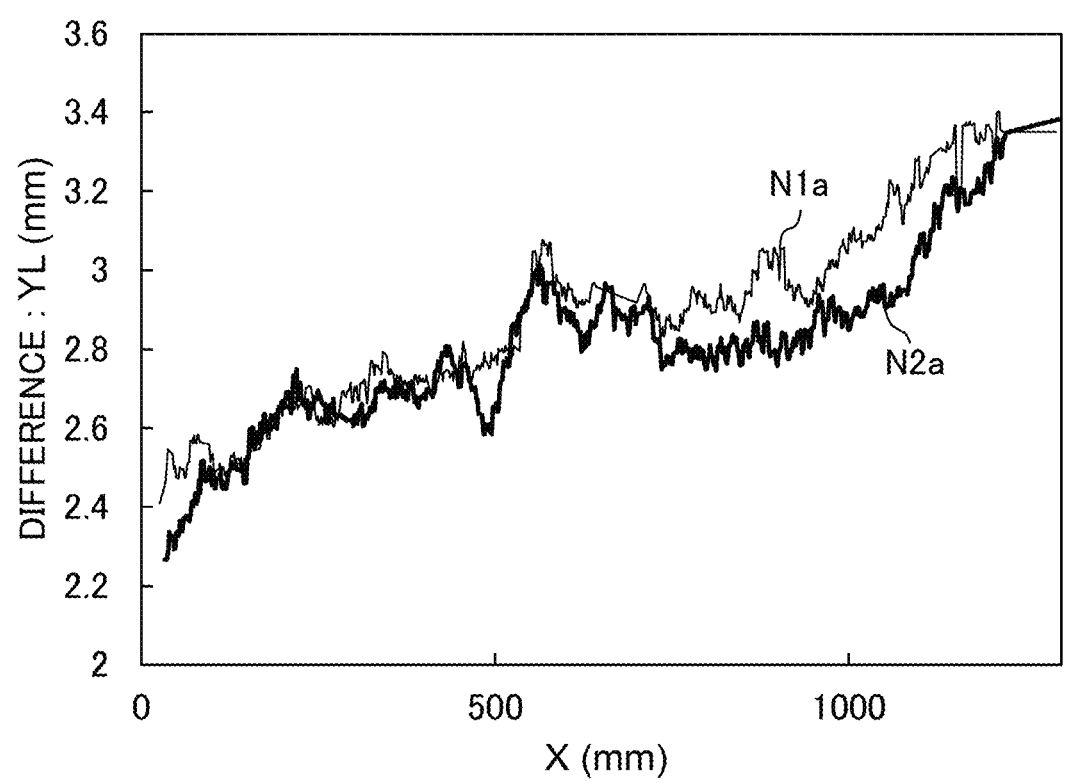
FIG. 42 is a graph showing differences of traveling trajectories of the rotating tool in Test 5 and Test 6.

FIG. 42 is a graph showing differences of the traveling trajectories of the rotating tool in Test 5 and Test 6. A line shape N1a indicates a difference between the traveling trajectory N1 and the set moving route P1b in Test 5. A line shape N2a is a difference between the traveling trajectory N2 and the modified moving route R2b in Test 6. As shown in FIG. 42, the line shape N1a and the line shape N2a have substantially the same value. It is considered that this is because the direction in which the arm 31a receives force is changed with the rotating tool F advanced and the orientation of the robotic arm 31 changed, and accordingly the flexure amount is changed along with the change in a second moment of area. That is, it is inferred that the flexure amount (difference) is determined based on the orientation of the robotic arm 31 (orientation in a traveling position X direction).

<Test 7: Right and Left Positions of Rotating Tool and Reaction Load Applied to Rotating Tool>

Figure 43:
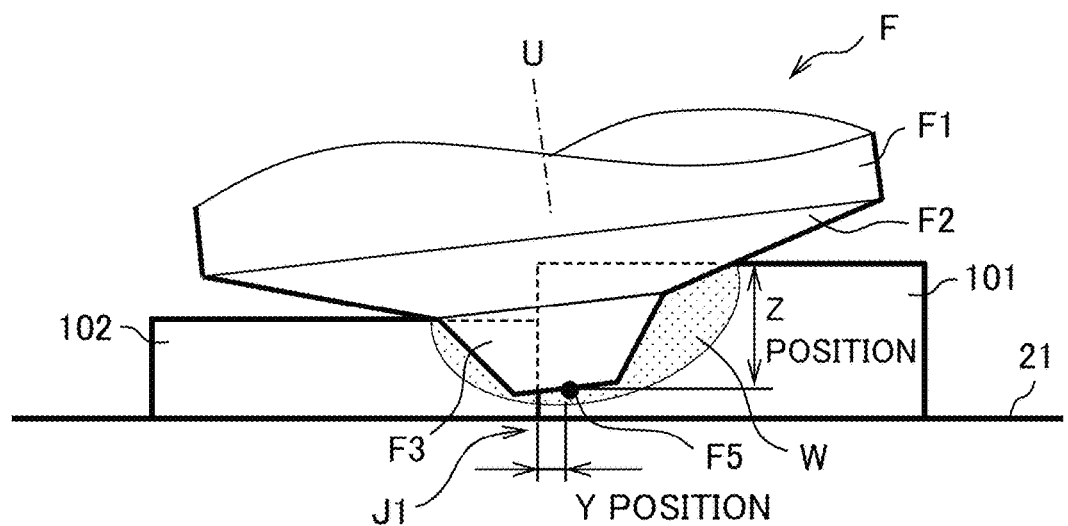
FIG. 43 is a cross-sectional view showing a joining portion in Test 7.

FIG. 43 is a cross-sectional view showing a joining portion in Test 7. In Test 7, the butting portion J1 was formed by butting the first metallic member 101 and the second metallic member 102 having a plate-thickness smaller than that of the first metallic member 101 to each other, and the friction stir joining was performed on the butting portion J1 by using the rotating tool F. As shown in FIG. 43, here, a Y position (right and left positions with respect to the advancing direction of the rotating tool F) and a Z position were measured when the friction stir joining was performed, and a test (Test 7) for checking an effect of the Y position and the Z position on the joining portion was conducted. Test 7 was conducted in three types under different conditions (Test 7(1), Test 7(2), and Test 7(3)).

Figure 44:
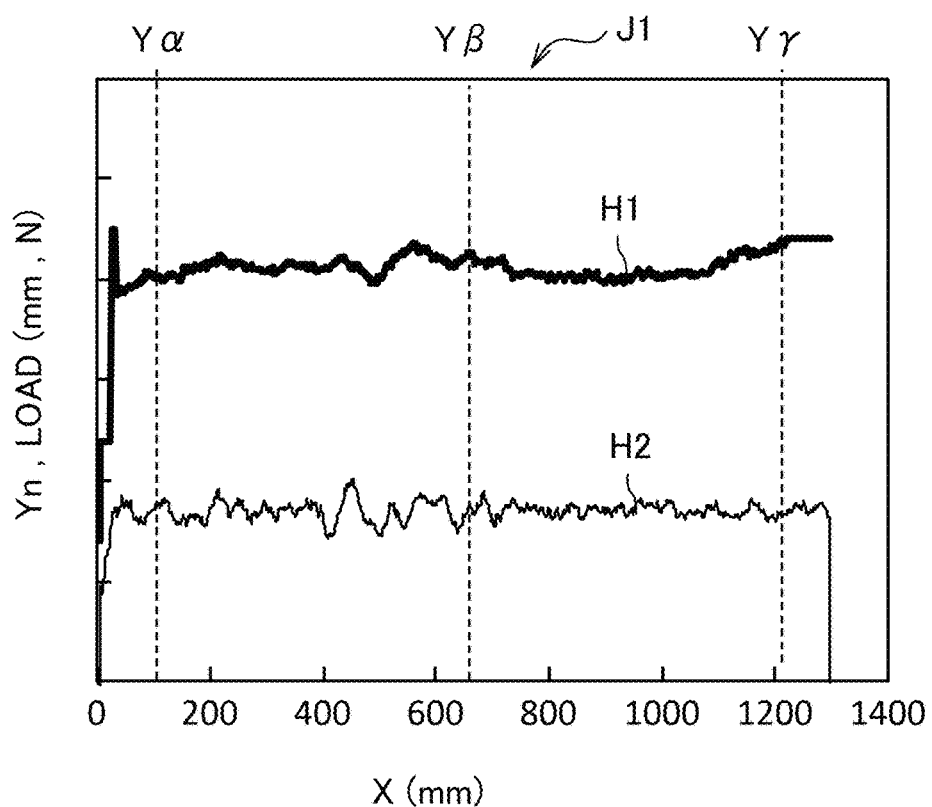
FIG. 44 is a graph showing a relationship between a Y position of the rotating tool and a load in Test 7(1).

As shown in FIG. 43, the Y position means a distance from the butting portion J1 to the center F5 of the flat surface of the tip end side pin F3. The Z position means a depth from the front surface of the first metallic member 101 on the thick plate side to the center F5 of the flat surface of the tip end side pin F3, and it is possible to figure out the Z position by measuring the load (the reaction load) Fz received in the axial direction of the rotating tool F. FIG. 44 is a graph showing a relationship between the Y position of the rotating tool and the load in Test 7(1).

In Test 7(1), an arbitrarily set moving route was set, and the friction stir joining was performed by moving the rotating tool F along the set moving route. The joining length of the butting portion J1 was 1300 mm. As shown in FIG. 44, a line shape H1 indicates the traveling trajectory of the rotating tool F. According to the line shape H1, the rotating tool F is moved in substantially parallel to the butting portion J1 on the thick plate side (the first metallic member 101) of the butting portion J1. A line shape H2 indicates the load Fz applied in the axial direction of the rotating tool F when Test 7(1) was conducted. The load Fz has some increase and decrease but is substantially a constant value.

Figure 45:
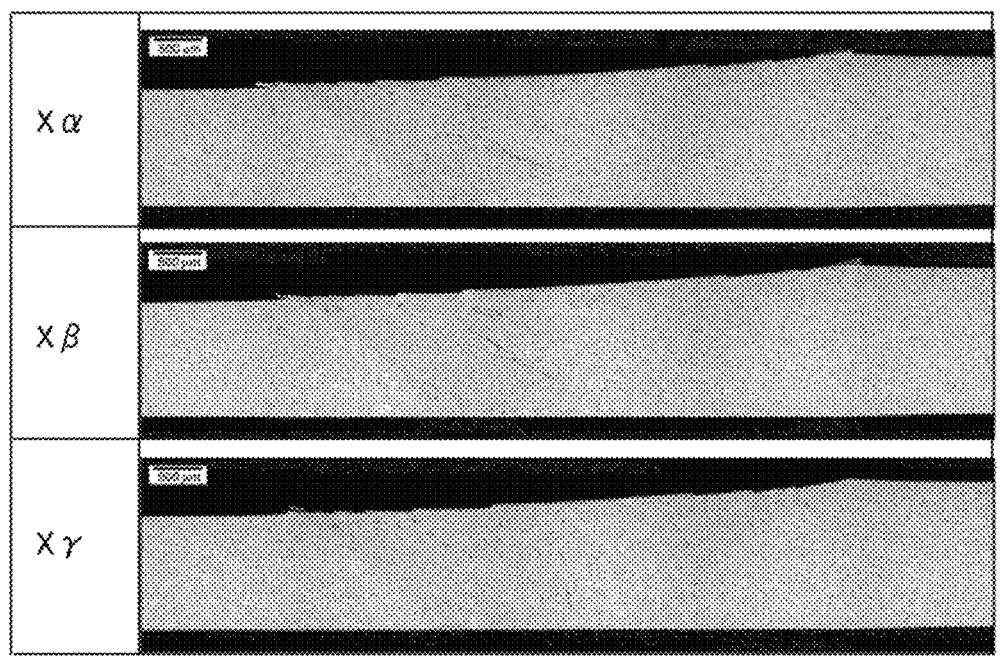
FIG. 45 is a macro structure diagram of each position in Test 7(1).

FIG. 45 is a macro structure diagram of each position in Test 7(1). The macro structure diagram is a vertical cross-sectional view with respect to the advancing direction of the rotating tool F. Here, joining states of positions of sampling positions Xα (a near side portion), Xβ (a center portion), and Xγ (a far side portion) were checked. As shown in FIG. 45, the joining states at the positions of the sampling positions Xα, Xβ, and Xγ were all good.

Figure 46:
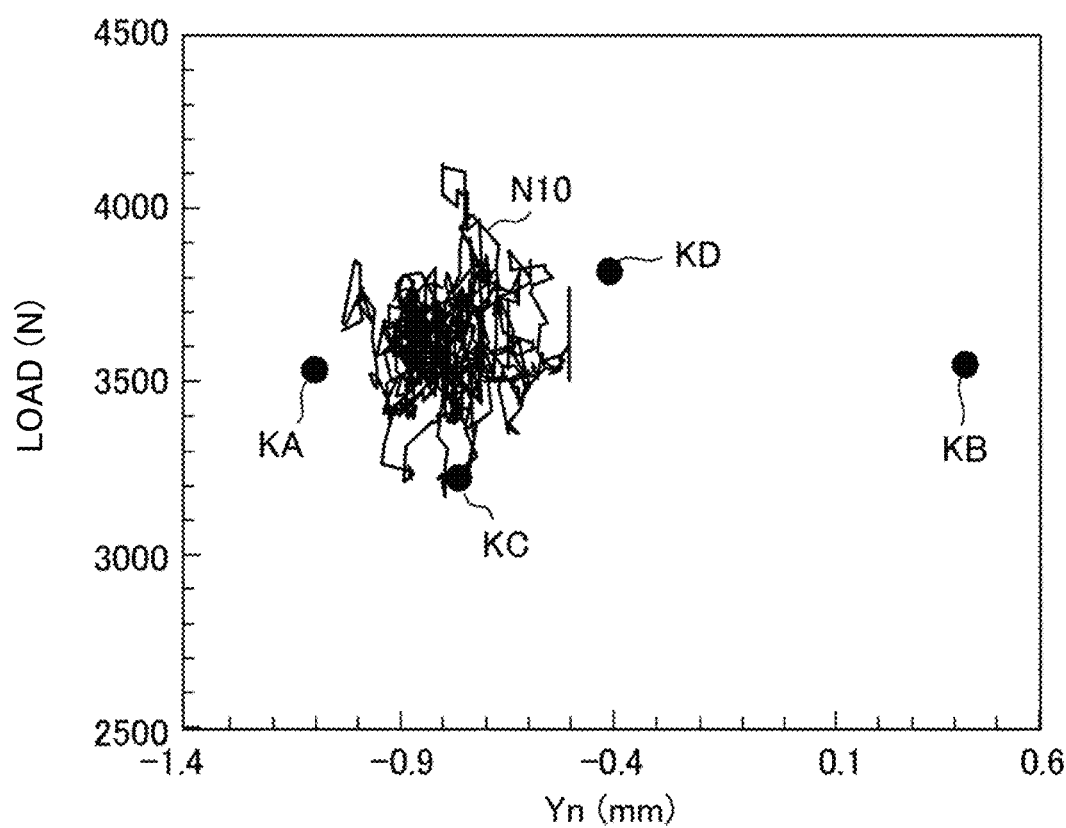
FIG. 46 is a graph showing a relationship between a Yn value and a load Fz of the rotating tool in Test 7(1).

FIG. 46 is a graph showing a relationship between the Yn value of the rotating tool and the load Fz in Test 7(1). In this graph, the position Yn of the rotating tool is shown so as to move toward the thick plate side as a negative value is increased and move toward the thin plate side as a positive value is increased. A line shape N10 in the graph indicates the trajectory of the position Yn of the rotating tool F and the load Fz in Test 7(1). It is shown that the line shape N10 is within a range that is constant to some extent.

Figure 47:
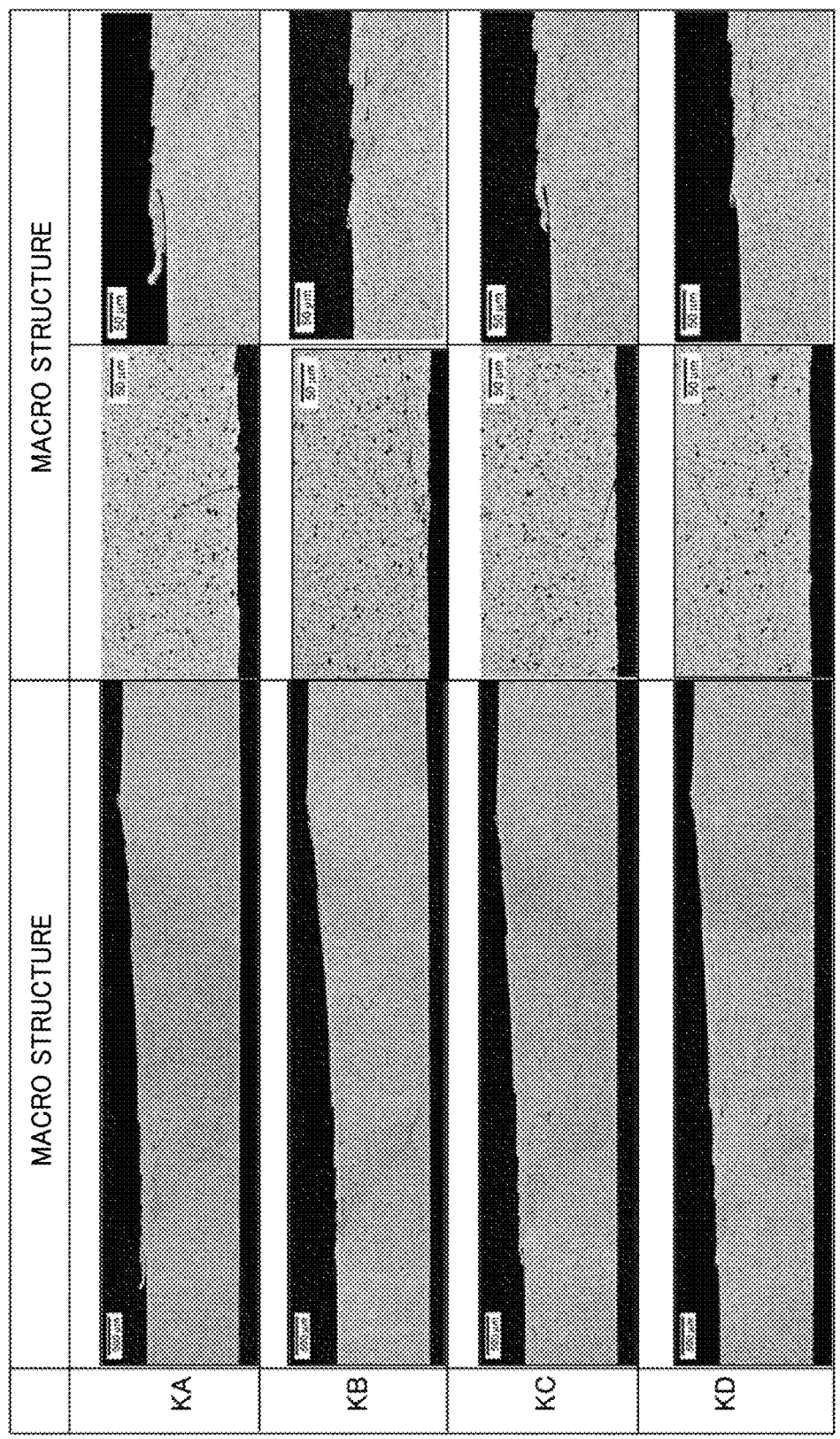
FIG. 47 shows macro structure diagrams and micro structure diagrams of cases KA, KB, KC, and KD in Test 7(1).

FIG. 47 shows a macro structure diagram and a micro structure diagram in cases KA, KB, KC, and KD in Test 7(1). The macro structure diagram is a vertical cross-sectional view with respect to the advancing direction. The micro structure diagram is an enlarged view of a part of the plasticized region in each case. As shown in the micro structure in FIG. 47, in the cases KA and KC, a root flaw occurs. Additionally, as shown in the macro structure, in the case KB, the plate-thickness of the joining portion is reduced greatly. On the other hand, in the case KD, no root flaw occurs and no reduction in the plate-thickness of the joining portion occurs. That is, it is found out that there is a risk of occurrence of a joining defect when the position Yn of the rotating tool F and the load Fz are out of the acceptable range (the predetermined numerical range).

Figure 48:
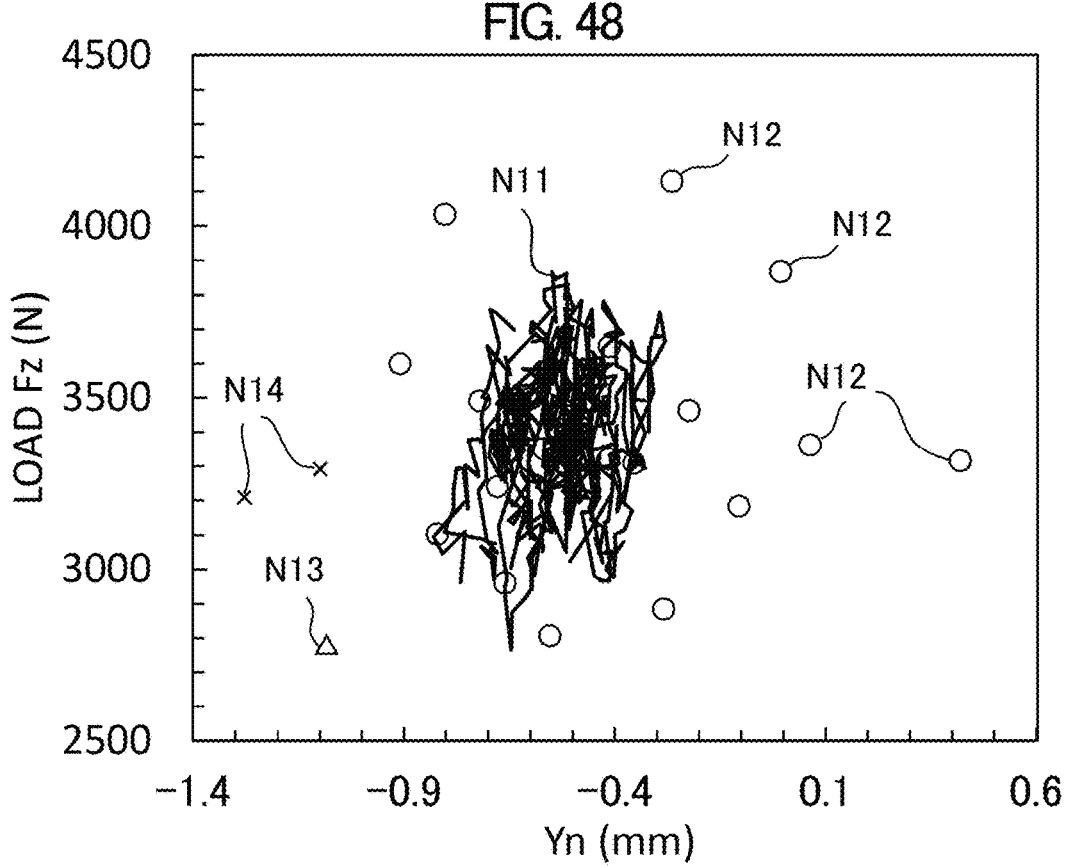
FIG. 48 is a graph showing a relationship between a Yn value and a load Fz of the rotating tool in Test 7(2).

FIG. 48 is a graph showing a correlation between the Yn value of the rotating tool and the load Fz in Test 7(2). A line shape N11 in FIG. 48 indicates the trajectory of the position Yn of the rotating tool F and the load Fz in Test 7(2). In Test 7(2), the friction stir joining was performed while changing the Y position and the load from that in Test 7(1).

Under the conditions in a plot N12 (a circle mark), an observation result of the micro structure was good. Under the conditions in a plot N13 (a triangle mark), an observation result of the micro structure was substantially good, but a small root flaw occurs. Under the conditions in a plot N14 (a cross mark), an observation result of the micro structure was bad.

Figure 49:
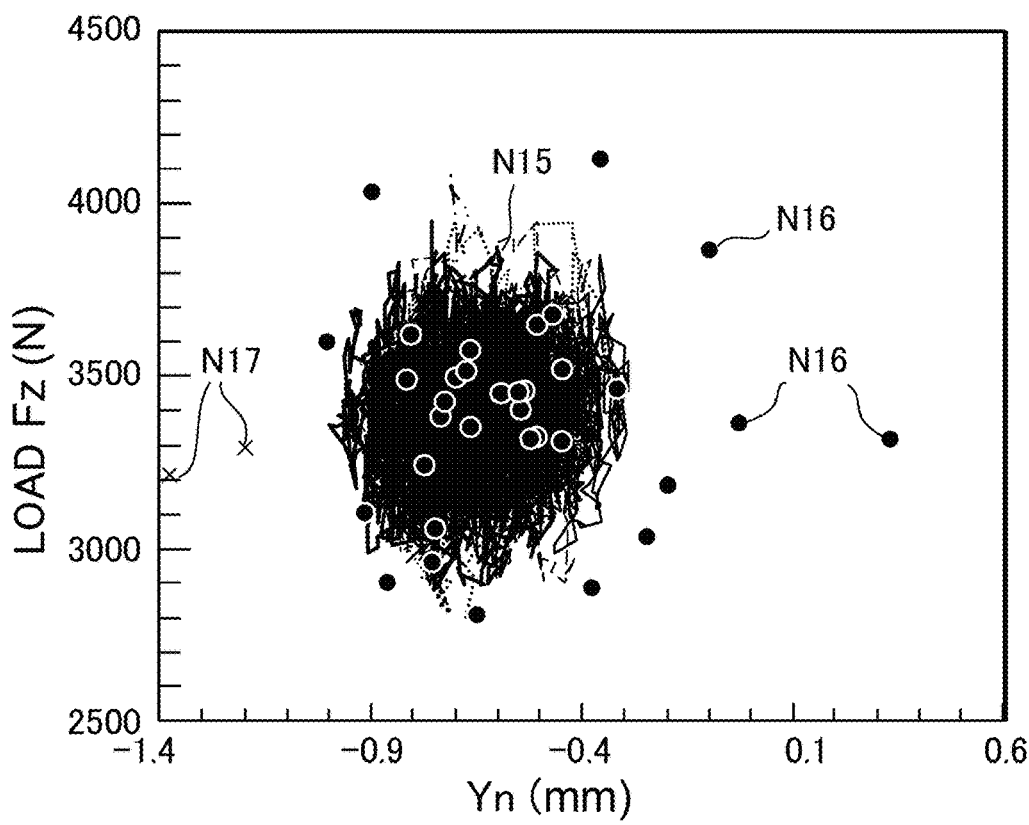
FIG. 49 is a graph showing a relationship between a Yn value and a load Fz of the rotating tool in Test 7(3).

FIG. 49 is a graph showing a relationship between the Yn value of the rotating tool and the load Fz in Test 7(3). A line shape N15 in FIG. 49 indicates the trajectory of the position Yn of the rotating tool F and the load Fz in the test (3). In Test 7(3), 13 types of the friction stir joining were performed while changing the conditions of the Y position and the load, and the results are overlapped to be shown. Under the conditions in a plot N16 (a circle mark), an observation result of the micro structure was good. Under the conditions in a plot N17 (a cross mark), an observation result of the micro structure was bad.

Additionally, according to Tests 7(1) to (3), it is found out that the plate-thickness of the joining portion is likely to be smaller as the position Yn of the rotating tool F is greater (as the rotating tool F is away from the butting portion J1 and close to the thin plate side). Moreover, it is found out that the root flaw is likely to be greater as the position Yn of the rotating tool F is smaller (as the rotating tool F is away from the butting portion J1 and close to the thick plate side). Furthermore, it is found out that the root flaw is likely to be greater as the load is smaller. Note that, it is considered that the plate-thickness in the joining portion is likely to be small when the load is excessively great.

Thus, at least either of the position Yn of the rotating tool F during the friction stir joining of the rotating tool F and the load (the reaction load) Fz applied in the axial direction of the rotating tool F may be measured, and whether at least either of these measurement results is within the acceptable range may be determined. It is favorable that, when the determining unit 64 determines that at least either of the right and left positions of the rotating tool F during the friction stir joining and the reaction load applied in the axial direction of the rotating tool F is out of the acceptable range, that is, when it is determined to be out of the predetermined numerical range set in advance, the modified moving route generating unit 63 calculates a modified moving route in which the position of the rotating tool F is reset in accordance with the position of the rotating tool F during the friction stir joining. Additionally, it is favorable that a load control is performed such that the reaction load that the rotating tool F receives is substantially constant by feeding back the reaction load. With this, it is possible to further enhance the joining accuracy.

Moreover, when at least either of the right and left positions of the rotating tool F during the friction stir joining and the load Fz is determined to be out of the acceptable range, the determining unit 64 may determine the first metallic member 101 and the second metallic member 102 as an out-of-numerical-range product in association with a work number. With this, it is possible to perform the quality management easily. Note that, out of the right and left positions of the rotating tool F during the friction stir joining and the load Fz, only the right and left direction positions of the rotating tool F may be measured to determine whether it is within the acceptable range based on the measurement result. Furthermore, out of the right and left positions of the rotating tool F during the friction stir joining and the load Fz, only the load Fz may be measured to determine whether it is within the acceptable range based on the measurement result. Additionally, each acceptable range may be set arbitrarily in advance.

REFERENCE SIGNS LIST 1 automatic joining system
2 conveying device
3 fixing device
4 friction stir device
5 controlling device
22 sucking unit
F rotating tool
F2 base end side pin
F3 tip end side pin
R1 target moving route
R2 modified moving route
aiming angle
h step dimension
D clearance amount
T temperature

The invention claimed is:

1. An automatic joining system, comprising:
a fixing device that fixes a first metallic member and a second metallic member arranged on a platform in a state where a butting portion including a step is formed by butting end surfaces to each other such that a front surface of the second metallic member is lower than a front surface of the first metallic member;
a friction stir device that includes a rotating tool performing friction stir and performs friction stir joining of the butting portion;
a measuring unit that measures a ridge line position of the first metallic member; and
a controlling device that controls the fixing device and the friction stir device, wherein
the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin,
the controlling device sets a target moving route along which the rotating tool moves when the friction stir joining of the butting portion is performed, based on the ridge line position before the friction stir joining is performed, and also sets a modified moving route at a position displaced toward the first metallic member side in substantially parallel with respect to the target moving route, and
the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

2. The automatic joining system according to claim 1, wherein the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which the target moving route is displaced toward the first metallic member side in substantially parallel by the difference.

3. The automatic joining system according to claim 1, wherein the controlling device calculates the modified moving route at a position that is displaced obliquely toward the first metallic member side with respect to the target moving route and also displaced toward the first metallic member side in substantially parallel with respect to the target moving route.

4. The automatic joining system according to claim 3, wherein the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which an advancing direction of the target moving route is displaced obliquely toward the first metallic member side by the difference as advancing in an advancing direction of the rotating tool, and at which also the target moving route is displaced toward the first metallic member side in substantially parallel by the difference.

5. An automatic joining system, comprising:

a fixing device that fixes a first metallic member and a second metallic member arranged on a platform in a state where a butting portion including a step is formed by butting end surfaces to each other such that a front surface of the second metallic member is lower than a front surface of the first metallic member;

a friction stir device that includes a rotating tool performing friction stir and performs friction stir joining of the butting portion;

a measuring unit that measures a ridge line position of the first metallic member; and a controlling device that controls the fixing device and the friction stir device, wherein the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a target moving route along which the rotating tool moves when the friction stir joining of the butting portion is performed, based on the ridge line position before the friction stir joining is performed, and also sets a modified moving route at a position displaced obliquely with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

6. The automatic joining system according to claim 5, wherein the controlling device sets a set moving route as an instructing position to move the rotating tool, and based on a difference between a traveling trajectory along which the rotating tool is moved by being controlled to move along the set moving route, while the rotating tool is inserted in at least either of a pair of metallic members on which a butting portion is formed as with the butting portion of the first metallic member and the second metallic member, and while the friction stir joining is performed, and a traveling trajectory along which the rotating tool is moved by being controlled to move along the set moving route, while the rotating tool is not inserted in the metallic member, and in a state with no load, the controlling device calculates the modified moving route in which an instructing position of the rotating tool is set at a position at which an advancing direction of the target moving route is displaced obliquely toward the first metallic member side by the difference as advancing in an advancing direction of the rotating tool.

7. An automatic joining system, comprising:

a fixing device that fixes a first metallic member and a second metallic member arranged on a platform in a state where a butting portion including a step is formed by butting end surfaces to each other such that a front surface of the second metallic member is lower than a front surface of the first metallic member;

a friction stir device that includes a rotating tool performing friction stir and performs friction stir joining of the butting portion;

a measuring unit that measures a step dimension from the front surface of the first metallic member to the front surface of the second metallic member; and a controlling device that controls the fixing device and the friction stir device, wherein the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines whether the step dimension before the friction stir joining is performed is within a predetermined numerical range.

8. An automatic joining system, comprising:
a fixing device that fixes a first metallic member and a second metallic member arranged on a platform in a state where a butting portion including a step is formed by butting end surfaces to each other such that a front surface of the second metallic member is lower than a front surface of the first metallic member;
a friction stir device that includes a rotating tool performing friction stir and performs friction stir joining of the butting portion;
a measuring unit that measures each of a first thickness dimension of the first metallic member and a second thickness dimension of the second metallic member; and
a controlling device that controls the fixing device and the friction stir device, wherein
the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin,
the friction stir device performs the friction stir joining along the butting portion while maintaining a predetermined aiming angle of the rotating tool and while pressing a plastic fluidized material by a stepped bottom surface of the pin step portion, and
the controlling device includes a determining unit that determines whether the first thickness dimension and the second thickness dimension before the friction stir joining is performed or during the friction stir joining is within a predetermined numerical range.

9. The automatic joining system according to claim 8, wherein
the controlling device controls at least one of an aiming angle, an angle of advance, and an insertion amount of the rotating tool, and a position of the rotating tool in accordance with a combination of the first thickness dimension and the second thickness dimension.

10. An automatic joining system, comprising:
a fixing device that fixes a first metallic member and a second metallic member arranged on a platform in a state where a butting portion including a step is formed by butting end surfaces to each other such that a front surface of the second metallic member is lower than a front surface of the first metallic member;
a friction stir device that includes a rotating tool performing friction stir and performs friction stir joining of the butting portion;
a measuring unit that measures a ridge line position of the first metallic member and also measures at least either of a position of the rotating tool and a load applied to the rotating tool; and
a controlling device that controls the fixing device and the friction stir device, wherein
the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the controlling device sets a moving route along which the rotating tool moves when the friction stir joining of the butting portion is performed, based on the ridge line position before the friction stir joining is performed, the friction stir device performs the friction stir joining along the moving route while maintaining a predetermined aiming angle of the rotating tool and while pressing a plastic fluidized material by a stepped bottom surface of the pin step portion, and the controlling device includes a determining unit that determines whether at least either of the position of the rotating tool during the friction stir joining and the load during the friction stir joining is within a predetermined numerical range.

11. The automatic joining system according to claim 10, wherein
when at least either of the position of the rotating tool during the friction stir joining and the load during the friction stir joining is determined to be out of the predetermined numerical range, the controlling device calculates a modified moving route in which a position of the rotating tool is reset in accordance with the position of the rotating tool during the friction stir joining.

12. The automatic joining system according to claim 10, wherein
the measuring unit measures the ridge line position and also measures the position of the rotating tool and the load, and
the determining unit determines whether at least one of the position of the rotating tool during the friction stir joining and the load during the friction stir joining is within a predetermined numerical range.

13. The automatic joining system according to claim 10, wherein
the position of the rotating tool is right and left positions with respect to an advancing direction of the rotating tool.

14. An automatic joining system that buts end surfaces of a first metallic member and a second metallic member arranged on a platform to each other such that a front surface of the second metallic member is lower than a front surface of the first metallic member and performs friction stir joining of a butting portion including a step, comprising:
a friction stir device that includes a rotating tool performing friction stir and performs friction stir joining of the butting portion;
a measuring unit that measures a ridge line position of the first metallic member; and
a controlling device that controls the friction stir device, wherein
the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin,
the controlling device sets a target moving route along which the rotating tool moves when the friction stir joining of the butting portion is performed, based on the ridge line position before the friction stir joining is performed, and also sets a set moving route as an instructing position to move the rotating tool, based on a difference between a traveling trajectory along which the rotating tool is moved by being controlled to move along the set moving route, while the rotating tool is inserted, and while the friction stir joining is performed, and the target moving route, the controlling device calculates a modified moving route in which an instructing position of the rotating tool is set at a position at which an advancing direction of the set moving route is displaced obliquely with respect to the target moving route, and the friction stir device controls the rotating tool to move along the modified moving route and thereby performing the friction stir joining along the target moving route while maintaining a predetermined aiming angle of the rotating tool and while pressing a plastic fluidized material by a stepped bottom surface of the pin step portion.

15. The automatic joining system according to claim 14, wherein the controlling device sets the set moving route at a position displaced in parallel from the target moving route, and calculates the modified moving route, based on a difference between a traveling trajectory along which the rotating tool is controlled to move along the set moving route and the target moving route, at a position at which an advancing direction of the set moving route is displaced obliquely toward the first metallic member side by the difference as advancing in an advancing direction of the rotating tool.

16. The automatic joining system according to claim 14 or 15, wherein based on a difference between a traveling trajectory along which the rotating tool is controlled to move along the set moving route and the target moving route, the controlling device calculates the modified moving route in which an instructing position of the rotating tool is set at a position at which an advancing direction of the set moving route is displaced obliquely and also displaced in substantially parallel with respect to the target moving route.

17. The automatic joining system according to claim 14, wherein the controlling device sets the set moving route at a position displaced from the target moving route in parallel, obtains a traveling trajectory along which the rotating tool is controlled to move along the set moving route, and sets the modified moving route at a position at which, by an angle of oblique displacement of the traveling trajectory with respect to the target moving route, an advancing direction of the set moving route is displaced obliquely in an opposite direction of the direction in which the traveling trajectory is displaced, and at which, by a length of substantially parallel displacement of the traveling trajectory with respect to the target moving route, also the set moving route is displaced in substantially parallel in an opposite direction of the direction in which the traveling trajectory is displaced.

18. An automatic joining system, comprising:

a fixing device that fixes a first metallic member and a second metallic member arranged on a platform in a state where a butting portion including a step is formed by butting end surfaces to each other such that a front surface of the second metallic member is lower than a front surface of the first metallic member;

a friction stir device that includes a rotating tool performing friction stir and performs friction stir joining of the butting portion;

a measuring unit that measures a clearance amount between the first metallic member and the second metallic member; and a controlling device that controls the fixing device and the friction stir device, wherein the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the butting portion while maintaining a predetermined aiming angle of the rotating tool and while pressing a plastic fluidized material by a stepped bottom surface of the pin step portion, and the controlling device includes a determining unit that determines the clearance amount before the friction stir joining is performed is within a predetermined numerical range.

19. The automatic joining system according to claim 18, wherein the determining unit determines whether the clearance amount at a start position of the friction stir joining is within a predetermined numerical range.

20. An automatic joining system, comprising:

a fixing device that fixes a first metallic member and a second metallic member arranged on a platform in a state where a butting portion including a step is formed by butting end surfaces to each other such that a front surface of the second metallic member is lower than a front surface of the first metallic member;

a friction stir device that includes a rotating tool performing friction stir and performs friction stir joining of the butting portion;

a temperature adjusting unit that is provided in the fixing device and performs measurement of a temperature of the platform and adjustment of the temperature; and a controlling device that controls the fixing device and the friction stir device, wherein the rotating tool includes a base end side pin and a tip end side pin formed continuously to the base end side pin, a taper angle of the base end side pin is greater than a taper angle of the tip end side pin, and a stepwise pin step portion is formed on an outer periphery of the base end side pin, the friction stir device performs the friction stir joining along the joining portion while maintaining a predetermined aiming angle of the rotating tool and while pressing a plastic fluidized material by a stepped bottom surface of the pin step portion, and the controlling device includes a determining unit that determines the temperature before the friction stir joining is performed is within a predetermined numerical range.

* * * * *